(12) United States Patent
Hooper

(10) Patent No.: US 8,928,947 B2
(45) Date of Patent: Jan. 6, 2015

(54) IMAGE CONTRAST ENHANCEMENT

(75) Inventor: David Sheldon Hooper, Victoria (CA)

(73) Assignee: ACD Systems International Inc., Victoria, British Columbia (CA)

( * ) Notice: Subject to any disclaimer, the term of this patent is extended or adjusted under 35 U.S.C. 154(b) by 6 days.

(21) Appl. No.: 13/556,161

(22) Filed: Jul. 23, 2012

(65) Prior Publication Data

US 2013/0022287 A1 Jan. 24, 2013

Related U.S. Application Data

(63) Continuation of application No. 11/502,551, filed on Aug. 9, 2006, now Pat. No. 8,228,560, which is a continuation-in-part of application No. 11/106,339, filed on Apr. 13, 2005, now Pat. No. 8,014,034.

(51) Int. Cl.
*H04N 1/409* (2006.01)
*G06T 5/00* (2006.01)
*G06T 5/20* (2006.01)

(52) U.S. Cl.
CPC . *G06T 5/008* (2013.01); *G06T 5/20* (2013.01); *G06T 2207/10024* (2013.01)
USPC .......................... 358/3.27; 382/260; 382/274

(58) Field of Classification Search
USPC ....................................................... 358/3.27
See application file for complete search history.

(56) References Cited

U.S. PATENT DOCUMENTS

| | | | |
|---|---|---|---|
| 4,384,336 A | 5/1983 | Frankle et al. | |
| 4,590,582 A | 5/1986 | Umemura | |
| 5,450,502 A | 9/1995 | Eschbach et al. | |
| 5,774,599 A | 6/1998 | Muka et al. | |
| 5,818,975 A | 10/1998 | Goodwin et al. | |
| 5,991,456 A | 11/1999 | Rahman et al. | |
| 6,069,979 A | 5/2000 | VanMetter | |
| 6,212,304 B1 | 4/2001 | Durg et al. | |
| 6,317,521 B1 | 11/2001 | Gallagher et al. | |
| 6,633,684 B1 | 10/2003 | James | |
| 6,677,959 B1 | 1/2004 | James | |
| 6,731,790 B1 | 5/2004 | Van de Velde et al. | |
| 6,741,753 B1 | 5/2004 | Moroney | |
| 6,760,484 B1 | 7/2004 | Sobol | |
| 6,788,822 B1 | 9/2004 | Zhang et al. | |
| 6,804,409 B2 | 10/2004 | Sobol et al. | |
| 6,807,299 B2 | 10/2004 | Sobol | |
| 6,813,041 B1 | 11/2004 | Moroney et al. | |

(Continued)

OTHER PUBLICATIONS

Ashikhmin, M., A Tone Mapping Algorithm for High Contrast *Proceeding of the 13th Eurographics Workshop on Rendering*, 2002, 11 pages.

(Continued)

*Primary Examiner* — Scott A Rogers
(74) *Attorney, Agent, or Firm* — Blakely, Sokoloff, Taylor & Zafman LLP

(57) ABSTRACT

A method for contrast enhancement for digital images, including filtering an original image having original color values, to generate a filtered image, receiving parameters for a response curve, the response curve being a function of color value that is user-adjustable, deriving local multipliers by applying the response curve to the filtered image, multiplying the original color values by the local multipliers, thereby generating a contrast-enhanced image from the original image. A system and a computer-readable storage medium are also described.

16 Claims, 37 Drawing Sheets
(22 of 37 Drawing Sheet(s) Filed in Color)

(56) References Cited

U.S. PATENT DOCUMENTS

| | | | |
|---|---|---|---|
| 6,822,762 B2 | 11/2004 | Moroney et al. | |
| 6,825,884 B1* | 11/2004 | Horiuchi | 348/362 |
| 6,834,125 B2 | 12/2004 | Woodell et al. | |
| 6,842,543 B2 | 1/2005 | Woodell et al. | |
| 7,102,793 B2 | 9/2006 | Lee et al. | |
| 7,149,358 B2 | 12/2006 | Langan | |
| 7,319,787 B2 | 1/2008 | Trifonov et al. | |
| 7,643,696 B2* | 1/2010 | Kita | 382/260 |
| 8,411,991 B2* | 4/2013 | Jo et al. | 382/274 |
| 2001/0030687 A1 | 10/2001 | Kondo et al. | |
| 2002/0154323 A1 | 10/2002 | Sobol et al. | |
| 2002/0154832 A1 | 10/2002 | Sobol | |
| 2002/0176113 A1 | 11/2002 | Edgar | |
| 2002/0186387 A1 | 12/2002 | Moroney et al. | |
| 2002/0196350 A1 | 12/2002 | Cooper | |
| 2003/0012448 A1 | 1/2003 | Kimmel et al. | |
| 2003/0016306 A1 | 1/2003 | Ogata et al. | |
| 2003/0026494 A1 | 2/2003 | Woodell et al. | |
| 2003/0072496 A1 | 4/2003 | Woodell et al. | |
| 2003/0138161 A1 | 7/2003 | Rising, III | |
| 2003/0156761 A1 | 8/2003 | Ogata et al. | |
| 2003/0161546 A1 | 8/2003 | Sobol et al. | |
| 2003/0215153 A1 | 11/2003 | Gindele | |
| 2003/0235342 A1 | 12/2003 | Gindele | |
| 2004/0081369 A1 | 4/2004 | Gindele et al. | |
| 2004/0091164 A1 | 5/2004 | Sakatani et al. | |
| 2004/0165086 A1 | 8/2004 | Spitzer et al. | |
| 2004/0174571 A1 | 9/2004 | Sobol | |
| 2004/0213478 A1 | 10/2004 | Chesnokov | |
| 2004/0264799 A1 | 12/2004 | Gallagher et al. | |
| 2005/0012831 A1 | 1/2005 | Yano | |
| 2005/0012832 A1 | 1/2005 | Yano | |
| 2005/0013506 A1 | 1/2005 | Yano | |
| 2005/0025356 A1 | 2/2005 | Fukuda | |
| 2005/0025378 A1 | 2/2005 | Maurer | |
| 2005/0030415 A1 | 2/2005 | Takizawa | |
| 2005/0052665 A1 | 3/2005 | Moroney | |
| 2005/0073702 A1 | 4/2005 | Shaked et al. | |
| 2005/0074163 A1 | 4/2005 | Shaked | |
| 2005/0074179 A1 | 4/2005 | Wilensky | |
| 2005/0074180 A1 | 4/2005 | Wilensky | |
| 2007/0104389 A1* | 5/2007 | Wells | 382/274 |

OTHER PUBLICATIONS

Braun, G. and Fairchild, M., Image Lightness Rescaling Using Sigmoidal Contrast Enhancement Functions, 39 pages.
Deriche, R., Fast Algorithms for Low-Level Vision, *IEEE Transactions on Pattern Analysis and Machine Intelligence*, vol. 12(1), Jan. 1990, pp. 78-87.
Dicarlo, J.M. and Wandell, B.A., Rendering high dynamic range images, *Proceedings of the SPIE Electronic Image 2000 Conference*, vol. 3965, 2000, 10 pages.
Durand, F., and Dorsey, J., Fast Bilateral Filtering for the Display of High-Dynamic-Range Images, *Proceedings of SIGGRAPH 2002*, 2002, 10 pages.
Fattal, R., Lischinski, D. and Werman, M., Gradient Domain High Dynamic Range Compression, *Proceedings of SIGGRAPH 2002*, 2002, 8 pages.
Larson, G.W., Rushmeier, H. And Piatko, C., A Visibility Matching Tone Reproduction Operator for High Dynamic Range Scenes, IEEE Transactions on Visualization and Computer Graphics, vol. 3(4), Oct.-Dec. 1997, pp. 291-306.
Pattanaik, S., Ferwerda, J.A., Fairchild, M.D. and Greenberg, D.P., A Multiscale Model of Adaptation and Spatial Vision for Realistic Image Display, *Proceedings of SIGGRAPH '98*, 1998, 12 pages.
Reinhard, E., Stark, M., Shirley, P. and Ferwerda, J., Photographic Tone Reproduction for Digital Images, 10 pages.
Socolinsky, D., Dynamic range constraints in image fusion and visualization, 6 pages.
Tumblin, J. and Hodgins, J.K., Two Methods for Display of High Contrast Images, 38 pages.
Adobe Photoshop CS2, What's New in Adobe Photoshop CS2, http://www.adobe.com/products/photoshop/pdfs/pscs2_wn.pdf, 2005 Adobe Systems Incorporated, 7 pages.
Stoik PictureMan 5.0.2 PRO main page, http://www.stoik.com/pictureman/pm40_main.htm, downloaded Oct. 28, 2005, 4 pages.
Stoik PictureMan 5.0 PRO, Shadow/Highlight tool, http://www.stoik.com/pictureman/tool_shadow-highlight.htm, 2005, STOIK Imaging, 4 pages.
Stoik PictureMan 5.0 PRO, Complete image processing in 48 bit color, http://www.stoik.com/pictureman/PictureMan_50.htm, STOIK Imaging, downloaded Oct. 28, 2005, 7 pages.
Picasa Picture Simplicity from Google, home page, http://picasa.google.com/index.html, 2005 Google, Inc., 2 pages.
Picasa Picture Simplicity from Google, Edit Features, http://picasa.google.com/features/features-edit.html, 2005 Google, Inc., 2 pages.
Athentech Imaging, Perfectly Clear for Photography, http://www.athentech.com/home.html, downloaded Oct. 28, 2005, 2 pages.
Athentech Imaging, Applications: Software, http://www.athentech.com/software.html, downloaded Oct. 28, 2005, 2 pages.
Athentech Imaging, How It Works: Overview, http://www.athentech.com/overview.html, downloaded Oct. 28, 2005, 4 pages.
Athentech Imaging, How It Works: Science, http://www.athentech.com/details.html, downloaded Oct. 28, 2005, 10 pages.
Athentech Imaging, How It Works: Implementation, http://www.athentech.com/science.html, downloaded Oct. 28, 2005, 2 pages.
The National Science Foundation, Press Release, US NSF—News, New Image Sensor will Show what The Eyes See, and a Camera Cannot, http://www.nsf.gov/news/news_summ.jsp?cntn_id=100719&org=NSF&from=news, Jan. 12, 2005, 5 pages.
Shadow Illuminator, Intrigue Plug-ins, https://www.intrigueplugins.com/moreInfo.php?pID=CBB&PHPSESSIO=04f8f11a144801b46ba01532337ce85d, 2004, 2005, Intrigue Technologies, Inc., 5 pages.
Shadow Illuminator Plug-in User Manual Version 2.0, http://www.intrigueplugins.com/SI-User-Manual.pdf, 2004-2005 by Intrigue Technologies, Inc., 12 pages.
Shadow Illuminator Home User Manual Version 1.0, https://www.intrigueplugins.com/SI_Home-User-Manual.pdf, 2004-2005 by Intrigue Technologies, Inc., 12 pages.
Adobe Photoshop Elements 4.0, http://www.adobe.com/products/photoshopelwin/main.html, 2005 Adobe Systems Incorporated, 5 pages.
Adobe Photoshop Elements 4.0, Top new features, http://www.adobe.com/products/photoshopelwin/newfeatures.html, 2005 Adobe Systems Incorporated, 5 pages.
Adobe Photoshop Elements 4.0, Product overview, http://www.adobe.com/products/photoshopelwin/pdfs/photoshopelwin_overview.pdf, 2005, Adobe Systems Incorporated, 6 pages.
Adobe Photoshop Creative Suite 2, http://www.adobe.com/products/photoshop/main.html, 2005 Adobe Systems Incorporated, 2 pages.
Adobe Photoshop Creative Suite 2, Top new features, http://www.adobe.com/products/photoshop/newfeatures.html, 2005 Adobe Systems Incorporated, 3 pages.
Adobe Photoshop CS2, At a Glance, http://www.adobe.com/products/photoshop/pdfs/PSCS2_aaq.pdf, 2005 Adobe Systems Incorporated, 2 pages.
Tumblin, J. and Turk, G., LCIS: A Boundary Hierarchy for Detail-Preserving Contrast Reduction, *Proceedings of SIGGRAPH '99*. 1999, 8 pages.
Glasbey, C.A. and Jones, R., Fast computation of moving average and related filters in octagonal windows, *Pattern Recognition Letters*, vol. 18, 1997, 15 pages.
Wang, D.C.C. and Vagnucci, A.H., Gradient Inverse Weighted Smoothing Schema and the Evaluation of Its Performance, *Computer Graphics and Image Processing*, vol. 15, 1981, pp. 167-181.
G. A. Woodell, D. J. Jobson, Z. Rahman, G. D. Hines, Enhancement of imagery in poor visibility conditions, Sensors, and Command, Control, Communications, and Intelligence (C3I) Technologies for Homeland Security and Homeland Defense IV, Proc. SPIE 5778, (2005), 11 pages.
G. D. Hines, Z. Rahman, D. J. Jobson, G. A. Woodell, S.D. Harrah, Real-time Enhanced Vision System, Enhanced and Synthetic Vision 2005, Proc. SPIE 5802, (2005), 8 pages.

(56) References Cited

OTHER PUBLICATIONS

G. D. Hines, Z. Rahman, D. J. Jobson, G. A. Woodell, Single-Scale Retinex Using Digital Signal Processors, Global Signal Processing Expo (GSPx), (2004), 6 pages.

Z. Rahman, D. J. Jobson, G. A. Woodell, G. D. Hines, Impact of multi-scale retinex computation on performance of segmentation algorithms, Visual Information Processing XIII, Proc. SPIE 5438, (2004), 12 pages.

D. J. Jobson, Z. Rahman, G. A. Woodell, G. D. Hines, Automatic assessment and reduction of noise using edge pattern analysis in non-linear image enhancement, Visual Information Processing XIII, Proc. SPIE 5438, (2004), 9 pages.

G. D. Hines, Z. Rahman, D. J. Jobson, G. A. Woodell, DSP Implementation of the Retinex Image Enhancement Algorithm, Visual Information Processing XIII, Proc. SPIE 5438, (2004), 12 pages.

G. A. Woodell, Z. Rahman, D. J. Jobson, G. D. Hines, Enhanced images for checked and carry-on baggage and cargo screening, Sensors, and Command, Control, Communications, and Intelligence (C3I) Technologies for Homeland Security and Homeland Defense III, Proc. SPIE 5403, (2004), 8 pages.

D. J. Jobson, Z. Rahman, and G. A. Woodell, Feature visibility limits in the non-linear enhancement of turbid images, Visual Information Processing XII, Proc. SPIE 5108, (2003), 8 pages.

D. J. Jobson, Z. Rahman, and G. A. Woodell, The Statistics of Visual Representation, Visual Information Processing XI, Proc. SPIE 4736, (2002) (Invited paper), 11 pages.

Z. Rahman, D. J. Jobson, G. A. Woodell, and G. D. Hines, Multi-sensor fusion and enhancement using the Retinex image enhancement algorithm, Visual Information Processing XI, Proc. SPIE 4736, (2002), 9 pages.

Z. Rahman, D. J. Jobson, and G. A. Woodell, Retinex Processing for Automatic Image Enhancement, Human Vision and Electronic Imaging VII, SPIE Symposium on Electronic Imaging, Proc. SPIE 4662, (2002), 12 pages.

Z. Rahman, G. A. Woodell, and D. J. Jobson, Retinex Image Enhancement: Applications To Medical Images, presented at the NASA workshop on *New Partnerships in Medical Diagnostic Imaging*, Greenbelt, Maryland, Jul. 17, 2001, 24 pages.

D. J. Jobson, Z. Rahman, and G. A. Woodell, The Spatial Aspect of Color and Scientific Implications of Retinex Image Processing, SPIE International Symposium on AeroSense, Proceedings of the Conference on Visual Information Processing X, Apr. 2001, 13 pages.

N. Halyo, Z. Rahman, and S. K. Park, Information Content in Non-linear Local Normalization Processing of Digital Images, SPIE International Symposium on AeroSense, Proceedings of the Conference on Visual Information Processing X, Apr. 2001, 14 pages.

B. Thompson, Z. Rahman, and S. Park, A Multiscale Retinex for Improved Performance in Multispectral Image Classification, SPIE International Symposium on AeroSense, *Visual Information Processing IX*, Apr. 2000, 11 pages.

B. Thompson, Z. Rahman, and S. Park, Retinex Preprocessing for Improved Multi-spectral Image Classification, SPIE International Symposium on AeroSense, *Visual Information Processing VIII*, Apr. 1999, 11 pages.

Z. Rahman, D. J. Jobson, and G. A. Woodell, Resiliency of the Multiscale Retinex Image Enhancement Algorithm, Proceedings of the IS&T Sixth Annual Color Conference, Nov. 1998, 6 pages.

Z. Rahman, G. A. Woodell, and D. J. Jobson, A Comparison of the Multiscale Retinex With Other Image Enhancement Techniques, Proceedings of the IS&T 50th Anniversary Conference, May 1997, 6 pages.

Z. Rahman, D. J. Jobson, and G. A. Woodell, A Multiscale Rexinex for Color Rendition and Dynamic Range Compression, SPIE International Symposium on Optical Science, Engineering, and Instrumentation, *Conference on Signal and Image Processing*, 9 pages.

D. J. Jobson, Z. Rahman, and G. A. Woodell, Retinex Image Processing: Improved Fidelity to Direct Visual Observation, Proceedings of the IS&T Fourth Color Imaging Conference: Color Science, Systems, and Applications, (1996), 4 pages.

Z. Rahman, D. J. Jobson, and G. A. Woodell, Multi-scale Retinex for Color Image Enhancement, International Conference on Image Processing (ICIP) '96, 4 pages.

Z. Rahman, Properties of a Center/Surround Retinex: Part 1—Signal Processing Design, NASA Contractor Report 198194, Aug. 1995, 14 pages.

D. J. Jobson and G. A. Woodell, Properties of a Center/Surround Retinex: Part 2—Surround Design, NASA Technical Memorandum 110188, Aug. 1995, 14 pages.

Z. Rahman, D. J. Jobson, and G. A. Woodell, Retinex processing for automatic image enhancement, *Journal of Electronic Imaging*, Jan. 2004, pp. 100-110.

D. J. Jobson, Z. Rahman, and G. A. WOODEL, A Multiscale Retinex for Bridging the Gap Between Color Images and the Human Observation of Scenes, *IEEE Transactions on Image Processing: Special Issue on Color Processing*, Jul. 1997, pp. 965-976.

D. J. Jobson, Z. Rahman, and G. A. Woodell, Properties and Performance of a Center/Surround Retinex, *IEEE Transactions on Image Processing*, Mar. 1997, pp. 451-462.

Shadow Illuminator home page, http://www.intriguetek.com/, 2004, 2005 by Intrigue Technologies, Inc., 2 pages.

Shadow Illuminator Press Release, http://www.intriguetek.com/PR_101104.htm, Oct. 11, 2004,Intrigue Technologies, Inc., 2 pages.

Arce, G.R. and Foster, R.E., "Detail-Preserving Ranked-Order Based Filters for Image Processing", *IEEE Transactions on Acoustics, Speech and Signal Processing*, vol. 37(1), Jan. 1989, pp. 83-98.

Fitch, J.P., Coyle, E.J. and Gallagher, N.C., "Median Filtering by Threshold Decomposition", *IEEE Transactions on Acoustics, Speech and Signal Processing*, vol. 32(6), Dec. 1984, pp. 1183-1188.

Lee, Jong-Sen, "Digital Image Smoothing and the Sigma Filter", *Computer Vision, Graphics, and Image Processing*, vol. 24, 1983, pp. 255-269.

Saint-Marc, P., Chen, J.-S. and Medioni, G., "Adaptive Smoothing: A General Tool for Early Vision", *IEEE Transactions on Pattern Analysis and Machine Intelligence*, vol. 13(6), Jun. 1991, pp. 514-529.

Smith, S.M. And Brady, J.M., "SUSAN—A New Approach to Low Level Image Processing", *International Journal of Computer Vision*, vol. 23(1), 1997, pp. 45-78.

Yin, L., Yang, R., Gabbouj, M. and Neuvo, Y., "Weighted Median Filters: A Tutorial", *IEEE Transactions on Circuits and Systems-II: Analog and Digital Signal Processing*, vol. 43(3), Mar. 1996, pp. 157-192.

PCT Notification of the International Search Report and the Written Opinion of the International Searching Authority, or the Declaration, for PCT/CA2006/000591, date of mailing Aug. 2, 2006 (12 pages).

\* cited by examiner

IMAGE CONTRAST ENHANCEMENT

CROSS REFERENCES TO RELATED APPLICATIONS

This application is a continuation of U.S. application Ser. No. 11/502,551 filed on Aug. 9, 2006 now U.S. Pat. No. 8,228,560, which is a continuation-in-part of assignee's U.S. application Ser. No. 11/106,339, filed on Apr. 13, 2005, entitled "Local Contrast Enhancement" which issued on Sep. 6, 2011 as U.S. Pat. No. 8,014,034.

COMPUTER PROGRAM LISTING

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

Applicant has previously submitted Computer Program Listings which were included as Appendix A through Appendix G, on a compact disc, in prior application Ser. No. 11/502,551 filed on Aug. 9, 2006 and this information is incorporated herein by reference to the compact disc. The two compact discs are identical and include a "Copy 1" and "Copy 2" and are labeled respectively. The two discs contain the following appendices:

Appendix A, entitled "MODULE CLocalContrastEnhancement";
Appendix B, entitled MODULE IP_LocalMinMax;
Appendix C, entitled "MODULE CLCESimpleDlg;
Appendix D, entitled "MODULE CLCELightEQDlg";
Appendix E, entitled "MODULE CLCELightCurveDlg;
Appendix F, entitled "MODULE CLCELightCurveCtl" and
Appendix G, entitled "MODULE CLCELightCurve," all incorporated herein by reference.

FIELD OF THE INVENTION

The present invention relates to the field of digital image processing, and more particularly to enhancement of digital images.

BACKGROUND OF THE INVENTION

Digital image enhancement concerns applying operations to a digital image in order to improve a picture, or restore an original that has been degraded. Digital image enhancement dates back to the origins of digital image processing. Unlike film-based images, digital images can be edited interactively at will, and detail that is indiscernible in an original image can be brought out.

It is often the case that illumination of a subject is uneven, and a scene may appear two dark in some areas while too bright in other areas. Images that appear too dark because of poor illumination or too bright because of over illumination can be restored to accurately reflect the original scene.

Enhancement techniques involve digital image processing and can include inter alia filtering, morphology, composition of layers and random variables. Conventional image processing software often includes a wide variety of familiar editing tools used for enhancing an image, such as edge sharpening, smoothing, blurring, histogram equalization, gamma correction, dithering, color palate selection, paint brush effects and texture rendering. Generally, enhancement techniques include one or more parameters, which a user can dynamically adjust to fine-tune the enhanced image.

Several factors distinguish one enhancement technique over another, including inter alia (i) visual quality of the enhanced image, (ii) robustness, (iii) speed and (iv) ease of use. Requirements (ii) and (iv) generally conflict, since the ability to enhance a variety of different types of imagery generally requires a large number of complex adjustable parameters, where ease of use requires a small number of simple adjustable parameters, each of which is intuitive in its effect on the enhanced image. Regarding requirement (iii), for interactive image editing applications, wherein a user repeatedly adjusts enhancement parameters and watches as the enhanced image changes, if the enhancement operation takes more than a fraction of a second to complete, the performance becomes sluggish, and the capability of accurately fine-tuning the enhancement as desired deteriorates. This speed requirement, together with the proliferation of mega-pixel color images, makes design of an enhancement algorithm quite challenging.

Contrast enhancement is a particular aspect of image enhancement that concerns color variations that are not clearly discernible within an image, because of dark shadows or bright highlights. Because of the eye's relative insensitivity to variations in dark colors and variations in bright colors, important details within an image can be missed. Conventional contrast enhancement involves transfer functions, applied as point-wise operations, for expanding dynamic range in some parts of the color spectrum and compressing dynamic range in other parts, and involves gamma correction for adjusting brightness and contrast.

U.S. Pat. Nos. 6,633,684 and 6,677,959 to James describe contrast enhancement by fitting an original source image, such as an x-ray, between upper and lower low frequency images, and expanding the dynamic color range locally to an interval of color values between the lower and upper frequency image color values. Such expansion serves to visually amplify subtle variations in color value between the lower and upper frequency image color values.

SUMMARY OF THE DESCRIPTION

The present invention concerns a novel method and system for image enhancement that uses one or more filtered images to generate offsets and multipliers for adjusting pixel color values. Unlike prior art point-wise operations and prior art global enhancement operations, the image enhancement of the present invention is a local enhancement process, which is sensitive to characteristics of local pixel neighborhoods as well as to characteristics of an image as a whole. The image enhancement of the present invention can be controlled through adjustable user parameters that perform compression and amplitude adjustment for both shadow portions and highlight portions of an original image. These parameters are intuitive and easy to adjust.

The present invention can be implemented extremely efficiently, so as to achieve real-time performance whereby image enhancement is performed within a fraction of a second immediately upon adjustment of a user parameter, for multi-mega-pixel images captured by today's digital cameras. As such, a user is provided with continuous real-time feedback, which enables extremely accurate fine-tuning of the enhancement. Using the present invention, a user is able to instantly compare an enhanced image with a source image, and compare one enhanced image with another enhanced image.

Experimental results have shown that the present invention is robust, and yields excellent quality results, even for images where most of the detail is obscured in shadows or bright highlights.

Specifically, the present invention generates two response curves, one for brightening and one for darkening, each a function of color value. Values of the response curves are used as multipliers and offsets for pixel color values. A "brightening response curve", denoted $f_{BR}$, is a curve with values greater than or equal to one, and each point on the curve is used as a multiplier, denoted $g_{max}$. When $g_{max}$ is applied to color values of an image, it visually brightens and amplifies color variation; i.e., it increases contrast.

A "darkening response curve", denoted $f_{DR}$, is also a curve with values greater than or equal to one. Each point on the curve is used as a darkening multiplier, denoted $g_{min}$, and is additionally used to determine a negative darkening offset, denoted $g_{offset}$. When $g_{offset}$ and $g_{min}$ are applied to color values of an image, they visually darken and amplify color variation; i.e., they increase contrast.

The brightening response curve $f_{BR}$ is primarily responsible for bringing out detail in shadow areas of an image through brightening, and the darkening response $f_{DR}$ curve is primarily responsible for bringing out detail in highlight areas of an image through darkening. Both curves serve to increase contrast.

In accordance with an embodiment of the present invention, the brightening multipliers $g_{max}$, applied at each pixel in an image, are derived from the value of the brightening response curve $f_{BR}$ at the corresponding pixel in a first filtered image. Similarly, the darkening multipliers $g_{min}$, also applied at each pixel in the image, are derived from the value of the darkening response curve $f_{DR}$ at the corresponding pixel in a second filtered image. In one embodiment of the present invention, the first filtered image is a filter of an image of maximum source color values and the second filtered image is a filter of an image of minimum source color values. In another embodiment of the present invention, the first and second filtered images are filters of an image of source luminance values.

The present invention includes several user interfaces for efficiently visualizing and generating brightening and darkening response curves. The response curves are built from basic shape functions, such as power curves and Gaussian distributions, and adjusted by setting intuitive color compression, amplitude and out-of-range clipping factor parameters. The response curves can also be adjusted directly by a user.

The present invention also includes automated adjustment of response curve parameters, triggered when a user clicks on a local area within an image. The response curve parameters are then automatically adjusted to give maximum brightening/darkening of that local area of the image selected by the user. Such automated adjustment is particularly useful for mobile and wireless computing devices, including inter alia digital capture image devices, with limited user interface capabilities. It may be appreciated by those skilled in the art that the ability to modify response curves by working directly on the image, such as by pointing and using a mouse wheel or clicking or dragging, provides a very intuitive way to adjust images.

In one embodiment, the present invention provides automatic image enhancement without any directives from a user, based only on an original source image.

The present invention includes efficient statistical processing for predicting, given an original source image and a response curve, the percentage of pixels of the corresponding enhanced image that will be clipped to avoid having out-of-range color values. Using such prediction, one can determine appropriate response curve multipliers so that the enhanced image will have a prescribed percentage of clipped color values. Such multipliers in turn are used to generate optimal response curves, which apply maximum brightening or darkening to local areas of the source image while controlling the amount of out-of-range clipping that will occur in the enhanced image.

Although clipping in general may lead to distortion that can cause loss of detail, in many cases allowing a small degree of clipping in certain areas of an image, such as specular highlights or areas with insignificant detail, allows for a more attractive output image than would be possible if clipping were to be avoided altogether. As such, when brightening or darkening an image, it is important to permit some degree of clipping, but to carefully control the effects of clipping.

There is thus provided in accordance with an embodiment of the present invention a method for contrast enhancement for digital images, including filtering an original image having original color values, to generate a first filtered image corresponding to bright color values, and a second filtered image corresponding to dark color values, receiving parameters for a brightening response curve, the brightening response curve being a function of color value that is user-adjustable, receiving parameters for a darkening response curve, the darkening response curve being a function of color value that is user-adjustable, deriving local brightening multipliers by applying the brightening response curve to the first filtered image, deriving local darkening offsets and local darkening multipliers by applying the darkening response curve to the second filtered image, and processing the original image, comprising subtracting the local darkening offsets from the original color values to generate shifted color values, multiplying the shifted color values by the local brightening multipliers, and further multiplying the shifted color values by the local darkening multipliers, thereby generating a contrast-enhanced image from the original image.

There is further provided in accordance with an embodiment of the present invention a system for enhancing contrast of digital images, including a filter processor for filtering an original image having original color values, to generate a first filtered image corresponding to bright color values, and a second filtered image corresponding to dark color values, a user interface (i) for receiving parameters for a brightening response curve, the brightening response curve being a function of color value that is user-adjustable, and (ii) for receiving parameters for a darkening response curve, the darkening response curve also being a function of color value that is user-adjustable, and an image enhancer coupled to the filter processor and to the user interface (i) for deriving local brightening multipliers by applying the brightening response curve to the first filtered image, (ii) for deriving local darkening offsets and local darkening multipliers by applying the darkening response curve to the second filtered image, (iii) for subtracting the local darkening offsets from the original color values to generate shifted color values, (iv) for multiplying the shifted color values by the local brightening multipliers, and (vi) for further multiplying the shifted color values by the local darkening multipliers, thereby generating a contrast-enhanced image from the original image.

There is yet further provided in accordance with an embodiment of the present invention a computer-readable storage medium storing program code for causing a computer to filter an original image having original color values, to generate a first filtered image corresponding to bright color values, and a second filtered image corresponding to dark color values, to receive parameters for a brightening response curve, the brightening response curve being a function of color value that is user-adjustable, to receive parameters for a darkening response curve, the darkening response curve being a function of color value that is user-adjustable, to derive local brightening multipliers by applying the brightening response curve to the first filtered image, to derive local darkening offsets and local darkening multipliers by applying the darkening response curve to the second filtered image, and to process the original image, including to subtract the local darkening offsets from the original color values to generate shifted color values, to multiply the shifted color values by the local brightening multipliers, and to further multiply the shifted color values by the local darkening multipliers, thereby generating a contrast-enhanced image from the original image.

There is moreover provided in accordance with an embodiment of the present invention a method for contrast enhancement for digital images, including filtering an original image having original color values, to generate a first filtered image corresponding to bright color values, and a second filtered image corresponding to dark color values, receiving parameters for a brightening response curve, the brightening response curve being a function of color value that is user-adjustable, receiving parameters for a darkening response curve, the darkening response curve being a function of color value that is user-adjustable, deriving local brightening multipliers by applying the brightening response curve to the first filtered image, deriving local darkening offsets and local darkening multipliers by applying the darkening response curve to the second filtered image, and processing the original image, including multiplying the original color values by the local brightening multipliers to generate scaled color values, subtracting the local darkening offsets from the scaled color values to generate shifted color values, and multiplying the shifted color values by the local darkening multipliers, thereby generating a contrast-enhanced image from the original image.

There is additionally provided in accordance with an embodiment of the present invention a system for enhancing contrast of digital images, including a filter processor for filtering an original image having original color values, to generate a first filtered image corresponding to bright color values, and a second filtered image corresponding to dark color values, a user interface (i) for receiving parameters for a brightening response curve, the brightening response curve being a function of color value that is user-adjustable, and (ii) for receiving parameters for a darkening response curve, the darkening response curve also being a function of color value that is user-adjustable, and an image enhancer coupled to the filter processor and to the user interface (i) for deriving local brightening multipliers by applying the brightening response curve to the first filtered image, (ii) for deriving local darkening offsets and local darkening multipliers by applying the darkness response curve to the second filtered image, (iii) for multiplying the original color values by the local brightening multipliers to generated scaled color values, (iv) for subtracting the local darkening offsets from the scaled color values to generate shifted color values, and (v) for further multiplying the shifted color values by the local darkening multipliers, thereby generating a contrast-enhanced image from the original image.

There is further provided in accordance with an embodiment of the present invention a computer readable storage medium storing program code for causing a computer to filter an original image having original color values, to generate a first filtered image corresponding to bright color values, and a second filtered image corresponding to dark color values, to receive parameters for a brightening response curve, the brightening response curve being a function of color value that is user-adjustable, to receive parameters for a darkening response curve, the darkening response curve being a function of color value that is user-adjustable, to derive local brightening multipliers by applying the brightness response curve to the first filtered image, to derive local darkening offsets and local darkening multipliers by applying the darkening response curve to the second filtered image, and to process the original image, including to multiply the original color values by the local brightening multipliers to generate scaled color values, to subtract the local darkening offsets from the scaled color values to generate shifted color values, and to multiply the shifted color values by the local darkening multipliers, thereby generating a contrast-enhanced image from the original image.

There is yet further provided in accordance with an embodiment of the present invention a method for contrast enhancement for digital images, including filtering an original image having original color values, to generate a filtered image receiving parameters for a response curve, the response curve being a function of color value that is user-adjustable, deriving local multipliers by applying the response curve to the filtered image, deriving local offset values from the local multipliers, and processing the original image, including subtracting the local offset values from the original color values to generate shifted color values, and multiplying the shifted color values by the local multipliers, thereby generating a contrast-enhanced image from the original image.

There is moreover provided in accordance with an embodiment of the present invention a method for contrast enhancement for digital images, including filtering an original image having original color values, to generate a filtered image, receiving parameters for a response curve, the response curve being a function of color value that is user-adjustable, deriving local multipliers by applying the response curve to the filtered image, deriving local offset values from the local multipliers, and processing the original image, including multiplying the original color values by the local multipliers to generate scaled color values, and subtracting the local offset values from the scaled color values, thereby generating a contrast-enhanced image from the original image.

There is additionally provided in accordance with an embodiment of the present invention a method for contrast enhancement for digital images, including filtering an original image having original color values, to generate a filtered image, receiving parameters for a response curve, the response curve being a function of color value that is user-adjustable, deriving local multipliers by applying the response curve to the filtered image, multiplying the original color values by the local multipliers, thereby generating a contrast-enhanced image from the original image.

There is further provided in accordance with an embodiment of the present invention a system for enhancing contrast of digital images, including a filter processor for filtering an original image having original color values, to generate a filtered image, a user interface for receiving parameters for a response curve, the response curve being a function of color value that is user-adjustable, and an image enhancer coupled to the filter processor and to the user interface (i) for deriving local multipliers by applying the response curve to the first filtered image, (ii) for deriving local offset values from the local multipliers, (iii) for subtracting the local offset values from the original color values to generate shifted color values, and (iv) for multiplying the shifted color values by the local multipliers, thereby generating a contrast-enhanced image from the original image.

There is yet further provided in accordance with an embodiment of the present invention a system for enhancing contrast of digital images, including a filter processor for filtering an original image having original color values, to generate a filtered image, a user interface for receiving parameters for a response curve, the response curve being a function of color value that is user-adjustable, and an image enhancer coupled to the filter processor and to the user interface (i) for deriving local multipliers by applying the response curve to the first filtered image, (ii) for deriving local offset values from the local multipliers, (iii) for multiplying the original color values by the local multipliers to generate scaled color values, and (iv) for subtracting the local offset values from the scaled color values, thereby generating a contrast-enhanced image from the original image.

There is moreover provided in accordance with an embodiment of the present invention a system for enhancing contrast of digital images, including a filter processor for filtering an original image having original color values, to generate a filtered image, a user interface for receiving parameters for a response curve, the response curve being a function of color value that is user-adjustable, and an image enhancer coupled to the filter processor and to the user interface (i) for deriving local multipliers by applying the response curve to the filtered image, and (ii) for multiplying the original color values by the local multipliers, thereby generating a contrast-enhanced image from the original image.

There is additionally provided in accordance with an embodiment of the present invention a computer readable storage medium storing program code for causing a computer to filter an original image having original color values, to generate a filtered image, to receive parameters for a response curve, the response curve being a function of color value that is user-adjustable, to derive local multipliers by applying the response curve to the filtered image, to derive local offset values from the local multipliers, and to process the original image, including to subtract the local offset values from the original color values to generate shifted color values, and to multiply the shifted color values by the local multipliers, thereby generating a contrast-enhanced image from the original image.

There is further provided in accordance with an embodiment of the present invention a computer readable storage medium storing program code for causing a computer to filter an original image having original color values, to generate a filtered image, to receive parameters for a response curve, the response curve being a function of color value that is user-adjustable, to derive local multipliers by applying the response curve to the filtered image, to derive local offset values from the local multipliers, and to process the original image, including to multiply the original color values by the local multipliers to generate scaled color values, and to subtract the local offset values from the scaled color values, thereby generating a contrast-enhanced image from the original image.

There is yet further provided in accordance with an embodiment of the present invention a computer readable storage medium storing program code for causing a computer to filter an original image having original color values, to generate a filtered image, to receive parameters for a response curve, the response curve being a function of color value that is user-adjustable, to derive local multipliers by applying the response curve to the filtered image, and to multiply the original color values by the local multipliers, thereby generating a contrast-enhanced image from the original image.

There is moreover provided in accordance with an embodiment of the present invention a method for contrast enhancement for digital images, including filtering an original image, I, having original color values, to generate a first filtered image, $W_b$, corresponding to bright color values, and a second filtered image, $W_d$, corresponding to dark color values, receiving parameters for a brightening operation, the brightening operation being a function $f_b(W, I)$ that is user-adjustable, receiving parameters for a darkening operation, the darkening operation being a function $f_d(W, I)$ that is user-adjustable, and processing the original image by first darkening and then brightening, to obtain an enhanced image, $I_{enhanced}$, according to $I_{enhanced} = f_b(W_b, f_d(W_d, I))$.

There is additionally provided in accordance with an embodiment of the present invention a method for contrast enhancement for digital images, including filtering an original image, I, having original color values, to generate a first filtered image, $W_b$, corresponding to bright color values, and a second filtered image, $W_d$, corresponding to dark color values, receiving parameters for a brightening operation, the brightening operation being a function $f_b(W, I)$ that is user-adjustable, receiving parameters for a darkening operation, the darkening operation being a function $f_d(W, I)$ that is user-adjustable, and processing the original image by first brightening and then darkening to obtain an enhanced image, $I_{enhanced}$, according to $I_{enhanced} = f_d(W_d, f_b(W_b, I))$.

There is further provided in accordance with an embodiment of the present invention a system for enhancing contrast of digital images, including a filter processor for filtering an original image, I, having original color values, to generate a first filtered image, $W_b$, corresponding to bright color values, and a second filtered image, $W_d$, corresponding to dark color values, a user interface (i) for receiving parameters for a brightening operation, the brightening operation being a function $f_b(W, I)$ that is user-adjustable, and (ii) for receiving parameters for a darkening operation, the darkening operation being a function $f_d(W, I)$ that is user-adjustable, and an image enhancer coupled to the filter processor and to the user interface for processing the original image by first brightening and then darkening to obtain an enhanced image, $I_{enhanced}$, according to $I_{enhanced} = f_d(W_d, f_b(W_b, I))$.

There is yet further provided in accordance with an embodiment of the present invention a system for enhancing contrast of digital images, including a filter processor for filtering an original image, I, having original color values, to generate a first filtered image, $W_b$, corresponding to bright color values, and a second filtered image, $W_d$, corresponding to dark color values, a user interface (i) for receiving parameters for a brightening operation, the brightening operation being a function $f_b(W, I)$ that is user-adjustable, and (ii) for receiving parameters for a darkening operation, the darkening operation being a function $f_d(W, I)$ that is user-adjustable, and an image enhancer coupled to the filter processor and to the user interface for processing the original image by first darkening and then brightening to obtain an enhanced image, $I_{enhanced}$, according to $I_{enhanced} = f_b(W_b, f_d(W_d, I))$.

There is moreover provided in accordance with an embodiment of the present invention a computer readable storage medium storing program code for causing a computer to filter an original image, I, having original color values, to generate a first filtered image, $W_b$, corresponding to bright color values, and a second filtered image, $W_d$, corresponding to dark color values, to receive parameters for a brightening operation, the brightening operation being a function $f_b(W, I)$ that is user-adjustable, to receive parameters for a darkening operation, the darkening operation being a function $f_d(W, I)$ that is user-adjustable, and to process the original image by first darkening and then brightening, to obtain an enhanced image, $I_{enhanced}$, according to $I_{enhanced} = f_b(W_b, f_d(W_d, I))$.

There is additionally provided in accordance with an embodiment of the present invention a computer readable storage medium storing program code for causing a computer to filter an original image, I, having original color values, to generate a first filtered image, $W_b$, corresponding to bright color values, and a second filtered image, $W_d$, corresponding to dark color values, to receive parameters for a brightening operation, the brightening operation being a function $f_b(W, I)$ that is user-adjustable, to receive parameters for a darkening operation, the darkening operation being a function $f_d(W, I)$ that is user-adjustable, and to process the original image by first brightening and then darkening, to obtain an enhanced image, $I_{enhanced}$, according to $I_{enhanced} = f_d(W_d, f_b(W_b, I))$.

There is further provided in accordance with an embodiment of the present invention a method for generating a response curve for image enhancement, including receiving an original digital image, $I_{source}$, the digital image including a array of pixels, each pixel having a location and at least one color value, wherein each color value lies within an interval [0,S] ranging from a lower bound of 0 to an upper bound of S, selecting a basic shape function for a response curve, f, used to enhance the original image, the response curve including multipliers, f(V), for multiplying color values of the pixels from the original image $I_{source}$ so as to generate an enhanced image, $I_{enhanced}$, where V itself is an array of pixel color values, determining a multiplier, m, for the response curve f, such that if the response curve f is scaled by the multiplier m, then approximately a percentage, P, of the pixels in the resulting enhanced image $I_{enhanced}$ have color values that fall out of the range [0,S], where the parameter P is a prescribed percentage.

There is yet further provided in accordance with an embodiment of the present invention a system for generating a response curve for image enhancement, including a storage for storing an original digital image, $I_{source}$, the digital image including a array of pixels, each pixel having a location and at least one color value, wherein each color value lies within an interval [0,S] ranging from a lower bound of 0 to an upper bound of S, a response curve generator for selecting a basic shape function for a response curve, f, used to enhance the original image, the response curve including multipliers, f(V), for multiplying color values of the pixels from the original image $I_{source}$ so as to generate an enhanced image, $I_{enhanced}$, where V itself is an array of pixel color values, and a statistical processor for determining a multiplier, m, for the response curve f, such that if the response curve f is scaled by the multiplier m, then approximately a percentage, P, of the pixels in the resulting enhanced image $I_{enhanced}$ have color values that fall out of the range [0,S], where the parameter P is a prescribed percentage.

There is moreover provided in accordance with an embodiment of the present invention a computer readable storage medium storing program code for causing a computer to receive an original digital image, $I_{source}$, the digital image including a array of pixels, each pixel having a location and at least one color value, wherein each color value lies within an interval [0,S] ranging from a lower bound of 0 to an upper bound of S, to select a basic shape function for a response curve, f, used to enhance the original image, the response curve including multipliers, f(V), for multiplying color values of the pixels from the original image $I_{source}$ so as to generate an enhanced image, $I_{enhanced}$, where V itself is an array of pixel color values, and to determine a multiplier, m, for the response curve f, such that if the response curve f is scaled by the multiplier m, then approximately a percentage, P, of the pixels in the resulting enhanced image $I_{enhanced}$ have color values that fall out of the range [0,S], where the parameter P is a prescribed percentage.

There is additionally provided in accordance with an embodiment of the present invention a method for enhancing contrast of digital images within a mobile image capture device, including filtering an original image captured by a mobile image capture device, to generate a filtered image, deriving local contrast enhancement parameters by applying a response curve to the filtered image, and processing the original image by applying the local contrast enhancement parameters thereto, to generate a contrast-enhanced image.

There is further provided in accordance with an embodiment of the present invention a method for enhancing contrast of digital images within a mobile image capture device, including filtering an original image captured by a mobile image capture device, to generate a filtered original image, deriving local contrast enhancement parameters by applying a response curve to the filtered original image, processing the original image by applying the local contrast enhancement parameters thereto, to generate a contrast-enhanced image, storing the contrast-enhanced image within the mobile image capture device, and storing the response curve within the mobile image capture device, as meta-data of the contrast-enhanced image.

There is yet further provided in accordance with an embodiment of the present invention a system for enhancing contrast of digital images within a mobile image capture device, including a filter processor housed within a mobile image capture device, for filtering an original image captured by the mobile image capture device, to generate a filtered image, and an image enhancer housed within the mobile image capture device and coupled with the filter processor, for (i) deriving local contrast enhancement parameters by applying a response curve to the filtered image, and (ii) processing the original image by applying the local contrast enhancement parameters thereto, to generate a contrast-enhanced image.

There is moreover provided in accordance with an embodiment of the present invention a system for enhancing contrast of digital images within a mobile image capture device, including a filter processor housed within a mobile image capture device, for filtering an original image captured by the mobile image capture device, to generate a filtered original image, an image enhancer housed within the mobile image capture device and coupled with the filter processor, for (i) deriving local contrast enhancement parameters by applying a response curve to the filtered original image, and (ii) processing the original image by applying the local contrast enhancement parameters thereto, to generate a contrast-enhanced image, and a memory housed within the mobile image capture device and coupled with the filter processor and the image enhancer, for storing (i) the contrast-enhanced image, and (ii) the response curve, as meta-data of the contrast-enhanced image.

There is additionally provided in accordance with an embodiment of the present invention a computer readable storage medium storing program code for causing a computer to filter an original image captured by a mobile image capture device, to generate a filtered image, to derive local contrast enhancement parameters by applying a response curve to the filtered image, and to process the original image by applying the local contrast enhancement parameters thereto, to generate a contrast-enhanced image.

There is further provided in accordance with an embodiment of the present invention a computer readable storage medium storing program code for causing a computer to filter an original image captured by a mobile image capture device, to generate a filtered image, to derive local contrast enhancement parameters by applying a response curve to the filtered image, to process the original image by applying the local contrast enhancement parameters thereto, to generate a contrast-enhanced image, to store the contrast-enhanced image within the mobile image capture device, and to store the response curve within the mobile image capture device, as meta-data of the contrast-enhanced image.

There is yet further provided in accordance with an embodiment of the present invention a system for enhancing contrast of digital images, including a server computer including a filter processor for filtering an input image, $I_{input}$, to generate a filtered image, $W_{input}$, an image enhancer for processing $I_{input}$ by brightening or darkening to obtain an enhanced image, $I_{output}$, according to $I_{output}=f(W_{input}, I_{input})$, where the function f is a brightening response curve or a darkening response curve, an image sub-sampler coupled with the image enhancer for processing an original high-resolution image to obtain a lower resolution image therefrom, a transmitter coupled with the image sub-sampler for transmitting a sub-sampled image to a client computer for display, and a receiver coupled with the image enhancer for receiving from the client computer at least one parameter p used to determine the function f, a client computer connected to the server computer via a computer network, including a receiver for receiving a sub-sampled image from the server computer, a user interface coupled with the client receiver enabling a user to view the received sub-sampled image and to adjust the at least one parameter p, based on the appearance of the received sub-sampled image, and a transmitter coupled with the user interface for transmitting the adjusted at least one parameter p to the server computer.

There is moreover provided in accordance with an embodiment of the present invention a system for enhancing contrast of digital images, including a server computer including a filter processor for filtering an original high-resolution image, I, to generate a filtered image, W, an image enhancer for processing the image I by brightening or darkening to obtain an enhanced image, $I_{enhanced}$, according to $I_{enhanced}=f(W, I)$, where the function f is a brightening response curve or a darkening response curve, an image sub-sampler coupled with the image enhancer for processing the original high-resolution image to obtain an original lower resolution image, $I_{sub}$, therefrom, a transmitter coupled with the image sub-sampler for transmitting the original lower resolution image $I_{sub}$ to a client computer for processing, and a receiver coupled with the image enhancer for receiving the function f from the client computer, a client computer connected to the server computer via a computer network, including a receiver for receiving the original lower resolution image $I_{sub}$ from the server computer, a filter processor for filtering the original lower resolution image $I_{sub}$, to generate a filtered image, $W_{sub}$, an image enhancer (i) for setting and adjusting the function f, and (ii) for processing the image $I_{sub}$ by brightening or darkening to obtain an enhanced lower resolution image, $I_{sub-enhanced}$, according to $I_{sub-enhanced}=f(W_{sub}, I_{sub})$, and a transmitter coupled with the user interface for transmitting the function f to the server computer.

Although U.S. Pat. Nos. 6,633,684 and 6,677,959 to James describe use of upper and lower low frequency images, in distinction to James the present invention generates response curves for use as multipliers and offsets, whereas James users the upper and lower low frequency images for local scaling of dynamic range.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention will be more fully understood and appreciated from the following detailed description, taken in conjunction with the drawings in which.

LIST OF APPENDICES

Figure 1A:
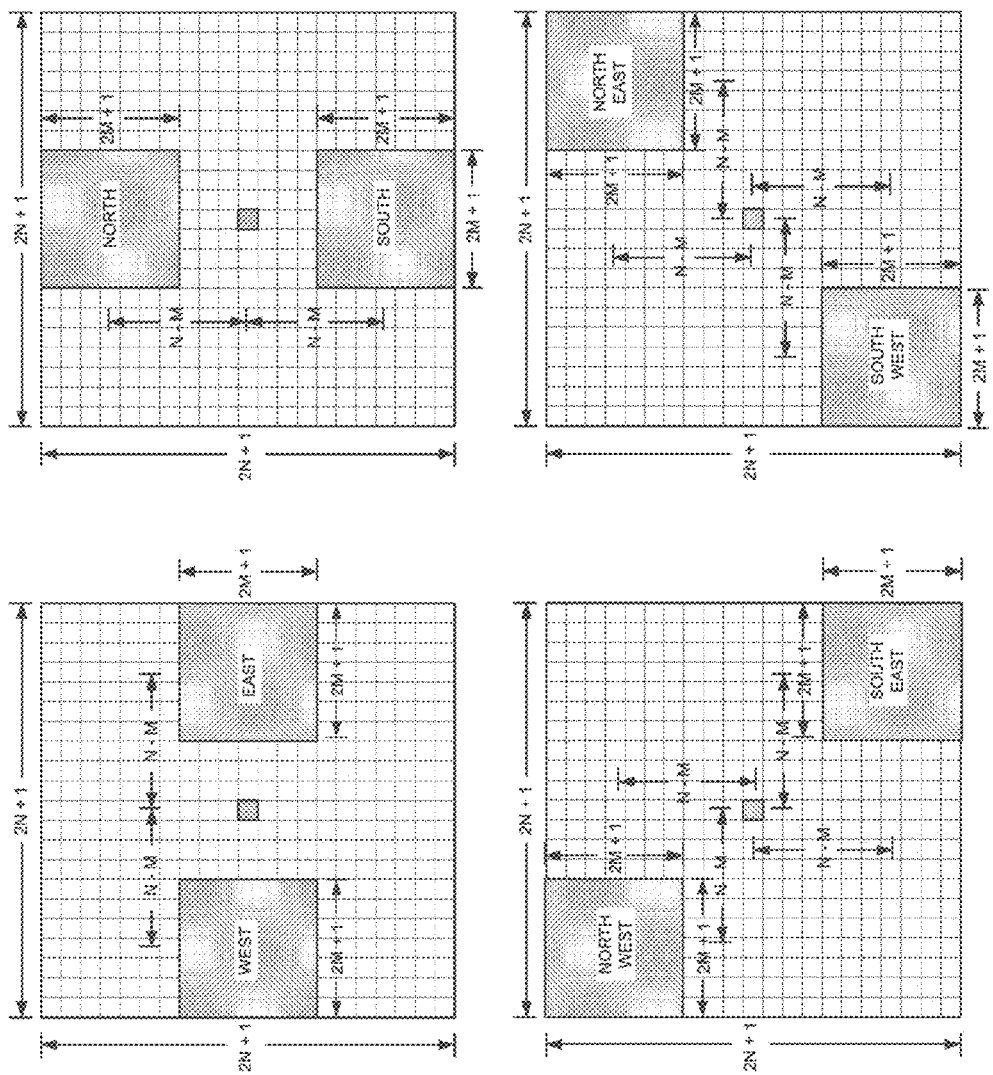
FIG. 1A is an illustration of filter windows and sub-filter windows used in deriving a median filtered image, in accordance with an embodiment of the present invention.

Applicant has previously submitted Computer Program Listings which were included as Appendix A through Appendix G, on a compact disc, in prior application Ser. No. 11/502,551 filed on Aug. 9, 2006 and this information is incorporated herein by reference.

APPENDIX A is a detailed listing of computer source code written in the C++ programming language for implementing contrast enhancement, in accordance with an embodiment of the present invention;

APPENDIX B is a detailed listing of computer source code written in the C++ programming language for implementing a median and a weighted average filter, in accordance with an embodiment of the present invention;

APPENDIX C is a detailed listing of computer source code written in the C++ programming language for managing a Brighten & Darken user interface, in accordance with an embodiment of the present invention;

APPENDIX D is a detailed listing of computer source code written in the C++ programming language for managing a Light Equalizer user interface, in accordance with an embodiment of the present invention;

APPENDIX E is a detailed listing of computer source code written in the C++ programming language for managing the Light Curves user interface, in accordance with an embodiment of the present invention;

APPENDIX F is a detailed listing of computer source code written in the C++ programming language for visualizing response curves and for accepting user input directed within a visualization area, in accordance with an embodiment of the present invention; and APPENDIX G is a detailed listing of computer source code written in the C++ programming language for generating and modifying response curves, in support of user interfaces, in accordance with an embodiment of the present invention.

DETAILED DESCRIPTION

The description that follows has much technical detail, and in order to clarify the presentation it is divided into sections as follows.

Sec. 1: Image Enhancement Phase One
  This section describes a first phase of image enhancement, related to generation of filtered images of an original source image, the filtered images being used to obtain local maximum and minimum color values.
  Sec. 1.1: Modified Median Filter
    This subsection describes a variation of a median filter that is well suited for obtaining low frequency local color values for use with the response curves of the present invention.
    Sec. 1.1.1: Modified Median Filter—Grayscale Source Image
      This subsection describes use of a median filter to derive a filtered image from a grayscale source image.
    Sec. 1.1.2: Modified Median Filter with Filtered Luminance Image—Color Source Image
      This subsection describes use of a median filter to derive a filtered image from a color source image, based on the luminance values of the color source image.
    Sec. 1.1.3: Modified Median Filter with Filtered Minimum and Maximum Images—Color Source Image
      This subsection describes use of a median filter to derive two filtered images from a color source image, based on the maximum and minimum color values of the color source image. The two filtered images are used to provide local maximum and minimum color values at each pixel location.
  Sec. 1.2: Modified Weighted Average Filter
    This subsection describes a weighted average filter with weights that are inversely related to a gradient of image color values, that is also well suited for obtaining low frequency local color values for use with the response curves of the present invention.
Sec. 2: Image Enhancement Phase Two
  This section describes use of brightening and darkening response curves that are composed with filtered images and applied to an original source image, used to enhance the original source image.
  Sec. 2.1: Grayscale Images
    This subsection describes the enhancement equations for grayscale images, based on a brightening and a darkening response curve that are evaluated at color values in a filtered image.
  Sec. 2.2: Color Images
    This subsection describes the enhancement equations for color images, based on a brightening and a darkening response curve that are evaluated at color values in filtered images that include local maximum and minimum color values, respectively.
Sec. 3: Construction of Brightness and Darkness Response Curves
  This section describes generation of a brightening response curve and a darkening response curve using six native parameters for a local contrast enhancement model; namely, a compression, amplitude and clipping factor parameter for each response curve.
  Sec. 3.1: Basic Shape Curves
    This subsection describes the use of basic shape curves to generate corresponding appropriate brightening and darkening response curves.
Sec. 4: Visualization of Brightening and Darkening Response Curves
  This section describes a user interface for effective visualization and recognition of brightening and darkening response curves.
  Sec. 4.1: Compression & Amplitude User Interface
    This subsection describes a user interface that enables a user to adjust the brightening and darkening response curves using four user parameters; namely, a compression and an amplitude parameter for each response curve, and their relationships to the six native model parameters.
  Sec. 4.2: Brighten & Darken User Interface
    This subsection describes a user interface that enables a user to adjust the brightening and darkening response curves using two user parameters; namely, a brighten and a darken parameter, and their relationships to the six native model parameters.
  Sec. 4.3: Light Curves User Interface
    This subsection describes a user interface that enables a user to directly modify the brightening and darkening response curves by dragging them upwards or downwards, or by clicking on a pixel location with the image or by clicking within a response curve visualization panel.
  Sec. 4.4: Light Equalizer User Interface
    This subsection describes a user interface that resembles an audio equalizer interface whereby the response curves are divided into several bands, and each band can be independently adjusted.
Sec. 5: Implementation Details
  This section describes efficient computational algorithms used to perform various stages of image enhancement.
  Sec. 5.1: Filter Processing
    This subsection describes computation of filtered images using a modified median filter or a modified weighted average filter, as discussed in Secs. 1.1 and 1.2.
  Sec. 5.2: Statistical Processing
    This subsection describes determination of the number of pixel color values of an enhanced image that fall out of range, based on given brightening and darkening response curves.
  Sec. 5.3: Fully Automated Compression Settings
    This subsection describes an embodiment of the present invention that automatically determines compression settings for enhancing an original source image, without any directives from a user.
Sec. 6: Discussion of Experimental Results
  This section describes test results for local contrast image enhancement using the present invention.

Sec. 7: Discussion of Appendices

This section describes the software listings in APPENDICES A-G, for local contrast enhancement.

Sec. 8: Application of Invention to Enhancing Groups of Images and Motion Video

This section describes how the present invention is used to enhance the contrast of groups of images and of motion video.

Sec. 9: Application of Invention to Image Capture Devices

This section describes how the present invention is implemented within image capture devices, and how the original and enhanced images are stored therewithin.

Sec. 10: Application of Invention to Selecting Regions of Interest

This section describes use of filtered images of the present invention for region of interest selection.

Sec. 11: Application of Invention to Contrast Enhancement of Regions of Interest This section describes confining local contrast enhancement of the present invention to a selected region of interest.

Sec. 12: Application of Invention to other Enhancement Filters

This section describes use of the present invention to other types of image enhancement, in addition to contrast enhancement.

Sec. 13: Server-Client Embodiments of Contrast Enhancement

This section describes distributed server-client architectures for performing local contrast enhancement, which take advantage of resolution independent features of the present invention, and its ability to operate with simple user interfaces.

The present invention may be embodied in a general-purpose consumer-grade computer, including a processor for executing an image-processing software application, a memory for storing program code and for storing one or more digital images, one or more input devices such as a keyboard and a mouse for enabling a user to interact with the software application, a display device, and a bus for intercommunication between these components. Typically, the processor (or a set of processors) is coupled to the memory and the input device(s), and the display device and the bus. The computer may also include an interface for receiving digital images from a scanner and from a digital camera, and a network connection for receiving and transmitting digital images over the Internet. The present invention can be embodied in mobile computing devices, in Internet appliances such as electronic picture frames, within vehicles such as airplanes, and within image acquisition equipment such as digital cameras, mobile telephones and other mobile devices with embedded digital cameras, and medical scanners. The present invention can be implemented in a client-server model on a pair of computers connected via a network. The present invention can be implemented in software or in general-purpose or special-purpose hardware, or in a software-hardware combination.

The present invention operates by processing an original source image and deriving a contrast-enhanced image therefrom. The present invention applies to grayscale and color images, with arbitrary color depth. In one embodiment, the present invention includes two phases; namely, a first phase ("Phase One") for deriving one or more filtered images, and a second phase ("Phase Two") for using the one or more filtered images to derive local brightening and darkening multipliers, and local darkening offset values, for each pixel location of the original source image. The enhancement process subtracts the local offset values from color values of the original source image, and multiplies the resulting differences by the local brightening and darkening multipliers.

The brightening and darkening multipliers are derived from brightening and darkening response curves that visually amplify color variation in portions of the source image. The darkening offset values are determined so that the darkening multipliers stretch the contrast of pixels away from the maximum color value.

The brightening response curve, denoted $f_{BR}$, is a function f(x) with values greater than or equal to one. The variable x is a linearly scaled color value, which ranges from x=0 to x=1 as the color value ranges from zero to its maximum value. Similarly, the darkening response curve, denoted $f_{DR}$, is also a function f(x) with values greater than or equal to one. As such, the brightening response curve, when used as a multiplier, serves to visually amplify color variations through brightening; and the darkening response curve, when used as a multiplier together with the derived darkening offset, serves to visually amplify color valuations through darkening. Careful construction of the brightening and darkening response curves results in high quality contrast enhancement.

In accordance with an embodiment of the present invention, the brightening and darkening response curves are controllable by adjusting values of parameters. These parameters determine the shapes of the brightening and darkening response curves. A user can fine-tune values of these parameters interactively, using a graphical user interface, in order to obtain a satisfactory contrast-enhanced image.

Further in accordance with an embodiment of the present invention, the brightening and darkening multipliers are not obtained by applying the brightening and darkening response curves directly to the source image, respectively, since the benefit of the contrast enhancement to bring out detail in the shadow and highlight areas, would be offset by detailed variation in the multipliers at each pixel location. In order for contrast enhancement to be effective, the brightening and darkening multipliers should be relatively insensitive to local detail variation in the source image.

Instead, the brightening and darkening multipliers are derived by applying the brightening and darkening response curves to corresponding filtered versions of the source image. The filtered versions serve to dampen local detail variation, and thus provide relatively smooth local color values to which the response curves can be applied, and thus a smooth base upon which to derive local brightening and darkening multipliers for the source image.

The present invention can be embodied using a variety of types of filters, such as filters based on medians and filters based on weighted averages, which have been found to be very suitable. In accordance with an embodiment of the present invention, filter parameters such as window sizes and choice of weights are adjustable by a user.

For purposes of organization, an enhancement algorithm is described in the following description according to Phase One and Phase Two, according to grayscale image enhancement and color image enhancement, and according to type of filters used. Specifically, Phase One is described hereinbelow for two types of filters; a modified median filter, and a modified weighted average filter.

The modified filters used in the present invention differ from the prior art in that sub-window averages of pixel color values are used in place of single pixel color values. I.e., entire sub-windows of pixel values are treated as if they are lumped together and located at single pixel locations. Such modification is better suited for large windows, say, with dimensions on the order of 100 pixels, and yield better representations of local intensity than prior art filters.

1. Image Enhancement Phase One

Phase One is also described hereinbelow for grayscale images, which have a single color channel, and color images, which have multiple color channels. Two approaches are described for color image enhancement, a first approach that uses a single filtered image, based on filtering luminance source color values; and a second approach that uses two filtered images, based on filtering minimum and maximum source color values.

In a preferred embodiment of the present invention, color values are encoded in the standard sRGB color space, although it is contemplated as being within the scope of the present invention that the color values may be encoded in other color spaces, such as linear RGB, Adobe RGB (1998), and ProPhoto RGB.

1.1 Modified Median Filter

In this embodiment, a modified median filter is applied to a source image, $I_{source}$, to derive a filtered image $I_{filter}$. The median filter used in an embodiment of the present invention is a hybrid multi-stage median filter, which is a modified version of the finite-impulse response (FIR) median hybrid filter described in Nieminen, A., Heinonen, P. and Neuvo, Y., "A new class of detail-preserving filters for image processing," *IEEE Trans. Pattern Analysis and Machine Intelligence*, Vol. 9, January 1987, and in Arce, G., "Detail-preserving ranked-order based filters for image processing," *IEEE Trans. Acoustics, Speech and Signal Processing*, Vol. 37, No. 1, January 1989. In distinction to the prior art, the present invention uses squares instead of directed lines to construct the sub-filter windows.

An advantage of using squares with median hybrid filters instead of directed lines is that the number of directed lines required to preserve details is large, when using large filter window sizes. The prior art uses 8 sub-filters with a filter of radius 2, and more sub-filters, which use directed lines at additional angles, are generally recommended with filters of larger radii. For the present invention, a filter radius as large as 500 is not uncommon, and thus the prior art would require an enormous number of sub-filters.

Another advantage of using squares with median hybrid filters instead of directed lines, is that the average value computed at each square may be re-used eight times over the course of deriving the median filtered image of the present invention.

Reference is now made to FIG. 1A, which is an illustration of filter windows and sub-windows used in deriving a modified median filtered image, in accordance with an embodiment of the present invention. Shown in FIG. 1A is a filter window of dimension (2N+1)×(2N+1) pixels, centered at a pixel (i,j), together with eight sub-windows, each of dimension (2M+1)×(2M+1) pixels. The eight sub-windows are designated "East," "West," "North," "South," "Northwest," "Southeast," "Northeast" and "Southwest," according to their relative positions with respect to pixel (i,j). Thus the center of the West window, for example, is (i−(N−M), j), and its pixel coordinates range from (i−N, j−M) at the lower left corner to (i−N+2M, j+M) at the upper right corner. Here N and M are arbitrary numbers with 0≤M≤N, and the pixel numbering advances from left to right (first coordinate), bottom to top (second coordinate). In the illustration shown in FIG. 1A, N=10 and M=3.

In accordance with an embodiment of the present invention, given a source image, $I_{source}$, for each pixel location (i,j), the averages of $I_{source}$ over each of the sub-windows are computed. The average of $I_{source}$ over the West sub-window; namely, $$\frac{1}{(2M+1)^2} \sum_{i=-M}^{M} \sum_{j=-M}^{M} I_{source}(i-N+M, j) \quad (1)$$

is denoted I-West(i,j), the (i,j) denoting that the West sub-window is positioned westward relative to pixel location (i,j). The other averages are similarly denoted.

When the various averages have been computed, the following seven medians are determined:

$$\text{med-1}(i,j) = \text{median}(I\text{-East}(i,j), I\text{-West}(i,j), I_{source}(i,j)); \quad (2A)$$

$$\text{med-2}(i,j) = \text{median}(I\text{-North}(i,j), I\text{-South}(i,j), I_{source}(i,j)); \quad (2B)$$

$$\text{med-3}(i,j) = \text{median}(I\text{-Northwest}(i,j), I\text{-Southeast}(i,j), I_{source}(i,j)); \quad (2C)$$

$$\text{med-4}(i,j) = \text{median}(I\text{-Northeast}(i,j), I\text{-Southwest}(i,j), I_{source}(i,j)); \quad (2D)$$

$$\text{med-12}(i,j) = \text{median}(\text{med-1}(i,j), \text{med-2}(i,j), I_{source}(i,j)); \quad (2E)$$

$$\text{med-34}(i,j) = \text{median}(\text{med-3}(i,j), \text{med-4}(i,j), I_{source}(i,j)); \text{ and} \quad (2F)$$

$$I_{filter}(i,j) = \text{median}(\text{med-12}(i,j), \text{med-34}(i,j), I_{source}(i,j)). \quad (2G)$$

The median of three numbers is the number in the middle when the three numbers are ordered.

The result of the seventh median calculation in EQUATION 2G is the median filter used in an embodiment of the present invention. A way to represent this median filter is to imagine each sub-filter window lumped into a single pixel positioned adjacent to pixel (i, j) according to the relative position of the sub-window, with a pixel value equal to the average value of the source image over the sub-window. This determines a 3×3 pixel window,

| a | b | c |
|---|---|---|
| d | x | e |
| f | g | h | centered at pixel location (i,j), where $x = I_{source}(i,j)$, a=I-Northwest(i,j) and similarly for b through h. Then the value of $I_{filter}(i,j)$ is determined by $$u = \text{median}(\text{median}(d,e,x), \text{median}(b,g,x), x); \quad (3A)$$

$$v = \text{median}(\text{median}(a,h,x), \text{median}(c,f,x), x); \text{ and} \quad (3B)$$

$$I_{filter}(i,j) = \text{median}(u,v,x). \quad (3C)$$

1.1.1 Modified Median Filter—Grayscale Source Image

When the original source image is a grayscale image, with a single color component, then EQUATIONS 2A-2G directly determine the median filter $I_{filter}$.

1.1.2 Modified Median Filter with Filtered Luminance Image—Color Source Image For an original source image that is a color image with red, green and blue pixel color components, (R(i,j), G(i,j), B(i,j)), two methods for determining median filtered images are described herein. A first method uses the luminance component of the pixel color values, $L_{source}$, as a source image, and derives a median filtered image, $L_{filter}$, therefrom. The luminance component of a pixel color with color values (R, G, B)

may be determined by a conventional formula such as L=0.299*R+0.587*G+0.114*B.

1.1.3 Modified Median Filter with Filtered Minimum and Maximum Images—Color Source Image A second method uses two median filtered images, based on the maximum and minimum of the RGB color values. Specifically, denote $MIN_{source}(i,j)$=minimum(R(i,j), G(i,j), B(i,j)) and $MAX_{source}(i,j)$=maximum(R(i,j), G(i,j), B(i,j)). The median filtered image from $MIN_{source}$, denoted $MIN_{filter}$, and the median filtered image from $MAX_{source}$, denoted $MAX_{filter}$, are both used in the second method. The values of $MIN_{filter}$ are referred to as local minimum color values; i.e., $MIN_{filter}(i,j)$ is referred to as the local minimum color value at pixel location (i,j). This value is sometimes denoted local_min. Similarly, the values of $MAX_{filter}$ are referred to as local maximum color values; i.e., $MAX_{filter}(i,j)$ is referred to as the local maximum color value at pixel location (i,j). This value is sometimes denoted local_max.

1.2 Modified Weighted Average Filter

It may be appreciated by those skilled in the art that filters other than median filters may be used in Phase One of the present invention. It has been found by experimentation with various types of filters that certain weighted average filters perform well with contrast enhancement, in particular when the filter coefficients generally have an inverse gradient dependency, as described hereinbelow.

As with the modified median filter, the modified weighted average filter operates on an original source image, $I_{source}$, to produce a filtered image, $I_{filter}$. The modified weighted filter is computed using weighted averages of sample values, where the weights corresponding to sample values are constructed as described hereinbelow.

In accordance with an embodiment of the present invention, within a sliding square filter window of width and height 2N+1 centered at pixel location (i,j), square sub-windows, each of width and height 2M+1 are positioned so as to be centered at pixel locations (i+kd, j+ld), for some fixed integer parameter d. It is assumed that M is a divisor of N, i.e., N=Mb, for some integer b; and that the parameter d, which controls the spacing between the sub-windows, is a divisor of N−M, i.e., N−M=nd, for some integer n. The indices k and l above independently range from −n to +n. The average color value over such sub-window, uniformly averaged over the $(2M+1)^2$ pixels within the sub-window, is denoted by $a_{kl}$ and is considered as if it is lumped into a single pixel value.

The filtered value $I_{filter}(i,j)$ is computed as a weighted average of the color value at (i,j), together with the $(2n+1)^2$ sub-window averages $a_{kl}$. For example, with n=2 there are twenty-five sub-window averages, say $a_{-2-2}$, $a_{-2-1}$, ..., as follows:

| $a_{-22}$ | $a_{-12}$ | $a_{02}$ | $a_{12}$ | $a_{22}$ |
|---|---|---|---|---|
| $a_{-21}$ | $a_{-11}$ | $a_{01}$ | $a_{11}$ | $a_{21}$ |
| $a_{-20}$ | $a_{-10}$ | $a_{00}$ | $a_{10}$ | $a_{20}$ |
| $a_{-2-1}$ | $a_{-1-1}$ | $a_{0-1}$ | $a_{1-1}$ | $a_{2-1}$ |
| $a_{-2-2}$ | $a_{-1-2}$ | $a_{0-2}$ | $a_{1-2}$ | $a_{2-2}$ |

Each of the values $a_{kl}$ denotes the average of the pixel color values of $I_{source}$ over a sub-window of size (2M+1)×(2M+1), centered at (i+kd, j+ld). For example, the sub-window corresponding to $a_{22}$ has its lower left corner at pixel location (i−2d−M, j+2d−M) and its upper right corner at pixel location (i−2d+M, j+2d+M).

Figure 1B:
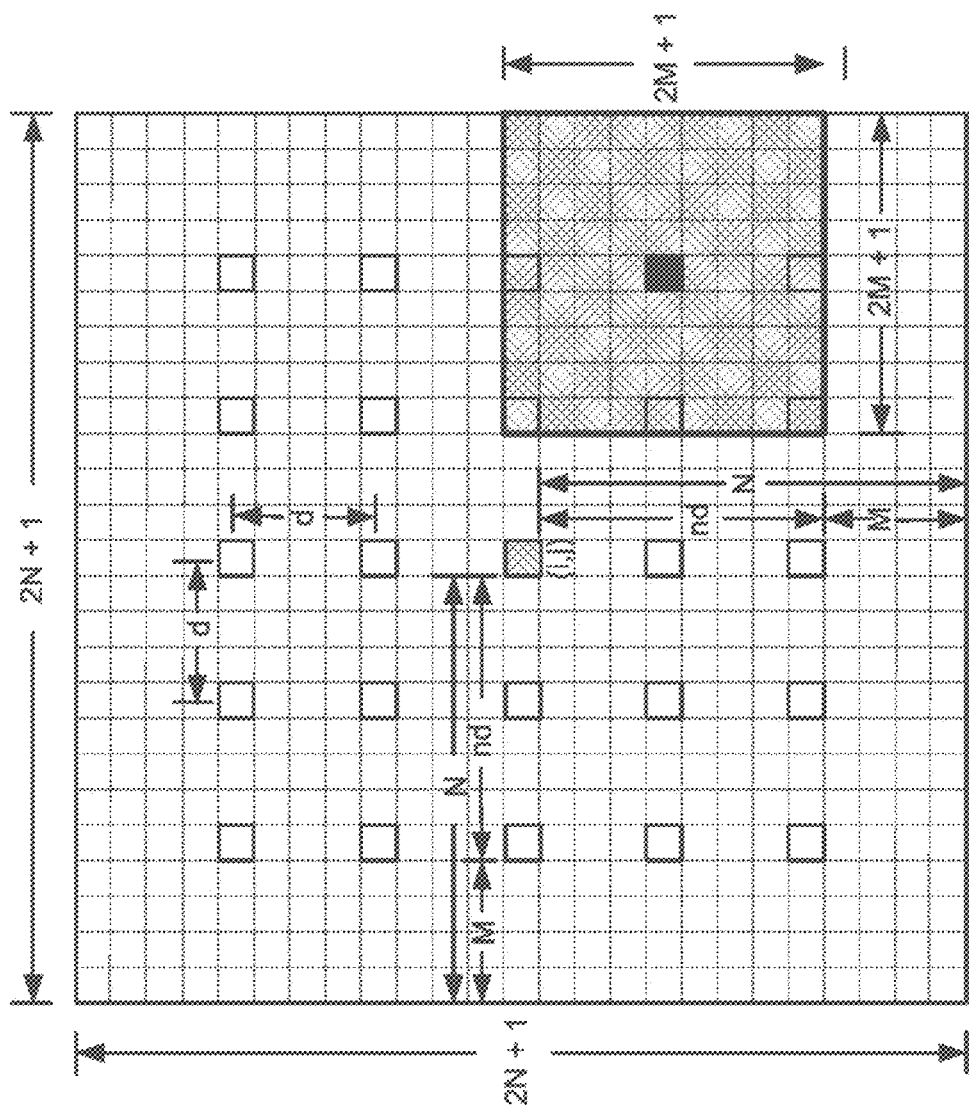
FIG. 1B is an illustration of filter windows and sub-filter windows used in deriving a weighted average filtered image, in accordance with an embodiment of the present invention.

Reference is now made to FIG. 1B, which is an illustration of filter windows and sub-windows used in deriving a modified weighted average filtered image, in accordance with an embodiment of the present invention. Shown in FIG. 1B is a (2N+1)×(2N+1) filter window centered at pixel location (i,j). Also shown are pixel locations with spacings of d between them, vertically and horizontally, centered at pixel location (i,j). The pixel with a solid black fill color, for example, is located at (i+2d, j−d). The sub-window illustrated in FIG. 1B of dimensions (2M+1)×(2M+1), is centered at the solid black pixel. Such sub-windows are positioned at each of the twenty-five pixel locations (i+kd, j+ld) as k and l each range independently from −2 to +2, and the average of the $(2M+1)^2$ color values within each such sub-window is the quantity denoted by $a_{kl}$ hereinabove. The average over the sub-window illustrated in FIG. 1B, for example, is the quantity $a_{2-1}$.

It may be appreciated by those skilled in the art that the sub-window averages $a_{kl}$ may be simple uniform averages, as described above, or non-uniform averages, such as Gaussian blur averages.

The filtered value for pixel location (i,j) is given by a weighted average $$I_{filter} = {}^w I_{source} + \sum_{k=-n}^{n}\sum_{l=-n}^{n} w_{kl} a_{kl} \qquad (4)$$

where the weights w and $w_{kl}$ are normalized so as to sum to one. In applying EQUATION 4, the terms $I_{filter}$, $I_{source}$ and the terms $a_{kl}$ in EQUATION 4 are evaluated at specific pixel locations (i,j); i.e., $I_{filter}(i,j)$, $I_{source}(i,j)$ and $a_{kl}(i,j)$.

It may be appreciated by those skilled in the art that the choice of b and n can be used to provide a trade-off between computational complexity and accuracy in the filtered image. Increasing b and n yields a filtered image with fewer artifacts due to the small sub-window sizes, but increases the computational time. In the limiting case where M=0 and d=1, the modified weighted average in EQUATION 4 reduces to a conventional weighted average filter.

Various choices for the weights correspond to different types of filters. It is expected that good choices place more weight on sample values that have a value closer to the value of the center pixel. For inverse gradient filters, for example, the weights are chosen so that less weight is placed on averages $a_{kl}$ that differ more from the value of $I_{source}(i,j)$. Four candidate methods for assigning the weights are as follows:

1. Assign w=1, and $W_{kl}$=1 or 0 according to whether Delta is less than Sigma or not, respectively, where Delta=$|I_{source} - a_{kl}|$, and Sigma is a constant.
2. Assign w=1, and $w_{kl}=(1+\text{Delta}/k1)^{-k2}$, where k1 and k2 are constants.
3. Assign w=1, and $w_{kl}=\exp(-\text{Delta}^2/\text{Sigma}^2)$.
4. Assign w=1, and $W_{kl}=\exp(-r^2/k^2-\text{Delta}^2/\text{Sigma}^2)$, where r is the distance between the center pixel (i,j) and the center of the sub-window corresponding to $a_{kl}$, and k is a constant. For computational purposes, r is calculated as the Euclidean pixel distance normalized by the pixel distance between adjacent samples; i.e., $r=\text{sqrt}[(i-k)^2+(j-l)^2]/d$. Such normalization by d ensures that the weight coefficients are independent of N.

In each method, 1-4, the weights are re-normalized after being determined as above, by dividing them by their sum, thus ensuring that the normalized weights add up to one. The inverse gradient feature requires that the weights $w_{kl}$ be decreasing or, more precisely, non-increasing, in their dependence on Delta. With method 4 above, the weights are also decreasing in their dependence on the distance, r, of the sub-window $a_{kl}$ from the center pixel (i,j).

Respective references for the weightings in methods 1-4 are:
1. Lee, J.-S., "Digital image smoothing and the Sigma Filter," *Computer Vision, Graphics and Image Processing*, Vol. 24, 1983, pages 255-269.
2. Wang, D. C. C., Vagnucci, A. H. and Li, C. C., "Gradient inverse weighted smoothing scheme and the evaluation of its performance," *Computer Graphics and Image Processing*, Vol. 15, 1981, pages 167-181.
3. Saint-Marc, P., Chen, J. S. and Medioni, G., "Adaptive smoothing: a general tool for early vision," IEEE Transactions on Pattern Analysis and Machine Inteligence, Vol. 13(6), June 1991, pgs. 514-529.
4. Smith, S. and Brady, J., "SUSAN—a new approach to low level image processing," *International Journal of Computer Vision*, Vol. 23, No. 1, 1997, pages 45-78.

In distinction from the present invention, reference 2 teaches a different expression for Delta, and does not use the exponent k2 nor the addition of 1 to Delta/k1. Reference 3 teaches a discrete gradient, as computed within a 3×3 window, instead of Delta=$|I_{source}-a_{kl}|$, as above. Additionally, reference 3 teaches a term $2k^2$ in the denominator of the exponential term, instead of $Sigma^2$, as above. Reference 4 above teaches a value of w=0 for the weight at the center pixel (i,j). However, it has been found that, for the present invention, a value of w=1 yields better performance for contrast enhancement.

A particular characteristic of weighted average filters, as opposed to median filters, is that weighted average filters, in general, are primarily sensitive to magnitude of detail in addition to size. Median filters, on the other hand in general, are primarily sensitive only to size. Thus using a weighted average filter, small but very bright, or very dark, features of an image are left intact in the filtered image—which serves to protect such areas from being over-exposed or under-exposed in Phase Two. As such, whereas the parameter N often has to be reduced using a median filter in order to prevent over-exposure or under-exposure in Phase Two, this is generally not required when using a weighted average filter. In fact, using a large value of N tends to be beneficial with weighted average filters, for preserving relative balance of objects in an image. For example, a small value of N tends to eliminate shadows from a face, giving the face an unnatural flat look, whereas a large value of N preserves the shadows.

Studies of results have shown that the present invention suppresses details well in a source image, when such details are smaller than the radius of the filter window. The advantage of suppression of details derives from the use of filtered images to drive enhancement of the source image. The presence of detail in the filtered images suppresses the corresponding detail in the enhancement process, since dark areas are made relatively lighter and light areas are made relatively darker, where "lightness" and "darkness" of an area are determined by the filtered images. In enhancing the image, the present invention stretches contrast of small details, without stretching contrast of large details. This controlled stretching occurs when the filtered images (i) suppress smaller, high-contrast details, by amplitude reduction or blurring; and (ii) leave larger, high-contrast details intact, neither reducing them in amplitude nor blurring them. Blurring of large details in filtered images causes visible "halo" effects in the output image, which is a significant drawback in prior art systems, such as Adobe Photoshop®.

When larger details are present in the source image, the filter may exhibit insensitivity to small detail in transition zones between large bright areas and large dark areas, and such detail passes through the filter without much attenuation. Specifically, the transition zone is an area with width equal to the radius of the filter window and oriented along boundary contours between the dark and light areas.

Through empirical testing it was found that iterative application of the median filter with successively larger values of a filter radius, $r_0, r_1, r_2, \ldots$ serves to resolve the above insensitivity. It was also found that, for large values of window radius, starting with an initial radius $r_0$ less than 5 gives negligible improvement. Thus, in practice, the sequence of radii used is N, N/2, N/4, . . . , terminating when a radius, $N/2^{k+1}$, less than is reached. Iterative application of the median filter then proceeds from the smallest radius, $N/2^k$, to the largest radius, N. For example, when the median filter radius is 128, the successive values used for $r_0, r_1, r_2, \ldots$ are 16, 32, 64 and 128.

Similarly, for the weighted average filters, the value of N is increased by a factor of five at each iteration, starting with a minimum value of N=2.

Through empirical testing it was also found that for a given value of N, an optimal value for M is N/2. The parameter N may be user-specified. A default value of N is set to min (width, height)/2, where width and height are the pixel dimensions of the source image, and a user can adjust the value of N to between 0% and 100% of this default value. As such, the filter window can be as large as the entire image. It is noted that this choice for the maximum value of N makes the relative setting of this parameter practically resolution-independent. Thus, the optimal relative setting for N is practically the same, say, for a one mega-pixel image as for a six mega-pixel image.

It has further been found through experimentation, that the enhancement algorithm of the present invention is essentially invariant to scale. Specifically, enhancing, say, a six mega-pixel image and then sub-sampling to a one mega-pixel image produces an image that is nearly identical to the image produced by first sub-sampling and then enhancing. Such invariance to scale is an important advantage of the present invention, since enhancement can be performed on a sub-sampled image used for previewing while a user is adjusting enhancement parameters. When the user then commits the parameters, for example, by clicking on an "Apply" button, the full-resolution image can be enhanced, and the resulting enhanced image will appear as the user expects.

Through empirical testing, it has been found that the setting b=2 and n=2 in the sub-window configurations for the weighted average filter, represents a good trade-off between computational complexity and accuracy when enhancing typical digital photo resolutions on a typical personal computer.

2. Image Enhancement Phase Two

Phase Two of an embodiment of the present invention derives a desired enhanced image, denoted $I_{enhanced}$, from the source image $I_{source}$ and from the filtered images computed in Phase One. Various parameters used in the derivation of $I_{enhanced}$ are user-adjustable, as described hereinbelow. As such, the user can refine the enhanced image by iteratively adjusting these user parameters based on the appearance of the enhanced image.

As in Phase One, in a preferred embodiment of the present invention, color values are encoded in the standard sRGB color space, although it is contemplated as being within the scope of the present invention that the color values may be encoded in other color spaces, such as linear RGB, Adobe RGB (1998), and ProPhoto RGB. It is furthermore contemplated as being within the scope of the present invention that the color values may be encoded in one color space during application of Phase One, and encoded in a second color space during application of Phase Two. It is furthermore contemplated as being within the scope of the present invention that the color values may be encoded in one color space during application of Phase One, encoded in a different color space during application of Phase Two, and then finally converted into a third color space after application of Phase Two but prior to output. For example, the input color values may be encoded in the standard sRGB color space and processed as such by Phase One, temporarily converted into the linear RGB color space immediately prior to processing in Phase Two, and then converted back to the original sRGB color space prior to output. As a second example, the input color values may be encoded in the linear RGB color space, converted to the standard sRGB color space for processing by Phase One, then processed and output in the original linear RGB color space in Phase Two.

2.1 Grayscale Images

For grayscale images, Phase Two proceeds as follows:

$$I_{enhanced} = (I_{source} - g_{offset}) * g_{min} * g_{max}, \quad (5A)$$

where $$g_{min} = f_{DR}(I_{filter}), \quad (5B)$$

$$g_{max} = f_{BR}(I_{filter}), \quad (5C)$$

$$g_{offset} = S * (1 - 1/g_{min}), \quad (5D)$$

$f_{DR}$ is a darkening response function, $f_{BR}$ is a brightening response function, and S is the maximum value for a color component (e.g., 255 for 8-bit color channels). The functions $f_{BR}$ and $f_{DR}$ are described in detail hereinbelow.

In accordance with an embodiment of the present invention, $I_{enhanced}$ is clipped to take values between 0 and S; i.e., $I_{enhanced}$ is set to zero if the value calculated in EQUATION 5A is negative, and $I_{enhanced}$ is set to S if the value calculated in EQUATION 5A exceeds S.

The choice of $g_{offset}$ is such that color value I=S is a fixed-point of the function $(I - g_{offset}) * g_{min}$. Since $g_{min}$ is generally greater than one, this function serves to stretch color values, I, away from S. In this regard, it is noted that $$S - (I - g_{offset}) * g_{min} = (S - I) * g_{min},$$

showing that the multiplier $g_{min}$ is used to scale the difference S−I.

In accordance with an embodiment of the present invention, EQUATIONS 5A-5D are applied point-wise at each pixel location (i,j) within the enhanced image. I.e., $I_{enhanced}$ in EQUATION 5A corresponds to $I_{enhanced}(i,j)$, $I_{source}$ corresponds to $I_{source}(i,j)$ and $I_{filter}$ corresponds to $I_{filter}(i,j)$.

It may be appreciated by those skilled in the art that EQUATION 5A corresponds to first applying darkening and then applying brightening. To reverse their application and apply the brightening before the brightening, EQUATION 5A is modified to $$I_{enhanced} = (I_{source} * g_{max} - g_{offset}) * g_{min}. \quad (5E)$$

2.2 Color Images

For color images with red, green and blue color components, Phase Two proceeds as follows:

$$C_{enhanced} = (1 - k_{CB}) * (E - D) + [(1 - k_{CB}) * D + k_{CB} * E] * g_{min} * g_{max}, \quad (6A)$$

where the terms D and E are given by $$D = L_{source} - g_{offset}, \quad (6B)$$

$$E = C_{source} - \{[k_{CB} * L_{source} + (1 - k_{CB}) * C_{source}] / L_{source}\} * g_{offset} \quad (6C)$$

$$g_{min} = f_{DR}(MIN_{filter}) \quad (6D)$$

$$g_{max} = f_{BR}(MAX_{filter}) \quad (6E)$$

and where $C_{source}$ is a color component from the source image;
$L_{source}$ is a luminance component from the source image;
$C_{enhanced}$ is the enhanced color component;
$k_{CB}$ is a user-adjustable parameter—the "color boost" parameter, ranging between 0 and 1; and
the functions $f_{DR}$ and $f_{BR}$, and the parameters $g_{offset}$ and S are as defined hereinabove with respect to EQUATIONS 5A-5D.

I.e., EQUATION 6A represents three equations, for C corresponding to (i) the red color component, (ii) the green color component and (iii) the blue color component.

It is noted that for the special case where $C_{source} = L_{source}$, or for the special case where $k_{CB} = 1$, then EQUATION 6A reduces to $$C_{enhanced} = (C_{source} - g_{offset}) * g_{min} * g_{max},$$

consistent with EQUATION 5A hereinabove. As such, the color boost parameter $k_{CB}$ can be considered as a weighting, or mixing factor between $C_{source}$ and $L_{source}$, with no weight on $L_{source}$ when $k_{CB} = 1$. It is further noted that for the special case where $k_{CB} = 0$, then EQUATION 6A reduces to $$C_{enhanced} = (L_{source} - g_{offset}) * (g_{min} * g_{max} + C_{source} / L_{source} - 1)$$

For example, if $g_{min} = 1$ and $g_{max} = 2$, then $g_{offset} = 0$ and the above expression reduces to $C_{enhanced} = C_{source} + L_{source}$.

EQUATIONS 6A-6E correspond to the embodiment of Phase One for color images described hereinabove in Section 1.1.3, in which minimum and maximum images are filtered. In the embodiment of Phase One for color images described hereinabove in Section 1.1.2, in which the luminance image is filtered, both $MIN_{filter}$ and $MAX_{filter}$ are replaced by $L_{filter}$ in EQUATIONS 6D and 6E.

As described hereinabove with respect to EQUATIONS 5A-5D, the enhanced color components $C_{enhanced}$ are clipped so as to range from 0 to S.

It is noted that for color images, EQUATIONS 5A-5D are not simply applied independently to each individual color component, since doing so would yield an over-saturated image as a result of the multiplications by $g_{min}$ and $g_{max}$, each of which is greater than one. Instead, EQUATIONS 6A-6E include multiplications by $g_{min}$ and $g_{max}$, which serve to increase saturation; and addition of terms $(1 - k_{CB}) * D$ and $k_{CB} * E$, which serve to reduce saturation.

It may be appreciated by those skilled in the art that EQUATION 6A corresponds to first applying darkening and then applying brightening. To reverse their application and apply the brightening before the brightening, EQUATIONS 6A-C are modified respectively to $$C_{enhanced} = (1 - k_{CB}) * (E - D) + [(1 - k_{CB}) * D + k_{CB} * E] * g_{min}, \quad (6F)$$

where the terms D and E are given by $$D = L_{source} * g_{max} - g_{offset}, \quad (6G)$$

$$E = C_{source} * g_{max} - \{[k_{CB} * L_{source} + (1 - k_{CB}) * C_{source}] / L_{source}\} * g_{offset}. \quad (6H)$$

Figure 2A:
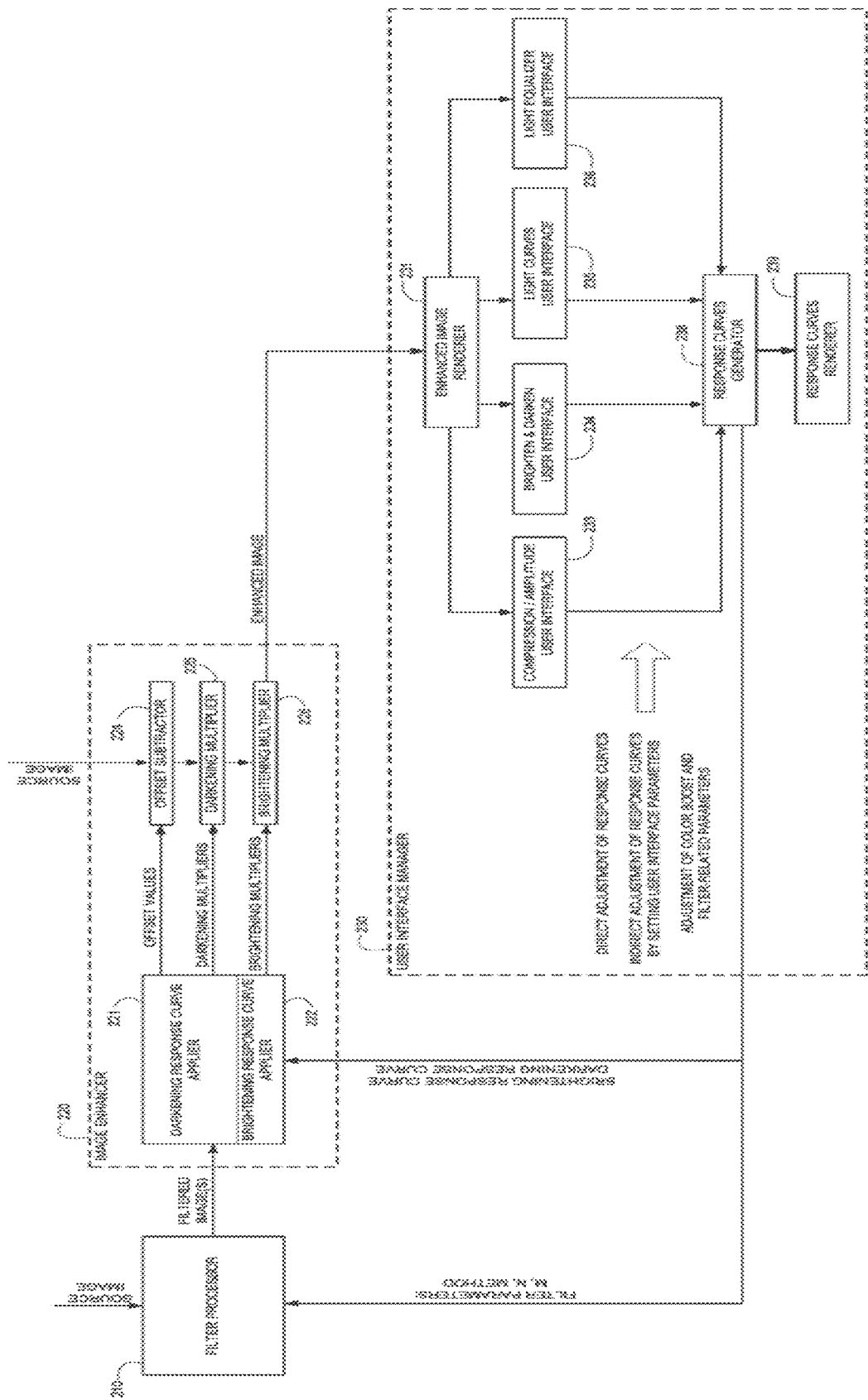
FIG. 2A is a simplified block diagram of components of a system for interactively enhancing digital images, in accordance with an embodiment of the present invention whereby darkening is followed by brightening.

Reference is now made to FIG. 2A, which is a simplified block diagram of components of a system for interactively enhancing digital images, in accordance with an embodiment of the present invention whereby darkening is followed by brightening. For purpose of clarity, and for purpose of emphasizing generation of response curves by a user interface and application of the generated response curves to filtered images, the block diagram of FIG. 2A is based on EQUATIONS 5A-D for grayscale image enhancement.

As shown in FIG. 2A, a source image is processed by a filter processor 210, to derive one or more filtered images. Full details of operation of filter processor 210, in accordance with an embodiment of the present invention, are provided in the computer source code listing in APPENDIX B.

As described hereinabove, if the source image is a grayscale image, $I_{source}$, then filter processor 210 derives a filtered image, $I_{filter}$. For color image enhancement, filter processor 210 derives, either (i) a filtered luminance image, $L_{filter}$, in accordance with a first embodiment of the present invention, or (ii) two filtered images, $MIN_{filter}$ and $MAX_{filter}$, in accordance with a second embodiment. The selection of first or second embodiment is set by a user-adjustable parameter, METHOD.

Filter processor 210 uses window size parameters, M and N, as described hereinabove in Secs. 1.1 and 1.2, which are adjustable by a user.

An image enhancer 220 derives an enhanced image, based on the source image and the one or more filtered images derived by filter processor 210. Image enhancer 220 includes a module 221 for applying a darkening response curves to filtered images, to obtain darkening multipliers. Specifically, module 221 computes the terms $g_{min}$ and $g_{offset}$ from EQUATIONS 5B and 5D. The darkening multiplier $g_{min}(i,j)$, for pixel location (i,j), is obtained by applying a darkening response curve, $f_{DR}(X)$, to $I_{filter}(i,j)$, as in EQUATION 5B. According to EQUATION 5D, the offset, $g_{offset}(i,j)$, for pixel location (i,j) is obtained by evaluating $S[1-1/g_{min}(i,j)]$. Similarly, module 222 applies brightness response curves to filtered images, to obtain brightening multipliers. Specifically, module 222 computes the term $g_{max}$ from EQUATION 5C. The brightening multiplier $g_{max}(i,j)$, for pixel location (i,j) is obtained by applying a brightening response curve, $f_{BR}(x)$, to $I_{filter}(i,j)$, as in EQUATION 5C.

Image enhancer 220 also includes an offset subtractor, 224, for subtracting offset values from source pixel color values, to obtain shifted color values; a darkening multiplier 225 for multiplying the shifted color values by the darkening multipliers; and a brightening multiplier 226 for further multiplying the color values by the darkening multipliers. Together, offset subtractor 224, darkening multiplier 225 and brightening multiplier 226 carry out the operations in EQUATION 5A.

As mentioned hereinabove, the operation of image enhancer 220 has been described as it applies to grayscale images, using EQUATIONS 5A-5D. Similar, but more complex operations are performed when image enhancer 220 is applied to color images, in carrying out EQUATIONS 6A-6E.

Figure 7B:
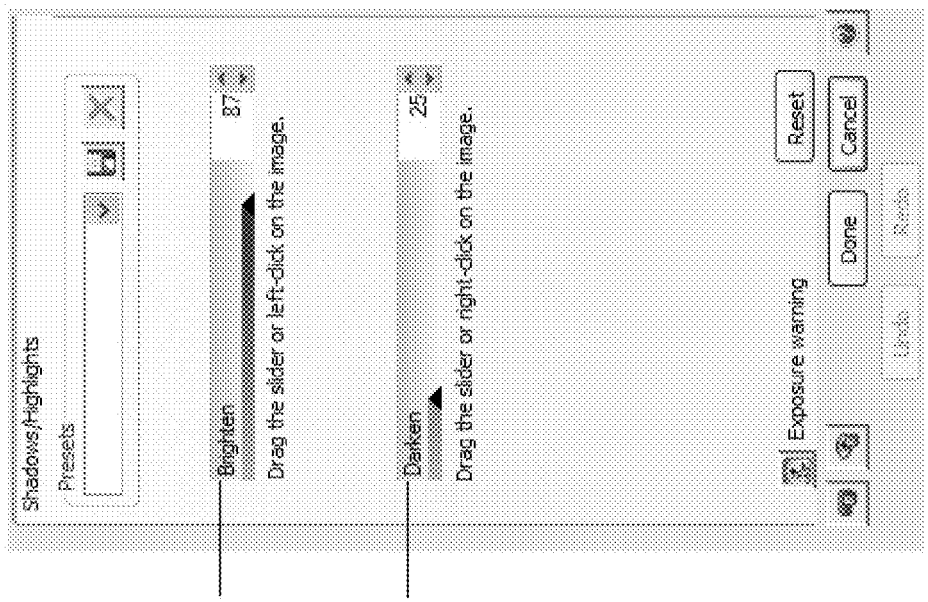
FIG. 7B is an illustration of a user interface for setting brighten and darken parameters for a brightness response curve and a darkness response curve, respectively, in accordance with an embodiment of the present invention.

Generation of the response curves $f_{DR}$ and $f_{BR}$ is performed within a user interface manager 230, which controls an interactive graphical user interface. User interface manager 230 includes an enhanced image renderer 231 for rendering the enhanced image generated by image enhancer 220. A user viewing the enhanced image can interactively adjust the response curves so as to further enhance the image. Specifically, in accordance with an embodiment of the present invention, four user interfaces are provided to a user; namely, (i) a compression & amplitude user interface 233, described in Sec. 4.1 hereinbelow and illustrated in FIG. 7A; (ii) a brighten & darken user interface 234, described in Sec. 4.2 hereinbelow and illustrated in FIG. 7B; (iii) a light curves user interface 235, described in Sec. 4.3 hereinbelow and illustrated in FIG. 7C; and (iv) a light equalizer user interface 236, described in Sec. 4.4 hereinbelow and illustrated in FIG. 7D. These user interfaces offer a user different ways to adjust the response curves. The user may adjust the response curves directly, including inter alia by dragging the response curves upwards or downwards, and by sliding equalizer bars upwards or downwards as illustrated in FIG. 7D. The user may alternatively or additionally adjust the response curves indirectly by setting user interface parameters via inter alia slider bars, checkboxes, pull-down menus, radio buttons and text boxes.

As the user directly or indirectly adjusts a response curve, a response curves generator 238 derives the response curve values accordingly; i.e., response curves generator 238 derives the array of values $f_{DR}(x)$ or $f_{BR}(x)$ for integral values of x within the color range from 0 to S. In turn, a response curves renderer 239 renders the response curves for display within the appropriate user interface. Response curve generator 238 also transmits the adjusted response curves to image enhancer 220, so that the enhanced image can be rendered using the adjusted response curves. Thus it may be appreciated that the user receives interactive visual feedback by viewing the adjusted response curves and the corresponding enhanced image, making it easy for him to fine tune the response curves at will.

Full details of operation of image enhancer 220 and user interface manager 230, in accordance with embodiments of the present invention, are provided in the computer source code listing in APPENDICES A and C-E, respectively.

Figure 2B:
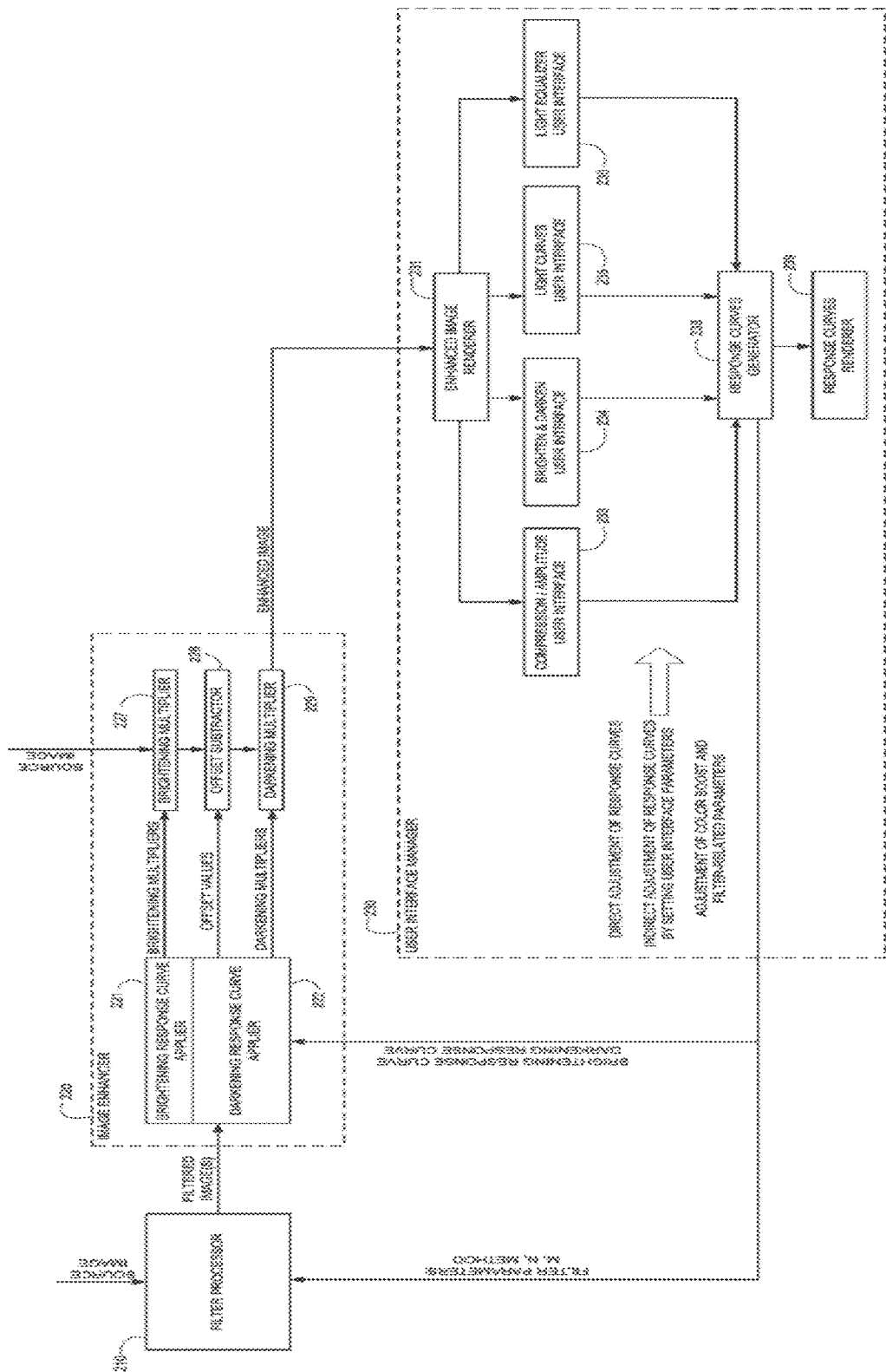
FIG. 2B is a simplified block diagram of components of a system for interactively enhancing digital images, in accordance with an embodiment of the present invention whereby brightening is followed by darkening.

Reference is now made to FIG. 2B, which is a simplified block diagram of components of a system for interactively enhancing digital images, in accordance with an embodiment of the present invention whereby brightening is followed by darkening. The diagram of FIG. 2B corresponds to EQUATION 5E hereinabove. Specifically, sequential modules 227 (brightening multiplier), 228 (offset subtractor) and 229 (darkening multiplier) have replaced sequential modules 224, 225 and 226. Otherwise, the overall operation of the block diagram of FIG. 2B is substantially identical to the overall operation of the block diagram of FIG. 2A.

Figure 3A:
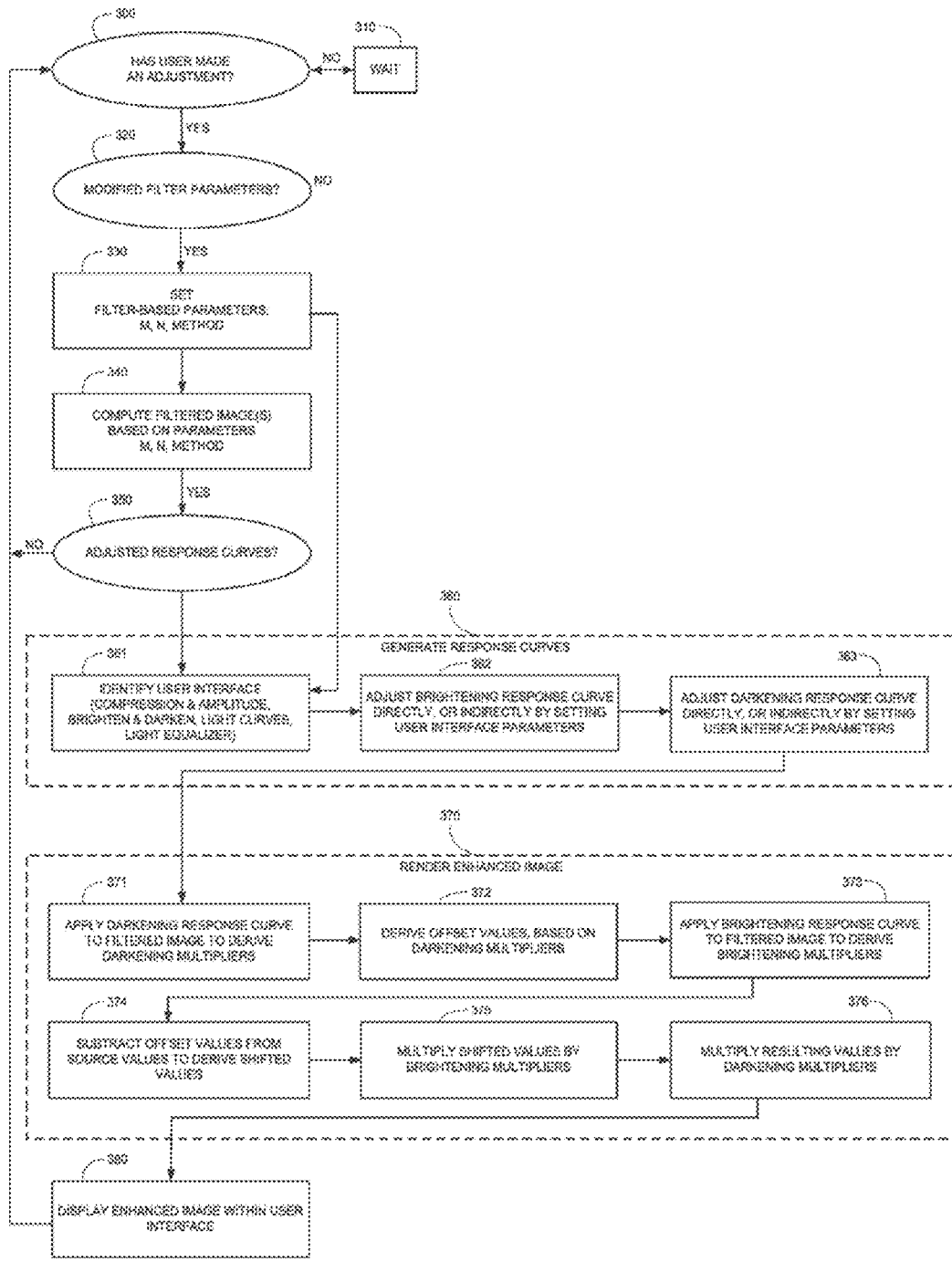
FIG. 3A is a simplified flowchart of operations for interactively enhancing digital images, in accordance with an embodiment of the present invention whereby darkening is followed by brightening.

Reference is now made to FIG. 3A, which is a simplified flowchart of operations for interactively enhancing digital images, in accordance with an embodiment of the present invention whereby darkening is followed by brightening. For the purpose of clarity and for the purpose of emphasizing the steps of generation of response curves and rendering of enhanced images based on the generated response curves, FIG. 3A corresponds to EQUATIONS 5A-D for grayscale image enhancement.

At step 300 a determination is made as to whether or not a user has made an adjustment. If not, then processing waits at step 310 and periodically repeats the determination of step 300. There are two types of adjustments; namely, adjustment of filter-based parameters M, N and METHOD, and adjustment of brightening and darkening response curves, as described hereinbelow.

If step 300 determines that user adjustments have been made, then at step 320 a further determination is made as to whether or not any of the filter parameters have been adjusted. If so, then at step 330 values of the adjusted filter-based parameters are set, and at step 340 one or more filtered images are computed based on the adjusted filter parameters. Full details of performance of step 340, in accordance with an embodiment of the present invention, are provided in the computer source code listing in APPENDIX B.

At step 350 a determination is made whether or not a response curve has been adjusted. If so, then processing continues at step 360. Otherwise, processing returns to step 300.

If step 330 determines that none of the filter parameters have been adjusted, then processing jumps to step 360, where generation of adjusted response curves is performed. At step 361 one of several user interfaces within which to work are identified. Such user interfaces may include inter alia the compression & amplitude user interface described in Sec. 4.1 hereinbelow and illustrated in FIG. 7A, or the brighten & darken user interface described in Sec. 4.2 hereinbelow and illustrated in FIG. 7B, or the light curves user interface described in Sec 4.3 hereinbelow and illustrated in FIG. 7C, or the light equalizer user interface described in Sec. 4.4 hereinbelow and illustrated in FIG. 7D. Each such user interface offers the user a different model within which to adjust a response curve.

After the user interface has been identified at step 361, a user may then adjust the brightening response curve at step 362. In accordance with the present invention, the user may adjust the brightening response curve directly by dragging the response curve upward or downward at a specific point on the curve, or by slide equalizer bars as illustrated in FIG. 7D. Alternatively or additionally, the user may adjust the brightening response curve indirectly by setting user interface parameter values via controls such as inter alia slider bars, checkboxes, radio buttons, pull-down menus and text boxes. Similarly, at step 363 the user may adjust the darkening response curve.

After processing the user adjustments, at step 370 an enhanced image is rendered based on the modified filter parameters and response curves. Step 370 includes steps 371-373, which derive darkening and brightening multipliers and darkening offsets, based on $f_{DR}$, $f_{BR}$ and $I_{filter}$, as per EQUATIONS 5B-5D; and steps 374-376 which apply the multipliers and offsets to the source image $I_{source}$, as per EQUATION 5A.

As mentioned hereinabove, the steps shown in FIG. 3A correspond to grayscale image processing. Similar but more complex operations are performed when using EQUATIONS 6A-6E for color images. Full details of performance of steps 360 and 370, in accordance with embodiments of the present invention, are provided in the computer source code listing in APPENDICES A and G.

At step 380 the enhanced image derived at step 370 is displayed within the user interface. Processing returns to step 300, where the system checks if the user has adjusted parameter values. It may thus be appreciated that the user can interactively fine-tune parameter values and response curves at will, based on the appearance of the enhanced image.

Figure 3B:
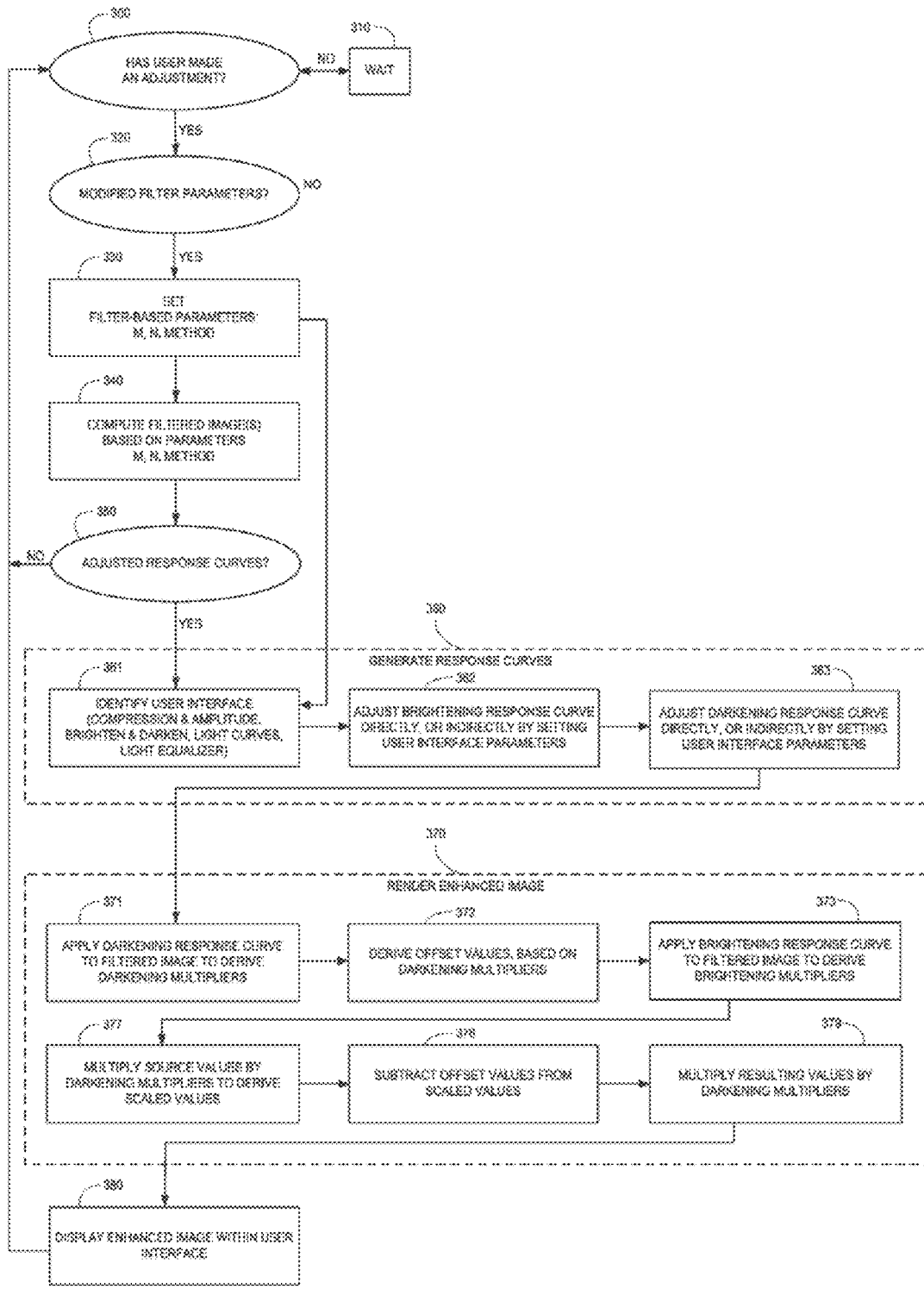
FIG. 3B is a simplified flowchart of operations for interactively enhancing digital images, in accordance with an embodiment of the present invention whereby brightening is followed by darkening.

Reference is now made to FIG. 3B, which is a simplified flowchart of operations for interactively enhancing digital images, in accordance with an embodiment of the present invention whereby brightening is followed by darkening. The flowchart of FIG. 3B corresponds to EQUATION 5E hereinabove. Specifically, sequential steps 377 (multiplication by brightening multipliers), 378 (subtraction of offsets) and 379 (multiplication by darkening multipliers) of FIG. 3B, replace sequential steps 374, 375 and 376 of FIG. 3A. Otherwise, overall operation of the flowchart of FIG. 3B is substantially similar to overall operation of the flowchart of FIG. 3A.

3. Construction of Brightening and Darkening Response Curves

The brightening response curve, $f_{BR}$, and the darkening response curve, $f_{DR}$, are not applied directly to an original input image. Instead, as indicated by EQUATIONS 5B, 5C, 6D and 6E, they are applied to filtered images from among $I_{filter}$, $L_{filter}$, $MIN_{filter}$ or $MAX_{filter}$.

In accordance with the present invention, the brightening response curve, $f_{BR}$, and the darkening response curve, $f_{DR}$, are functions that can be adjusted through one or many possible user interfaces. In general, a user interface (UI) provides a user with one or more interactive controls, including inter alia sliders, dialogue boxes, buttons, pull-down menus, check boxes and radio buttons, which are used to set one or more user parameters. In turn, the user parameters are used to set one or more native model parameters, for the local contrast enhancement of the present invention. Finally, the native model parameters determine the brightening and darkening response curves.

Figure 4:
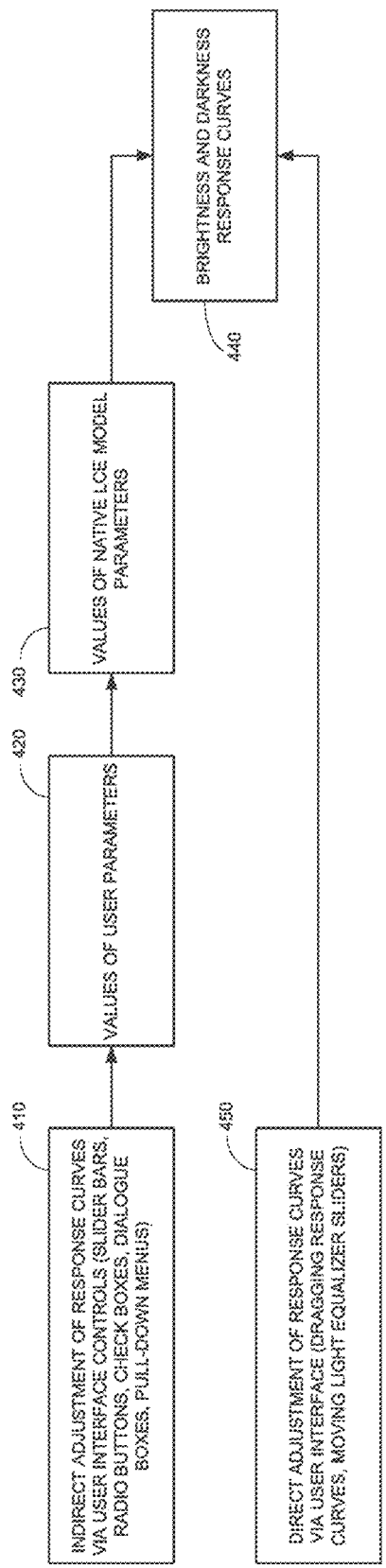
FIG. 4 is a simplified diagram of a workflow from the user interface stage to the stage where the brightening and darkening response curves are determined, either by direct adjustment or by indirect adjustment, in accordance with an embodiment of the present invention.

Reference is now made to FIG. 4, which is a simplified diagram of a workflow from the user interface stage to the stage where the brightening and darkening response curves are determined, either by direct adjustment or by indirect adjustment, in accordance with an embodiment of the present invention. As shown in FIG. 4, at stage 410 a user indirectly adjusts response curves by interactively setting various controls within a user interface, such as buttons, check-boxes, slider bars, dialogue box texts, and pull-down menu selections. At stage 420, the control settings are converted to parameter settings for user parameters. At stage 430 the user parameters are transformed appropriately to determine native local contrast enhancement (LCE) model parameters. Finally, at stage 440 the native LCE model parameters are used to generate the brightening and darkening response curves. The overall transition from user control settings to the brightening and darkening response curves occurs in FIGS. 2A and 2B in element 238, and in FIGS. 3A and 3B at step 360.

Alternatively or additionally, at stage 450 a user directly adjusts response curves by dragging curves upwards or downwards at specific points on the curves, or by adjusting slider bars as illustrated in FIG. 7D. The transition from element 450 to element 440 occurs in element 238 of FIGS. 2A and 2B, and in step 360 of FIGS. 3A and 3B.

In accordance with an embodiment of the present invention, there are six native model parameters, as listed in TABLE I.

TABLE I

Six native local contrast enhancement model parameters

| Parameter | Name | Range |
|---|---|---|
| $C_B$ | brightening compression | Between 0 and 1 inclusive |
| $A_B$ | brightening amplitude | Greater then or equal to 0 |
| $O_H$ | highlight clipping factor | Between 0 and 1 inclusive |
| $C_D$ | darkening compression | Between 0 and 1 inclusive |
| $A_D$ | darkening amplitude | Greater then or equal to 0 |
| $O_S$ | shadow clipping factor | Between 0 and 1 inclusive |

As described in detail hereinbelow, the three parameters (i) compression, (ii) amplitude and (iii) clipping factor are used to build a corresponding response curve. The building of the brightening response curve is generally the same procedure as the building of the darkening response curve, although it is contemplated as being within the scope of the present invention that these response curves may also be built differently.

Given the compression, amplitude and clipping factor parameters, denoted C, A and O, respectively, a response curve is generated by the following sequence of steps:

1. Generate a "basic shape curve," using the parameter C. Three possibilities for basic shape curves are presented hereinbelow.
2. Find an optimal multiplier for the basic shape curve, using the parameter O, as described hereinbelow. The optimal multiplier, denoted m(O), is one which, when applied to scale a response curve, results in a fraction O of the resulting values exceeding the maximum color value, S, or falling below the minimum color value, O. Determination of such optimal multiplier is addressed in Section 5.2 hereinbelow.

In accordance with the present invention, "scaling" a value, v, by a multiplier, m, is defined according to: scaled_v=1+m*(v−1); i.e., the scaled value is m times further from 1 than the original value. The value 1 is used as a base for scaling, since it corresponds to a brightening/darkening factor of 1, which leaves color values unchanged. For example, if O=0.01, then when the response curve is scaled by the optimal multiplier m(O), 1% of the resulting color values will exceed S or fall below 0, and thus be clipped; hence the term "clipping factor" used for O. For ease and clarity of reference, the scaled value of v by the multiplier m is denoted as m·v. Thus, for a given response curve f, the optimal multiplier is characterized by the relation clip(m·f)=O, where clip(f) is the percentage of pixels of the output image, $I_{enhanced}$, enhanced from the source image, $I_{source}$, by using the response curve f, that are clipped from being out-of-range. The listing of CLCELightCurve::ScaleCurve( ) in APPENDIX G provides details of curve scaling.

3. Scale the basic shape curve with the optimal multiplier from step 2 and also with the amplitude parameter A as a multiplier; i.e., generate f'=(A*m)·f, which scales the basic shape curve by m(O)*A. Conversely, if f' is a given response curve with amplitude A, then clip((1/A)·f)=O.

These are the steps in going from stage 430 (FIG. 4) to stage 440.

3.1 Basic Shape Curves

Figure 5A:
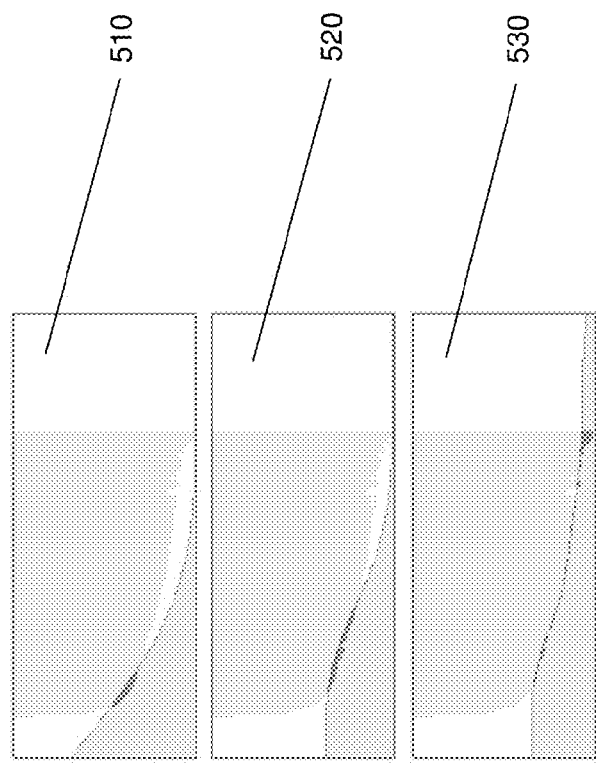
FIG. 5A shows three candidate curves for use as basic shapes for response curves, in accordance with an embodiment of the present invention.

Reference is now made to FIG. 5A, which shows three candidate curves for use as basic shapes for response curves, in accordance with an embodiment of the present invention. The response curves in FIG. 5A are graphed on a logarithmic scale, so that a value of 0 corresponds to a multiplier of 1.

The algorithm provided by the present invention and described hereinbelow is as follows.

ALGORITHM I: Generation of a power-shaped response curve
Input: A compression parameter, C
Output: A corresponding response curve having the shape of a power curve.

The top curve in FIG. 5A, denoted by 510, is a power curve of the form $$PC(x) = 1 + \left(1 - \frac{x}{S}\right)^{C_{MAX} \cdot C},$$

for brightening response;

$$PC(x) = 1 + \left(\frac{x}{S}\right)^{C_{MAX} \cdot C},$$

for darkening response.
The parameters setting $C_{MAX}$=8 was used for the experimentation results provided hereinbelow.

The listings of LCELightCurve::GetPCBrighteningCurve( ) and CLCELightCurve::GetPCDarkeningCurve( ) in APPENDIX G provide details of the power curve calculations.

The middle curve in FIG. 5A, denoted by 520, is a flat-tailed Gaussian curve (FTG), as defined below.

The algorithm provided by the present invention and described hereinbelow is as follows.

ALGORITHM II: Generation of FTG-shaped response curve
Input: A compression parameter, C
Output: A corresponding response curve having the shape of a flat-tailed Gaussian curve FTG curves are generally flatter than power curves, and as such avoid over-boosting of shadow areas, which sometimes causes an unnatural look in an image. The FTG curve takes the form $$FTG(x) = \begin{cases} 1 + \exp\left[-\frac{1}{2}\left(\frac{x - k_{off}}{\sigma}\right)^2\right], & x > k_{off} \\ 2, & x \leq k_{off}, \end{cases}$$

for brightening response;

$$FTG(x) = \begin{cases} 1 + \exp\left[-\frac{1}{2}\left(\frac{x - k_{off}}{\sigma}\right)^2\right], & x \leq k_{off} \\ 2, & x > k_{off}, \end{cases}$$

for darkening response.
The parameter settings $k_{off}=S-C*(S+\sigma)$, for brightening response;

$k_{off}=C*(S+\sigma)$, for darkening response
and σ=0.235*S were used for the experimentation results provided hereinbelow.

For brightening, the FTG maintains a constant value until the threshold value $k_{off}$, after which the FTG decays using the right-hand tail of a Gaussian distribution. For darkening, the FTG increases from a minimum value of 1 to its maximum value using the left-hand tail of a Gaussian distribution, after which the FTG maintains a constant value. The setting σ=0.235*S was found to be a good compromise between having the response curve transition quickly enough to provide tonal compression, and having it not transition so quickly as to cause significant visual artifacts, due to darker areas of the image becoming brighter than brighter areas of the image.

Figure 5B:
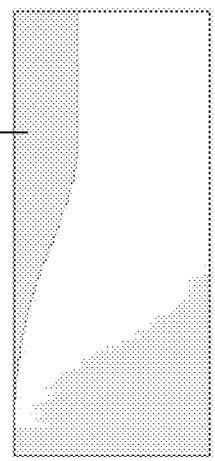
FIG. 5B shows two flat-tailed Gaussian shaped response curves, a brightening response curve and a darkening response curve, in accordance with an embodiment of the present invention.
Figure 5B:
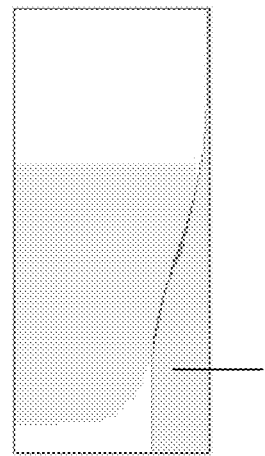

Reference is now made to FIG. 5B, which shows two FTG shaped response curves, a brightening response curve 540 and a darkening response curve 550, in accordance with an embodiment of the present invention. As mentioned above with respect to FIG. 5A, both curves are drawn on a logarithmic scale. The darkening response curve is reflected around the horizontal axis.

The listings of LCELightCurve::GetFTGBrighteningCurve( ), CLCELightCurve::GetFTGDarkeningCurve( ), and CLCELightCurve::GetFTGaussCurve( ) in APPENDIX G provide details of the FTG curve calculations.

Referring back to FIG. 5A, the bottom curve, denoted 530, is a maximum of Gaussian curves, defined as follows:

MOG(x)=max{m·FTG(x):0≤C≤$C_B$}, for brightening response,

MOG(x)=max{m·FTG(x):0≤C≤$C_D$}, for darkening response,
where m is the multiplier to achieve the out-of-range clipping factor, O; i.e., clip(m·FTG)=O. That is, each FTG curve is generated using compression parameter C, where C takes on values between 0 and $C_B$ or $C_D$, and m(O) is computed separately for each FTG curve. The MOG curve is generally flatter than the FTG, and results in a more natural looking enhanced image, since the amount of brightening and darkening is more constant across an image.

The algorithm provided by the present invention and described hereinbelow is as follows.
ALGORITHM III: Generation of MOG-shaped response curve
Input: A compression parameter, C
Output: A corresponding response curve having the shape of a maximum of Gaussians curve The definition of the MOG curve above suggests that a potentially unlimited number of FTG curves be generated for its precise evaluation, since the parameter C is a real-valued number, but experimental results have shown that choosing 20 FTG curves corresponding to values of C uniformly distributed yields results that are visually indistinguishable from results that use many more FTG curves. In general, the MOG curve can be generated by using values of C that are uniformly spaced between 0 and $C_B$ or $C_D$.

The listings of LCELightCurve::GetMOGrighteningCurve( ) and CLCELightCurve::GetMOGDarkeningCurve( ) in APPENDIX G provide details of the MOG curve calculations.

Through extensive empirical testing, three sets of visually friendly and efficient user parameters have been found, which can be easily adjusted interactively so as to assist a user in selecting optimal response curves, as described below in Secs. 4.1, 4.2 and 4.3.

4. Visualization of Brightening and Darkening Response Curves

Figure 6:
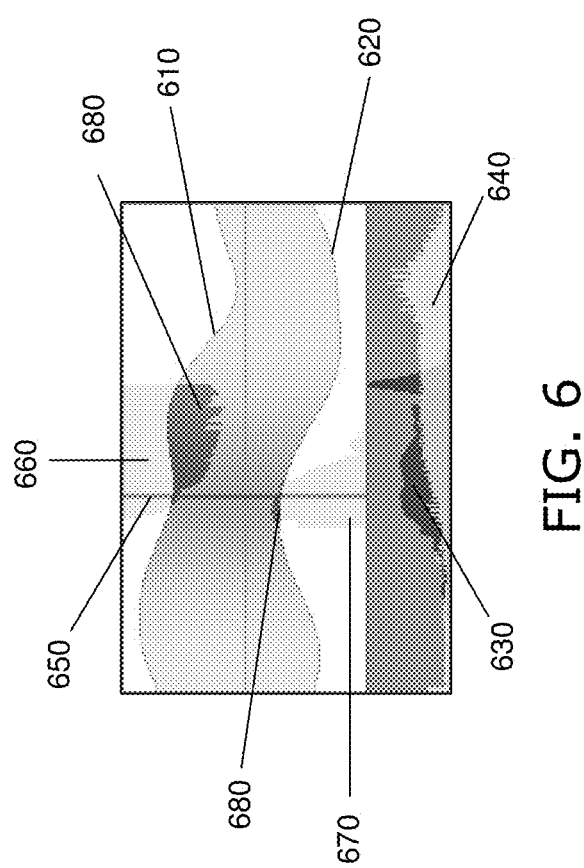
FIG. 6 is an illustration of a graph used to visualize the brightening and darkening response curves, $f_{BR}$ and $f_{DR}$, respectively, in accordance with an embodiment of the present invention.

Reference is now made to FIG. 6, which is an illustration of a graph used to visualize the brightening and darkening response functions, $f_{BR}$ and $f_{DR}$, respectively, in accordance with an embodiment of the present invention. It will be appreciated by those skilled in the art that the user interface illustrated in FIGS. 6 and 7A-7D is but one embodiment of many user interfaces that can be used to accommodate image enhancement systems of the present invention. The interface in FIG. 6 has three parts; namely, (i) a top part which plots a brightening response curve, 610; (ii) a middle part which plots a darkening response curve, 620; and (iii) a bottom part which displays two histograms, one histogram 630 for the original input image and one histogram 640 for the enhanced output image, as described hereinbelow. Additionally or alternatively, the bottom part may display the "local histograms"; i.e., the histograms of the filtered images, $I_{filter}$, $L_{filter}$, or $MIN_{filter}$ and $MAX_{filter}$. When both $MIN_{filter}$ and $MAX_{filter}$ are displayed, a dark color may be used for $MIN_{filter}$, and a light color may be used for $MAX_{filter}$.

The brightening response curve 610 is plotted along a horizontal axis that represents color value, ranging from 0 to a maximum value S; and a vertical axis that represents that logarithm of the response value. For 8-bit color depth, S=255. The baseline at the bottom of curve 610, which separates the brightening response curve 610 from the darkening response curve 620, represents a log value of 0, which corresponds to a response reference value of 1. A response value of 1 in turn corresponds to a color value whose brightness is left unchanged, since the original color value gets multiplied by 1 and, in the case of darkening, $g_{offset}$ is 0.

The scale of the vertical axis can be either fixed or variable. For a variable scale, the scale automatically changes when the maximum response curve value exceeds the maximum currently on display, or the maximum response curve value is smaller than ¼ of the maximum currently on display. For a fixed scale, the scale is chosen so as to display a maximum brightening response value of 5 and a maximum darkening response value of 3; i.e., a brightening multiplier of 5 and a darkening multiplier of 3. For purposes of visual discrimination, the area under brightening curve 610 is rendered in a light peach color, and the curve 610 itself is rendered in a dark peach color.

By examining the brightening response curve 610, a user gains an understanding of the brightness adjustment occurring in the image. Regions where curve 610 is constant represent uniform brightening. Regions where curve 610 is decreasing represent contrast compression, since dark areas of the image are brightened more than bright areas of the image, thereby reducing the brightness difference therebetween. Regions where curve 610 is increasing represent contrast expansion, since dark areas of the image are brightened less than bright areas, thereby increasing the brightness difference therebetween.

The darkening response curve 620 is similar to the brightening response curve. It is also plotted along a horizontal axis that represents color value, ranging from 0 to a maximum value S; and a vertical axis that represents that logarithm of the response value—except that its vertical axis is flipped. As such, the baseline representing a reference multiplier of 1 is at the top of curve 620, and as multipliers increase curve 620 moves downward rather than upward. The rationale for flipping the vertical axis is for consistency in the interface, so that "up" implies brighter and "down" implies darker. Thus, adjusting either curve 610 or 620 upward causes the enhanced image to become brighter, and adjusting either curve downward causes the enhanced image to become darker.

Plot 630, shown at the bottom of FIG. 6, is a histogram of luminance values for the original input image, and plot 640 is a histogram of luminance values for the enhanced output image. For visual discrimination, histogram 630 is color in dark gray and histogram 640 is colored in semi-transparent white. Histograms 630 and 640 change dynamically when a user adjusts the user interface parameters.

In addition to the various UI parameters described below, a user can adjust the brightening response curve 610 and the darkening response curve 620 directly. The effect of response curve adjustment by direct manipulation is to add or subtract a Gaussian distribution centered at the current position, where the spread of the distribution is an adjustable parameter. For discrimination, the Gaussian distribution is visualized by shading the response curve with a dark color of variable transparency, where the transparency is proportional to the value of the Gaussian distribution. Since the Gaussian distribution is centered at the current position, the maximum adjustment occurs there.

In this regard, the local maximum and local minimum of the point under a mouse cursor is indicated by a line 650, colored dark yellow for visual discrimination. When the mouse cursor is over the image itself, the local maximum and minimum values are generally different; and when the mouse cursor is over the graphs of the response curves these values are equal.

When adjusting the brightness and contrast of an image, it is important to control the amount of out-of-range clipping that occurs in the output image. Clipping occurs when a modified color value falls outside of the color range [0, S]. To aid a user in controlling clipping in different area of the image, plots of the maximum multipliers are overlaid on the brightening and darkening response curves. The plot of the maximum multipliers is visually discriminated by coloring the area under the graph in white, and the area above the graph in gray. With reference to FIG. 6, the gray areas for the brightening response and the darkening response are indicated by numerals 660 and 670, respectively.

Whenever a response curve exceeds the maximum curve, and enters a gray area, clipping will occur in the enhanced image. For visual discrimination, overlap between the response curves and the gray area, as indicated by numeral 680, is colored red.

The listing for CLELightCurveCtl in APPENDIX F provides details of the UI for visualization of brightening and darkening control functions.

4.1 Compression & Amplitude User Interface

Figure 7A:
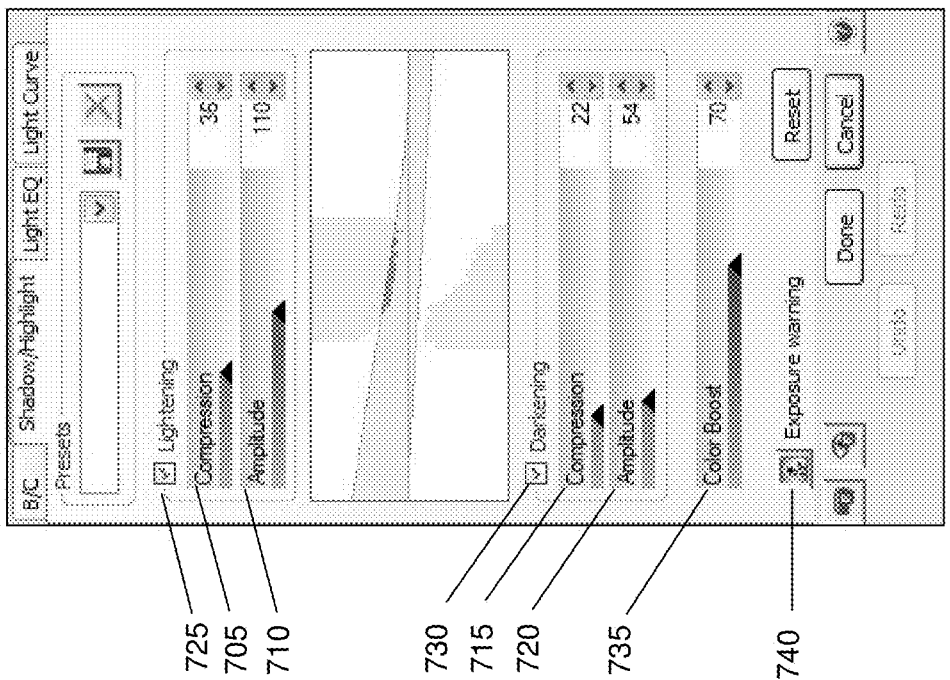
FIG. 7A is an illustration of a user interface for setting compression and amplitude parameters for a brightness response curve and a darkness response curve, in accordance with an embodiment of the present invention.
Figures 7C, 7D:
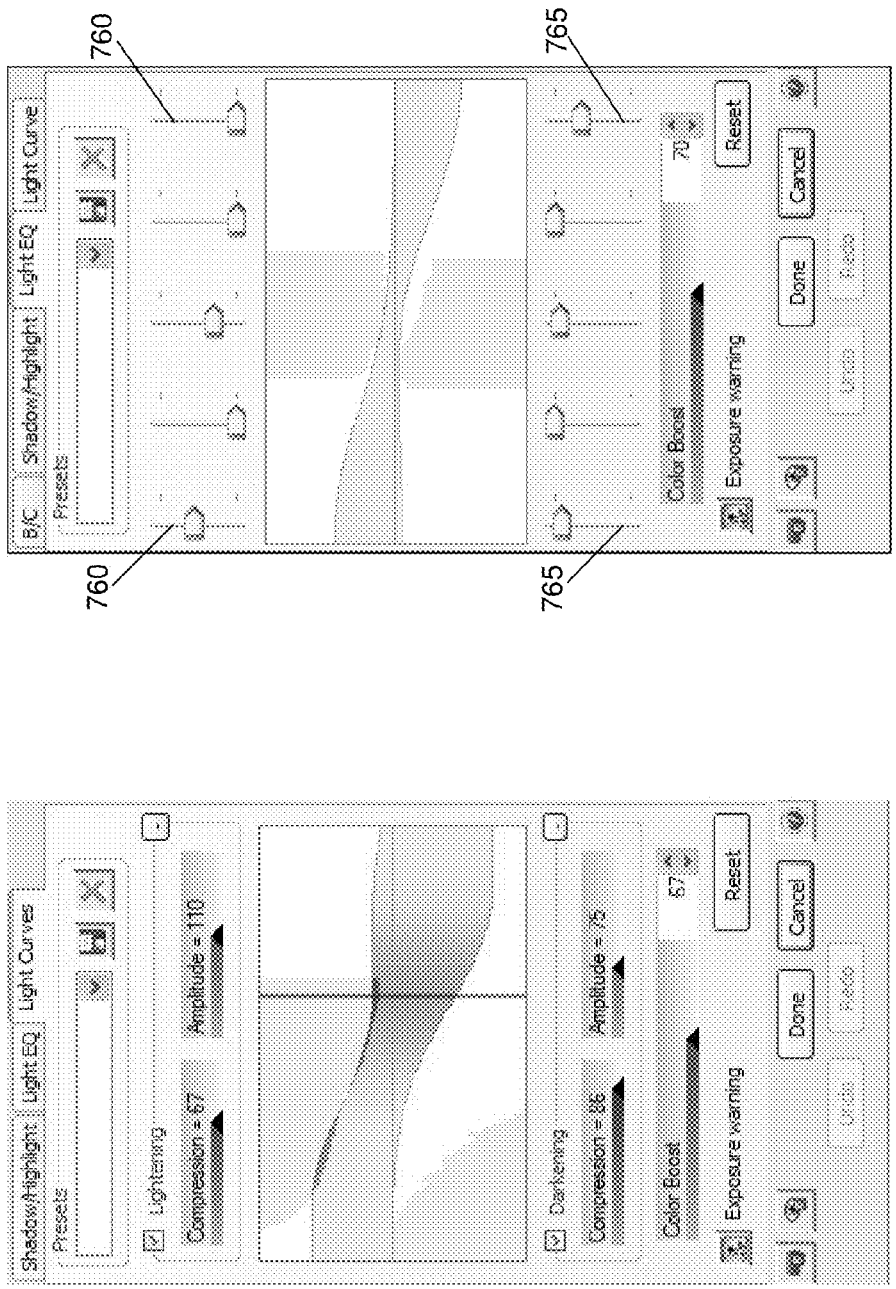
FIG. 7C is an illustration of a light curves user interface for adjusting the shapes of a brightening response curve and a darkening response curve, in accordance with an embodiment of the present invention.
FIG. 7D is an illustration of a light equalizer user interface for adjusting the shapes of a brightening response curve and a darkening response curve, in accordance with an embodiment of the present invention.

Reference is now made to FIG. 7A, which is an illustration of a UI for setting compression and amplitude parameters for a brightening response curve and a darkening response curve, in accordance with an embodiment of the present invention. The compression & amplitude UI enables a user to set the four parameters listed in TABLE II. These are the parameters indicated at stage 420 (FIG. 4), for this UI.

TABLE II

Four user adjustable parameters in the Compression/Amplitude UI

| Parameter | Name | Range |
|---|---|---|
| $\gamma_B$ | brightening compression | Between 0 and 100 inclusive |
| $\alpha_B$ | brightening amplitude | Between 0 and 200 inclusive |
| $\gamma_D$ | darkening compression | Between 0 and 100 inclusive |
| $\alpha_D$ | darkening amplitude | Between 0 and 200 inclusive |

The correspondence between the parameters of TABLES I and II is as follows:

$$C_B = \gamma_B / 100 \tag{7A}$$

$$A_B = \begin{cases} \dfrac{\alpha_B}{100} & \alpha_B \leq 100 \\ 1 & \alpha_B > 100 \end{cases} \tag{7B}$$

$$O_H = \begin{cases} k_{min} + (k_{max} - k_{min})\left(\frac{\alpha_B}{100} - 1\right)^2 & \alpha_B > 100 \\ k_{min} & \alpha_B \leq 100 \end{cases} \tag{7C}$$

$$C_D = \gamma_D / 100 \tag{7D}$$

$$A_D = \begin{cases} \dfrac{\alpha_B}{100} & \alpha_D \leq 100 \\ 1 & \alpha_D > 100 \end{cases} \tag{7E}$$

$$O_S = \begin{cases} k_{min} + (k_{max} - k_{min})\left(\frac{\alpha_D}{100} - 1\right)^2 & \alpha_D > 100 \\ k_{min} & \alpha_D \leq 100 \end{cases} \tag{7F}$$

The parameter settings $k_{min} = 0.0001$, corresponding to 0.01% clipping, and $k_{max} = 0.05$, corresponding to 5% clipping, were used for the experimental results provided hereinbelow. These are the relevant transformations in going from stage 420 to stage 430, for this UI.

Slider bar 705, shown in FIG. 7A, is used to adjust the brightening compression parameter YB. For the Compression & Amplitude UI, the brightening response curve is non-increasing. The rate at which the slope of the brightening curve declines is controlled by moving slider bar 705 to the left or right. Moving slider bar 705 to the right increases the rate of decline, and moving slider bar 705 to the left decreases the rate of decline. When slider bar 705 is moved to the leftmost position the response curve becomes a constant. Intuitively, moving slider bar 705 to the right results in a high-amplitude response curve, with a steep decline at its left side, the decline decreasing as the response curve continues rightward. Such a response curve causes dark areas of an image to be brightened more than bright areas, resulting in more local contrast while having an appearance of compression; i.e., less global contrast. Similarly, moving slider bar 705 to the left results in a response curve with a smaller decline and a more constant slope. Such a response curve causes all areas of an image to be brightened by uniform amounts, resulting in less compression.

As can be seen from EQUATION 7A, as slider bar 705 is moved, the shape of the brightening response curve changes, but its amplitude relative to a saturation point remains constant. For example, if the brightening amplitude is set to its nominal value $\gamma_B = 100$, then at any position of slider bar 705 the height of the brightening response curve is automatically adjusted to cause the enhanced image to just reach its saturation point.

Slider bar 710, shown in FIG. 7A, is used to adjust brightening amplitude parameter $\alpha_B$, which controls the height of the brightening response curve. As slider bar 710 is moved to the right, the height increases, and as slider bar 710 is moved to the left, the height decreases. When slider bar 710 is in its central position, the height of the response curve is chosen as a maximum value that does not generate more than a fixed small amount of out-of-range clipping.

As can be seen from EQUATIONS 7B and 7C, as slider bar 710 is moved from left to right within the range [0, 100], the brightening amplitude parameter $A_B$ increases from 0 to 1, while the highlight clipping parameter $O_H$ remains at a constant value $k_{min}$. As slider bar 710 is moved further from left to right within the range [100, 200], the brightening amplitude parameter remains at a constant value 1, and the highlight clipping parameter $O_H$ increases from $k_{min}$ to $k_{max}$, according to the square of the slider bar's distance from its center value 100. Such behavior provides a smooth transition from no effect ($\gamma_B = 0$), to a nominal effect that barely achieves saturation within the available dynamic range ($\gamma_B = 100$), to a more aggressive effect where a significant amount of clipping occurs ($\gamma_B = 200$).

Since the shape of the brightening response curve, as determined by the brightening compression parameter $\gamma_B$, is maintained throughout the amplitude range, the overall balance of the enhanced image remains constant, and thus it is only the degree of effect applied to the image that varies with slider bar 710. Such property of the user parameters makes the effects of slider bars 705 and 710 more independent, allowing them to be effectively tuned individually.

Slider bar 715, shown in FIG. 7A, is used to adjust darkening compression parameter $\gamma_D$. The darkening response curve is plotted so as to be flipped around the horizontal axis and, as such, the curve moves downward as multipliers increase. For the Compression & Amplitude UI, the (unflipped) darkening response curve is non-decreasing. The behavior of slider bar 715 is similar to that of slider bar 705; i.e., in particular, moving slider bar 715 to the right increases compression by darkening bright areas more than darkening dark areas, and moving slider bar 715 to the left causes all areas of the image to be darkened by more uniform amounts.

Slider bar 720, shown in FIG. 7A, is used to adjust darkening amplitude parameter $\alpha_D$, which controls the height of the darkening response curve. As slider bar 720 is moved to the right, the height of the darkening response curve is increased, resulting in the displayed curve moving downward. Similarly, as slider bar 720 is moved to the left, the height of the darkening response curve is decreased. The center position setting of slider bar 720 corresponds to the height of the response curve being set to a maximum value that does not generate more than a fixed small amount of out-of-range clipping.

Checkbox 725, shown in FIG. 7A, is used to independently activate or de-active the brightening enhancement processing; and checkbox 730 is used to independently activate or de-active the darkening enhancement processing. When brightening is de-activated, the brightening portion of the graphical UI is hidden; and when darkening is de-activated, the darkening portion of the graphical UI is hidden.

Slider bar 735, shown in FIG. 7A, is used to adjust the color boost parameter $k_{CB}$ that appears in EQUATIONS 6A and 6C. The color boost parameter controls the relative amount of saturation applied when pixel values are transformed from original input value to enhanced output values. The color boost parameter has no bearing on the response curves.

Checkbox 740, shown in FIG. 7A, is used to visualize the pixel locations where out-of-range clipping occurs in the enhanced image; i.e., pixel locations where the color value determined from EQUATIONS 5A or 6A was out of the range [0, S], and had to be clipped to 0 or S, accordingly.

Instead of adjusting compression levels using slider bars 705 and 715, a user may simply click on an image, by clicking the left or right mouse button when the mouse cursor is positioned over the image. When the user clicks on the image, the UI automatically adjusts the brightening or darkening compression levels that achieve the maximum brightening and darkening, respectively, of the area of the image over which the user clicked. Clicking with the left mouse button sets the brightening compression level, and clicking with the right mouse button sets the darkening compression level. Such automated adjustment affords a highly intuitive method for image enhancement, since generally the user merely has to click on an area of the image that is "important". For example, clicking on a moderately shadowed face results in a moderately high compression response curve, which lightens the face with minimal impact on brighter areas and darker areas of the image.

The algorithm provided by the present invention and described hereinbelow is as follows.

ALGORITHM IV: Determination of optimal brightening compression parameter relative to a pixel location within an image Input: An original source image, $I_{source}$, a filtered local maximum image, which may be $I_{filter}$, $L_{filter}$, or $MAX_{filter}$, and a brightening response function, f.

Output: An optimal compression parameter, C, for a brightening response curve.

In accordance with an embodiment of the present invention, automated brightening adjustment is generated by the following sequence of steps:

1. Determine the value of the local maximum of the image at the pixel location (i,j) where the user clicked, denoted s_max. This value may be $I_{filter}(i,j)$, $L_{filter}(i,j)$ or $MAX_{filter}(i,j)$.
2. Find the value of the compression parameter, C, that almost maximizes the height of the corresponding response curve at s_max; i.e., lowest value of C that corresponds to $$1+k*[\text{maximum}\{f(s\_max)\}-1], \quad (8)$$

for the brightening response curve f, where the maximum is over the integral values of C=0, 1, ..., 100. If more than one such value of C exists then the lowest such value of C is chosen, since generally a lower amount of compression is less likely to introduce artifacts. That is, C is chosen so that f(s_max) for C is greater than or equal to the value in EQUATION 8, and C is the lowest such integral value. It is noted that the maximum in EQUATION 8 involves 101 different response curves, based on values C=0, 1, ..., 100.

The parameter k<1 in EQUATION 8 reduces the maximum multiplier at s_max, thereby resulting in a lower value of C, the rationale being to provide "almost maximum" brightening to the selected area of the image. The parameter setting k=0.7 was used to provide the experimental results presented below. For the case of MOG shape curves, FTG curves are used as the response curves f in EQUATION 8 instead of MOG curves, in order to reduce computation time by a factor of 20. Refer to the discussion of MOG curves in Sec. 3.1 hereinabove.

3. Adjust the compression slider bar to the value found in step 2. Automated darkening adjustment is generated by a similar sequence of steps.

It is noted that such automated adjustment may be used in isolation, without any of the adjustment controls of FIG. 7A. In particular, this adjustment is very useful for front ends and for devices with limited user interface capabilities, such as web browsers, mobile wireless computing devices, digital cameras, mobile phones, and other mobile devices with embedded digital cameras.

The listings of CLCELightCurve::GetPCBrighteningCompressionForLevel( ), CLCELightCurve::GetPCDarkeningCompressionForLevel( ), CLCELightCurve::GetFTGBrighteningCompressionforLevel( ), CLCELightCurve::GetFTGDarkeningCompressionforLevel( ), CLCELightCurve::GetMOGBrighteningCompressionforLevel( ), and CLCELightCurve::GetMOGBrighteningCompressionforLevel( ) in APPENDIX G provide details of the above automated compression setting calculations.

4.2 Brighten & Darken User Interface

Reference is now made to FIG. 7B, which is an illustration of a brighten & darken UI for adjusting the shapes of a brightening response curve and a darkening response curve, in accordance with an embodiment of the present invention. The brighten & darken UI is essentially a simplified version of the compression & amplitude UI of Sec. 4.1, deriving the six native local contrast enhancement model parameters of TABLE I from two user parameters, referred to as "Brighten" and "Darken", as specified in TABLE III.

TABLE III

User adjustable parameters in the brighten & darken user interface

| Parameter | Name | Range |
| --- | --- | --- |
| $\xi_B$ | Brighten | Between 0 and 100 inclusive |
| $\xi_D$ | Darken | Between 0 and 100 inclusive |

The correspondence between the brighten and darken parameters and those of TABLE I is as follows:

$$C_B = \begin{cases} 0 & \xi_B \le 25 \\ (\xi_B - 25)/75 & \xi_B > 25 \end{cases}$$

$$A_B = \begin{cases} \dfrac{\xi_B}{50} & \xi_B \le 50 \\ 1 & \xi_B > 50 \end{cases}$$

$$O_H = k_{min}$$

-continued $$C_D = \begin{cases} 0 & \xi_D \le 25 \\ (\xi_D - 25)/75 & \xi_D > 25 \end{cases}$$

$$A_D = \begin{cases} \dfrac{\xi_D}{50} & \xi_D \le 50 \\ 1 & \xi_D > 50 \end{cases}$$

$$O_S = k_{min}$$

These are the relevant transformations in going from stage 420 to stage 430, for this UI.

Slider bars 750 and 755, shown in FIG. 7B, are used to adjust the brighten parameter $\xi_B$ and darken parameter $\xi_D$, respectively.

Alternatively, instead of adjusting brighten and darken levels using slider bars 750 and 755, a user may simply click on an image, by clicking the left or right mouse button when the mouse cursor is positioned over the image. When the user clicks on the image, the UI automatically adjusts the brighten or darken levels that achieve the maximum brightening and darkening, respectively, of the area of the image over which the user clicked. Clicking with the left mouse button sets the brighten level, and clicking with the right mouse button sets the darken level. Such automated adjustment affords a highly intuitive method for image enhancement, since generally the user merely has to click on an area of the image that is "important". For example, clicking on a moderately shadowed face results in a moderately high brighten level, which lightens the face with minimal impact on brighter areas and darker areas of the image. The details of setting the brighten and darken slider positions based on the area of the image the user clicked on are similar to those described hereinabove for the compression & amplitude UI, and are more particularly detailed in the listing for CLCESimpleDlg in APPENDIX C.

4.3 Light Curves User Interface

Reference is now made to FIG. 7C, which is an illustration of a light curves UI for adjusting the shapes of a brightening response curve and a darkening response curve, in accordance with an embodiment of the present invention. The light curves UI is similar-looking to the compression & amplitude UI of Sec. 4.1, and uses the same user parameters as in TABLE II and the same transformation as in EQUATIONS 7A-7F, but this UI has different functionality. Using the light curves UI, a user can adjust the shapes of the response curves to practically any desirable shape.

In one embodiment, the compression and amplitude settings are initially set to automatically enhance the source image, as described in Sec. 5.3 hereinbelow, and to produce only a minimal amount of out-of-range clipping. Thereafter, a user can fine-tune the compression and amplitude settings to optimize the look of the enhanced image. Alternatively, as described with respect to ALGORITHM IV hereinabove, the user can double-click on a location within the image, and the compression parameter is automatically set to optimize the brightness or darkening within the local region surrounding the selected location.

After initial compression parameter values are set, a user can modify the brightening or the darkening response curve through one or more of the following direct modification controls:
1. Clicking on a horizontal position within the curve and dragging the curve upwards or downwards;
2. Pointing at a horizontal position within the curve and using a wheel on the mouse to adjust it upwards or downwards;
3. Clicking on a location within the image and dragging it upwards or downwards;
4. Pointing at a position within the image and using the wheel on the mouse to adjust it upwards or downwards; and
5. Double-clicking within the curve or at a location within the image, while holding down the <Ctrl> key.

In each case, the brightening or darkening response curve is correspondingly modified.

TABLES IVA-IVC indicate how selections of brightening/darkening response curve and adjustments thereto are made.

TABLE IVA

User actions and effects within light curves user interface

| Action | Effect |
|---|---|
| Dragging with the left mouse button | Modifies brightening response curve |
| Dragging with the left mouse button + <Shift> | Modifies darkening response curve |
| Dragging with the right mouse button | Modifies darkening response curve |
| Scrolling mouse wheel | Modifies brightening response curve |
| Scrolling mouse wheel + <Shift> | Modifies darkening response curve |
| Double-click + <Ctrl> | Modifies brightening response curve |
| Double-click + <Ctrl> + <Shift> | Modifies darkening response curve |

TABLE IVB

User actions and effects within light curves user interface

| Action | Location | Effect |
|---|---|---|
| Dragging | Within the curve visualization panel | Appropriate response curve is modified around local level corresponding to the point on the curve that was clicked |
| | Within the image | Appropriate response curve is modified around local level corresponding to the point on the image that was clicked |
| Scrolling mouse wheel | Within the curve visualization panel | Appropriate response curve is modified around local level corresponding to the point on the curve that is underneath the mouse cursor |
| | Within the image | Appropriate response curve is modified around local level corresponding to the point on the image that is underneath the mouse cursor |

TABLE IVC

User actions and effects within light curves user interface

| Action | Response Curve | Effect |
|---|---|---|
| Dragging upwards, or mouse wheel upwards | For the brightening response curve | Amplitude around selected local maximum level is increased, thereby brightening image |
| | For the darkening response curve | Amplitude around selected local minimum level is decreased, thereby brightening image |
| Dragging downwards, or mouse wheel downwards | For the brightening response curve | Amplitude around selected local maximum level is decreased, thereby darkening image |
| | For the darkening response curve | Amplitude around selected local minimum level is increased, thereby darkening image |

When a user adjusts a response curve, the change in curve height is greatest at the level corresponding to the selected local level, and gradually decreases to zero moving away from the selected local level. Specifically, the response curve is modified by adding a Gaussian function $g(x)$ thereto; namely $$g(x) = B\exp\left[-\frac{1}{2}\left(\frac{x-s}{\sigma}\right)^2\right]$$

The amplitude of the Gaussian function, denoted B, is positive or negative according to the direction of adjustment. The Gaussian function is centered at the selected local level, s, and its width, σ, was set to a value of 40 in producing the experimental results hereinbelow.

The response curve being adjusted, f(x), is modified according to $$f'(x) = \text{maximum}(1, f(x) + g(x))$$

thus ensuring the modified curve f'(x) does not fall below 1. The amplitude B is set proportional to the adjustment amount. Specifically, for dragging, B equals the vertical drag distance (in screen pixels) multiplied by a first fixed constant; and for mouse wheel scrolls, B equals the scroll size (in stops) multiplied by a second fixed constant. For the experimental results provided below, the first constant was set to 0.0125, and the second constant was set to 0.03.

In an embodiment of the present invention, the amplitude B is further multiplied by 2*(1−s/S) for brightening, and by 2*s/S for darkening, in order to account for the change in amplitude adjustment across the local levels, s. For brightening, this multiplication causes adjustments made to darker areas of the image to be larger than adjustments made to brighter areas of the image. For darkening, this multiplication causes adjustments made to darker areas of the image to be smaller than adjustments made to brighter areas of the image.

The listings for CLCELightCurve:ModifyCurves( ), CLCELightCurve::GetGaussCurve( ), ScaleLighteningEffect( ) and ScaleDarkeningEffect( ) in APPENDIX G provide details of the adjustment of a response curve by adding a Gaussian function.

It may be appreciated from TABLE IVC that when dragging upwards or scrolling the mouse wheel upwards, the image is brightened, regardless of whether the brightening curve or the darkening curve is being modified. Similarly, when dragging downwards or scrolling the mouse wheel downwards, the image is darkened, regardless of whether the brightening curve or the darkening curve is being modified. The inversion of the darkening response curve in the visualization panel ensures a consistent "up=brighter" and "down=darker" effect.

It is further noted that when the user selects a location within the visualization panel, the local maximum and local minimum values are the same. When the user selects a location within the image, the local maximum and local minimum values are generally different.

As a response curve is adjusted upwards or downwards, its amplitude may change. Referring back to EQUATIONS 7B, 7C, 7E and 7F, it is noted that the UI amplitude parameter governs both the native LCE model amplitude and clipping factor parameters. As explained hereinabove, when the UI amplitude is less than 100, the native LCE model amplitude ranges from 0 to 1; and when the UI amplitude is greater than or equal to 100, the clipping factor ranges from $k_{min}$ to $k_{max}$.

The light curves panel includes two modes, each governing a different effect when a user adjusts a response curve upwards or downwards. A "constrained amplitude mode" scales the response curve based on the position of the UI amplitude slider bar, after the user makes an adjustment to the response curve. A "free amplitude mode" changes the position of the UI amplitude slider bar to correspond to the actual amplitude of the response curve, consistent with EQUATIONS 7C and 7F, after the user makes an adjustment to the response curve. The free amplitude mode is generally the default mode, and the constrained amplitude mode is activated when a user holds down a <Ctrl> key while adjusting a response curve. The constrained amplitude mode may be set to be the default mode through a user confirmation option.

The algorithm provided by the free amplitude mode and described hereinbelow is as follows.

ALGORITHM V: Determination of amplitude corresponding to a response curve
Input: A response curve and local histograms constructed from a filtered image.
Output: An amplitude parameter, A, corresponding thereto.

In the free amplitude mode, the position of the amplitude slider bar is adjusted based on the amplitude implied by the number of pixels clipped in the enhanced output image, and the actual amplitude of the response curve relative to the nominal amplitude at which minimal clipping occurs. I.e., $$A = 100 + 100\sqrt{\frac{O - k_{min}}{k_{max} - k_{min}}},$$

if the clipping ratio O is greater than $k_{min}$, and

A=100/m, if the clipping ratio O is less than or equal to $k_{min}$, where m is the multiplier that for the response curve f that yields a clipping ratio of $k_{min}$; i.e., clip(m·f)=$k_{min}$. The number of clipped pixels is determined by the statistical algorithm described in Sec. 5.2 hereinbelow, and the clipping ratio, O, is the ratio of the number of clipped pixels divided by the total number of pixels in the image.

The listings of CLCELightCurveDlg::UpdateAmplitudeParameters( ), CLCELightCurve::GetWhiteClippingRatio( ), and CLCELightCurve::GetBlackClippingRatio( ) in APPENDICES E and G provide details of the free amplitude mode implementation.

In either the constrained amplitude mode or the free amplitude mode, a user can adjust the position of the amplitude slider bar at any time, to scale the response curve upwards or downwards. In the constrained amplitude mode, the user can adjust the shape of the response curve and be assured that the clipping ratio does not change. In the free amplitude mode, the user can adjust the shape of response curve to a desired shape, and can observe the position of the amplitude slider bar and the resulting enhanced output image, to determine whether the amplitude should be adjusted.

Within the light curves UI, if a user double-clicks on an image with the left or right mouse button while holding down the <Ctrl> key, then the brightening or darkening response curve, respectively, is adjusted by increasing its values around the local color level at the location that was clicked on, while decreasing its values at other color levels so as to preserve the current amplitude setting. Such response curve adjustment is effective in bringing out a specific color band within the image. Re-applying such adjustment at the same local color level causes the response curve to be further modified, thereby increasing its values around the local color value even more, and decreasing its values at color levels away from the local color value.

The algorithm provided by the double-click+<Ctrl> action and described hereinbelow is as follows.
ALGORITHM VI: Adjust a response curve around a local color level so as to preserve amplitude
Input: A brightening or darkening response curve, f, having an amplitude, A, and a selected local color value.

Output: An adjusted brightening or darkening curve, respectively, with increased values near the selected local color value, and having the same amplitude A.

In accordance with an embodiment of the present invention, in response to a double-click+<Ctrl> action at a selected local color level, s, a response curve, f, is adjusted as follows.

1. A Gaussian curve centered at s is generated; namely, $$G(x) = \exp\left[-\frac{1}{2}\left(\frac{x-s}{\sigma}\right)^2\right],$$

where σ is chosen so as to yield an effective trade-off between granularity of adjustment and constraint on maximum curve slope, since a large slope may give rise to image artifacts. The setting σ=40 was used to provide the experimental results provided below.

2. Scale the Gaussian curve, m·G(x), where m is an optimal multiplier for G(x) based on a clipping factor of 0, and where m is also constrained to as not to exceed a prescribed maximum multiplier $m_{MAX}$. The value of $m_{MAX}$ is chosen so as to limit the adjustment made to the response curve per each double-click invocation. The settings $m_{MAX}$=2 for brightening and $m_{MAX}$=2 for darkening were used to provide the experimental results provided below.

3. Modify the response curve to be f(x)+m*G(x)−1.

4. Scale the modified resulting response curve with an optimal multiplier based on a clipping factor of 0.

The listings of CLCELightCurve::ModifyBrighteningCurveAutomatic( ) and CLCELightCurve::ModifyDarkeningCurveAutomatic( ) in APPENDIX G provide details of the double-click+<Ctrl> action implementation.

When the user has customized the shape of the response curve using direct manipulation, the curve shape generally does not correspond directly to the setting of the compression slider bar. The compression slider bar is not changed automatically as the user adjusts the shape of the response curve. However, the user is able to adjust the compression slider bar, in which case the curve is generated anew from the compression and amplitude slider settings.

The listing for CLCELightCurveDlg in APPENDIX E provides details of the light curves UI.

4.4 Light Equalizer User Interface

Reference is now made to FIG. 7D, which is an illustration of a light equalizer UI for adjusting the shapes of a brightening response curve and a darkening response curve, in accordance with an embodiment of the present invention. Shown in FIG. 7D are slider controls 760 and 765 for adjusting bands within the brightening and darkening response curves, respectively. The UI shown in FIG. 7D is referred to as a "light equalizer" interface, using the paradigm of a sound/graphic equalizer used in audio systems.

In accordance with an embodiment of the present invention, a "light spectrum" of an image is divided into a number of "bands", where each band represents a range of local brightness in the image. Sliders 760 control a brightening effect within bands, and sliders 765 control a darkening effect within bands.

The centers of the bands used in the light equalizer UI are uniformly distributed over the domain of local min/max brightness values. Let $x_1, x_2, \ldots, x_n$ denote the positions of the centers of the bands, where n denotes the number of bands. Then $x_i$=S*(i−1)/(n−1). With each band is associated a Gaussian distribution $$G_i(x) = 1 + \exp\left[-\frac{1}{2}\left(\frac{x-x_i}{\sigma}\right)^2\right],$$

where the parameter setting σ=S/n was used for the experimental results provided below. Such choice of σ results in a Gaussian distribution width that provides for sufficient overlap between Gaussian distributions from adjacent bands, so as to prevent dips forming in the response curves between bands, when the Gaussian distributions are combined as indicated below.

Adjusting slider bar 760 for a given band causes the response curve to be pushed up around the center of the band, in such a way that a maximum response curve height occurs at the band center, and then tapers off on either side. The effects of all slider bar adjustments are additive. Since the darkening response curve is flipped, the orientation of slider bars 765 is correspondingly flipped, so that the top value corresponds to 0 and the bottom value corresponds to 1. As a result, moving either slider bar 760 or slider bar 765 upward causes the image to brighten, and moving either one downward causes the image to darken.

The user parameters for the light equalizer UI are the values of the brightening slider bars 760, denoted $B_1$, $B_2, \ldots, B_n$, and the values of the darkening slider bars 765, denoted $D_1, D_2, \ldots, D_n$. When these user parameters are set, the response curves are then generated as follows:

$$f_{BR}(x) = \sum_{i=1}^{n} B_i m(k_{max}) \cdot G_i(x),$$

for darkening response;

$$f_{DR}(x) = \sum_{i=1n}^{n} D_i m(k_{max}) \cdot G_i(x),$$

for darkening response.

As above, the · operation denotes scaling relative to 1, and m(k) denotes the multiplier that yields an out-of-range clipping factor of k.

The listings for CLCELightEQDlg and CLCELightCurve::ModifyCurveEqualization( ) in APPENDIX G provide details of the light equalizer UI.

5. Implementation Details

Many of the processing stages described above in Secs. 1-4 have efficient implementations, which require only a relatively small number of arithmetic computations. As a result, the present invention may be implemented in an interactive environment, whereby response times for generating enhanced images and for updating the UI display of the corresponding response curves, are fractions of a second. A user is able to adjust enhancement parameters and see their effect on the original image immediately in real-time, and thereby fine-tune the parameter settings to achieve optimal contrast enhancement.

5.1 Filter Processing

In an embodiment of Phase One of the present invention, the various sub-window averages are computed once, and re-used eight times for the modified media filter, and re-used $(2n+1)^2$ times for the weighted average filter. For example, the East average relative to pixel location (i,j) is identical to the West average relative to pixel (i+2*(N−M), j) and to the North average relative to pixel (i+(N−M), j−(N−m)) and to the South average relative to pixel (i+(N−M), j+(N−M)), etc., as can be seen from FIG. 1A. Thus it may be appreciated by those skilled in the art that the various sub-window averages may be stored in a sliding window and re-used.

It may further be appreciated that since a square neighborhood average is a separable convolution filter, the two-dimensional summation in EQUATION 1 reduces to two summations, each over 2M+1 pixel locations; namely, one sum in the vertical direction and the other sum in the horizontal direction. Moreover, a one-dimensional sliding window average is computed by a moving sum. As the window slides one pixel to the right, the new pixel within the window is added into the sum, and the pixel that "slid out of" the window is subtracted.

As a result, the computation of each of the medians in EQUATIONS 2A-2D is achieved using only two additions, two subtractions and one division per pixel. The division can be replaced with a look-up table of size $S*(2M+1)^2$, where S is a maximum color value. For 8-bit color channels, S=255.

Reference is now made to APPENDIX B, which is a detailed listing of computer source code written in the C++ programming language for implementing a median or a weighted average filter in accordance with an embodiment of the present invention. It is noted that the listing APPENDIX B includes an integer-arithmetic implementation, for faster performance.

In an embodiment of Phase Two of the present invention, computation of $MIN_{filter}$ and $MAX_{filter}$ is also performed using a sliding window. It may thus be appreciated that, using the present invention, it is not necessary to store intermediate results in an intermediate buffer of the same dimensions as the source image.

For images having color channels with more than eight bits per color, the present invention down-samples the images to eight bits per color prior to application of the filter. Since, as per EQUATION 6A above, the original image is processed at its full dynamic range in Phase Two, the down-sampling of Phase One results in no loss of detail.

In fact, the filtered images are real-valued rather than integer valued, since their computation involves averaging of integer color values. If the response curves have large gradients, the 8-bit representation for filtered images may lead to visible banding effect, whereby the 8-bit value of a filtered image changes by just a single step, inasmuch as a response curve multiplier f(x) can be much larger than f(x+1). It is contemplated by the present invention that filtered images be computed using more than 8-bit precision. It will be appreciated by those skilled in the art that the algorithms described herein are readily adaptable to filtered images with more than 8-bit precision. One such adaptation uses interpolation between successive values of a response curve when composing the curve with filtered image intensities. Specifically, the response curve may be treated as if it has a domain of 8 bit local brightness intensities between 0 and 255, but when fed into step 240 (FIG. 2), its values may be interpolated for evaluation with 16-bit filter image intensity values between 0 and 65535.

Reference is now made to APPENDIX A, which is a detailed listing of computer source code written in the C++ programming language for implementing color enhancement, in accordance with an embodiment of the present invention. For computational efficiency, the terms $g_{min}$ and $g_{max}$ are pre-computed for all values of MIN and MAX, and the results are stored in look-up tables. This eliminates the need for re-computing the exponential terms in EQUATIONS 6D and 6E as the enhanced image pixel color values are being determined.

It is further noted that the parameters in TABLE I and the color boost parameter $k_{CB}$ do not impact the filter calculations. As such, the currently saved filtered images can be re-used when a user adjusts these parameters. This eliminates the need for re-applying the filter.

It is further noted that on computers having multiple processors and/or processors with multiple 'cores', where more than one thread of execution may run simultaneously, each running at the same processing speed as if running only a single thread of execution, the computation of the first and second filtered images may be performed concurrently, thereby reducing the time required to complete Phase One by nearly one half.

The computation time for the actual image enhancement, Phase Two, may also be reduced on multi-processor and multi-core processors by dividing the image into strips of equal size and processing each strip concurrently, where the number of strips corresponds to the total number of concurrent threads of execution supported by the processor(s); i.e., the total number of 'cores'.

5.2 Statistical Processing

As described hereinabove, a technique for generating brightening and darkening response curves uses a clipping factor multiplier, m(O), which scales a response curve so that a specified fraction, O, of color values of an original input image will fall out of the range [0, S] after being enhanced. Specifically, for grayscale images, referring to EQUATION 5A hereinabove, given a brightening response curve f, the multiplier m(O) is chosen so that the fraction of pixels of the enhanced image, $m \cdot f(I_{filter})*I_{source}$, which exceed the value S, is equal to O. Similarly, given a darkening response curve f, the multiplier m(O) is chosen so that the fraction of pixels of the offset image $I_{source} - g_{offset}$ which fall below 0, is equal to O.

In order to find such an optimal multiplier, m, a general methodology is used to determine, given a brightening response curve f and a filtered image $I_{filter}$, the fraction of pixels of the enhanced image $f(I_{filter})*I_{source}$ which exceed the value S.

The algorithm provided by the present invention and described hereinbelow is as follows.

ALGORITHM VII: Determination of the number of clipped pixels

Input: An original source image, $I_{source}$, a filtered local maximum image, $I_{filter}$, and a response function f.
Output: The number of pixels of the enhanced output image that will have color values that exceed the maximum color value, S.

In this regard, it is convenient to store a joint frequency histogram array $h[s][t]=\#\{\text{pixel locations}(i,j): I_{filter}(i,j)=s \text{ and } I_{source}(i,j)=t\}$, for each sample color value s and each sample color value t, ranging between 0 and S. Then the number of pixels of the enhanced image $f(I_{filter})*I_{source}$ which exceed S is given by $$\sum_{s=0}^{S} \sum_{t=\lceil \frac{S+0.5}{f(s)} \rceil}^{S} h[s][t] = \sum_{s=0}^{S} H'[s][\lceil (S+1)/f(s) \rceil], \quad (9)$$

where $\lceil x \rceil$ denotes the lowest integer greater than or equal to x, and where H'[s][t] is the joint cumulative frequency array $$H'[s][t] = \sum_{u=i}^{S} h[s][u] == \#\{\text{pixel locations}(i, j):I_{filter}(i, j) = s \text{ and } I_{source}(i, j) \geq t\}.$$

For purposes of efficiency of implementation, the joint cumulative frequency array H'[s][t] is generated once after Phase One and saved in memory, since it does not change after Phase One is complete; namely, after the filtered image $I_{filter}$ has been calculated.

For color images, instead of using $I_{filter}$, a joint cumulative frequency array HMAX[s][t], corresponding to MAX$_{filter}$, is generated for use with the brightening response function. Moreover, for color images, instead of using $I_{source}$ in the definition of the joint frequency histogram array h[s][t], this array is defined vis a vis the respective source image MAX$_{source}$(i,j)=maximum(R(i,j), G(i,j), B(i,j)), as defined above in Sec. 1.1.3, since out-of-range clipping occurs if any of the three RGB values exceeds S. Thus, H-MAX[s][t]=#{pixel locations(i,j): MAX$_{filter}$(i,j)=s and maximum(R(i,j),G(i,j),B(i,j))≥t}.

Similarly, a general methodology is used to determine, given a darkening response curve f and a filtered image $I_{filter}$, the fraction of pixels of the offset image $I_{source}-g_{offset}(I_{filter})$ which fall below 0, where $g_{offset}$ is determined by EQUATION 5D.

The algorithm provided by the present invention and described hereinbelow is as follows.
ALGORITHM VIII: Determination of the number of clipped pixels
Input: An original source image, $I_{source}$, a filtered local minimum image, $I_{filter}$, and a response function f.
Output: The number of pixels of the enhanced output image that will have color values that fall below zero.

Based on the joint frequency histogram array h[s][t], the number of pixels of the offset image which fall below is given by $$\sum_{s=0}^{S} \sum_{t=0}^{\lfloor S(1-\frac{1}{f(s)}) - \frac{0.5}{f(s)} \rfloor} h[s][t] = \sum_{s=0}^{S} H[s][\lfloor S*(1-1/f(s))-0.5/f(s) \rfloor], \quad (10)$$

where $\lfloor x \rfloor$ denotes the greatest integer less than or equal to x, and where H[s][t] is the joint cumulative frequency array $$H[s][t] = \sum_{u=0}^{t} h[s][u] == \#\{\text{pixel locations}(i, j):I_{filter}(i, j) = s \text{ and } I_{source}(i, j) \leq t\}.$$

For color images, although the enhancement EQUATIONS 6A-E involve more terms that the grayscale enhancement EQUATIONS 5A-D, upper bounds for the clipping fraction are easily obtained by similar frequency arrays. Specifically, referring to EQUATIONS 6A-C, it follows that for brightening alone, without darkening, i.e., for $g_{min}=1$, $C_{enhanced}=[1+k_{CB}*(g_{max}-1)]*C_{source}+(1-k_{CB})*(g_{max}-1)*L_{source}.$ Thus, since $C_{source} \leq MAX_{source}$ and L≤MAX, it follows further that $C_{enhanced} \leq g_{max}*MAX_{source}.$ (11)

As such, the same analysis that led to EQUATION 9 applies to color images.

Similarly for darkening alone, without brightening, i.e., for $g_{max}=1$, it follows that $C_{enhanced}=(1-k_{CB})*(g_{min}-1)*D+[1+k_{CB}*(g_{min}-1)]*E.$ Thus, since C≥MIN$_{source}$ and L≥MIN$_{source}$, it follows further that D≥MIN$_{source}-g_{offset}$ and E≥MIN$_{source}-g_{offset}$, and thus $C_{enhanced} \geq g_{min}*(MIN_{source}-g_{offset}).$ (12)

As such, the same analysis that led to EQUATION 10 applies to color images.

Based on these consideration, for color images a joint cumulative frequency array HMIN[s][t] is generated and stored; instead of using $I_{filter}$, an array HMIN[s][t], corresponding to MIN$_{filter}$, is generated for use with the darkening response function. Moreover, for color images, instead of using $I_{source}$ in the definition of the joint frequency histogram array h[s][t], this array is defined vis a vis the source image MIN$_{source}$(i,j)=minimum(R(i,j), G(i,j), B(i,j)), as defined above in Sec. 1.1.3, since out-of-range clipping occurs if any of the three enhanced RGB values fall below 0. Thus, HMIN[s][t]=#{pixel locations(i,j):MIN$_{filter}$(i,j)=s and minimum(R(i,j),G(i,j),B(i,j))≤t}.

Using EQUATION 9 or 10, it is possible to iteratively find the optimal value m(O) as indicated in step 2 hereinbelow. Specifically, for a candidate value of a multiplier, m, EQUATION 9 can be used to determine the fraction of pixels that exceed S, and EQUATION 10 can be used to determine the fraction of pixels that fall below 0. Depending on whether or not this fraction exceeds the desired fraction, O, the multiplier m is decreased or increased, respectively. In one embodiment of the present invention, a binary search on m is used, whereby the next value of m is chosen as the value halfway between the current value of m and the previous value of m that was lower or higher than the current value, respectively.

When applying both brightening and darkening response curves to an image, the actual fraction of out-of-range pixels is somewhat lower than the fractions predicted using the joint cumulative frequency arrays HMAX and HMIN, since some color values that fall out-of-range when brightened by the brightening response curve may fall back in range when darkened by the darkening response curve. In practice, it has been found that such discrepancy is minimal.

It will be appreciated by those skilled in the art that the above derivations are based on the definition of an out-of-range pixel being a pixel such that at least one of its three color values is out of range. Alternatively, an out-of-range pixel may be defined as (i) a pixel such that all of its three color values are out of range, or (ii) a pixel such that its luminance color value is out of range. One may alternatively (iii) define the number of pixels that are out-of-range by assigning a number to each pixel (i,j) defined as an average:
{red or green or blue color values at (i,j) that are out of range}/3. In each case (i), (ii) and (iii), the joint frequency histogram array h[s][t] can be redefined appropriately so that EQUATIONS 9 and 10 remain valid.

For the experimental results provided below, clipping definition (i) was used for darkening, and clipping definition (iii) was used for brightening. Correspondingly, for darkening enhancement the joint cumulative frequency histogram array is redefined to be HMIN[s][t]=#{pixel locations(i,j):MIN$_{filter}$(i,j)=s and maximum(R(i,j),G(i,j),B(i,j))≤t}.

Similarly, for brightening enhancement the joint cumulative frequency histogram array is redefined to be $$HMAX[s][t] =$$

$$\frac{1}{3} \sum_{(i,j):MAX_{filter}(i,j)=s} \#\{\text{color components } R(i, j), G(i, j), B(i, j) \text{ that are} \geq t\}$$

It will be appreciated by those skilled on the art that by setting the desired fraction to O=0, the maximum multipliers, displayed via the gray areas 660 and 670 (FIG. 6), may be efficiently computed. Such maximum multipliers correspond to the minimum response curve multipliers which cause at least one out of range color value in the enhanced image.

The algorithm provided by the present invention and described hereinbelow is as follows.

ALGORITHM IX: Determination of maximum brightening and darkening multipliers

Input: An original source image, $I_{source}$, a filtered local maximum image, $MAX_{filter}$, and a filtered local minimum image, $MIN_{filter}$.

Output: Maximal brightening and darkening multipliers that avoid out-of-range pixel color values when used to enhance $I_{source}$.

Specifically, based on the above joint cumulative frequency arrays, the maximum brightening multipliers are given by the curve $$f_{B-MAX}(s)=(S+0.5)/t_{max},$$

where $$t_{max}=\max(0 \leq t \leq S: HMAX[s][t]>0);$$

and the maximum darkening multipliers are given by the curve $$f_{D-MAX}(s)=S/(S-t_{min}-0.5),$$

where $$t_{min}=\min(0 \leq t \leq S: HMIN[s][t]>0).$$

It is further recognized that there are many alternatives to EQUATIONS 5A and 5E that provide somewhat different image enhancement effects. In general, such equations are of the form $$I_{enhanced}=(f_b(g_{max},f_d(g_{min},I_{source}))), \text{ or}$$

$$I_{enhanced}=(f_d(g_{min},f_b(g_{max},I_{source}))),$$

depending on whether brightening is applied before or after darkening, where $f_b(b, I)$ and $f_d(g, I)$ are generalized brightening and darkening operations. EQUATIONS 5A and 5E are specific cases of these forms, where $$f_b(g,I)=I*g, \text{ and}$$

$$f_d(g,I)=[I-S*(1-1/g)]*g.$$

By placing special restrictions on $f_b$ and $f_d$, it is possible to use the same local contrast enhancement techniques described herein with little or no modification.

Specifically, if $f_b$ and $f_d$ are monotonically increasing/decreasing functions with respect to g, respectively, over all possible values of I; i.e., $f_b(g_1, I) \geq f_b(g_0, I)$ and $f_d(g_1, I) \leq f_d(g_0, I)$ whenever $g_1 > g_0$, then the binary search method described hereinabove may be used to find optimal curve multipliers.

Furthermore, if $f_b$ and $f_d$ are monotonically increasing/decreasing with respect to I, and if respective inverses $f_b^{-1}$ and $f_d^{-1}$ to $f_b$ and $f_d$ with respect to I can be found, then these inverse functions may be used in EQUATIONS 9 and 10 above to determine the minimum/maximum sample value at which clipping occurs, and the cumulative histogram may be used to quickly determine the number of clipped pixels. For example, if $$f_b(g,I)=g*I, \text{ then}$$

$$f_b^{-1}(g,I)=I/g.$$

Substituting the minimum clipped value S+0.5 for 1 gives $(S+0.5)/g$, which is the minimum value of t in the summation in EQUATION 9. It can be likewise seen that the corresponding maximum summation value of t in EQUATION 10 is $f_d^{-1}(g, -0.5)$. These inverses may also be applied in ALGORITHM IX to determine the maximum brightening and darkening multipliers.

One particular formulation for $f_b$ and $f_d$ that can provide useful results involves the use of gamma curves, which are traditionally used in image process to apply brightening and darkening. Such curves are respectively monotonically nondecreasing/monotonically nonincreasing with respect to g, and invertible with respect to I. If h is a gamma curve having range [0 . . . 1] over the domain [0 . . . 1], then the anticipated formulations for $f_b$ and $f_d$ are:

$$f_b(g,I)=S*h_b(I/S)*g, \text{ and}$$

$$f_d(g,I)=[(S*h_d(I/S)-S*(1-1/g)]*g$$

It is further anticipated that the shape of gamma curve h, which is controlled by a parameter, may be controlled either directly by a control in the user interface, implicitly as a function of $MAX_{filter}/MIN_{filter}$, or jointly controlled by a user interface parameter and $MAX_{filter}/MIN_{filter}$. For example, one useful definition of h is $$h_b(x)=x^{[1+k_C(MAX_{filter}/S-0.5)]}.$$

By defining h in this way, the user interface parameter $k_C$ can be used to control the dynamic range of the image prior to multiplication by $g_{max}$ and $g_{min}$, since larger values of $k_C$ will cause the exponent of the power function to become less than 1 in dark areas of the image, thereby brightening darker pixels, equal to 1 in the midtones, causing no change, and greater than 1 in light areas of the image, thereby darkening lighter pixels. The overall effect is a reduction in contrast, which can help offset the effects of contrast expansion when the output image would otherwise contain more contrast than desired.

The listings of CLCELightCurve::GetMaxCurveFactor( ), CLocalContrastEnhancement::CreateMinMaxHistograms( ), CLCELightCurve::GetBrighteningCurveClippedPixels( ) and CLCELightCurve::GetDarkeningCurveClippedPixels( ) in APPENDIX G provide details of the above statistical processing. The listing of CLCELightCurve::CalculateMaxCurves( ) in APPENDIX G provide details of the maximum brightening and darkening multiplier calculations.

5.3 Fully Automated Compression Settings

In one embodiment of the present invention, an original source image is automatically enhanced with no directives by a user, by determining values of the compression parameters $C_B$ and $C_D$ based only on the source image $I_{source}$.

The algorithm provided by the present invention and described hereinbelow is as follows.

ALGORITHM X: Automatic generation of compression settings without user intervention Input: An original source image, $I_{source}$, and minimum and maximum local color values, $MIN_{filter}$ and $MAX_{filter}$, respectively.

Output: Optimal compression settings.

In this regard, the selections $A_B=A_D=1$ and $O_H=O_S=0.002$ are made. After determining $C_B$ and $C_D$, as described hereinbelow, the full set of native model parameters in TABLE II are obtained. It may be appreciated such an embodiment provides a fully automated system for local contrast enhancement that enhances images without user interaction.

To automatically determine optimal settings for $C_B$ and $C_D$, images with extensive dark or bright areas are compressed more than images without such area. The minimum and maximum filters generated in Phase One of the enhancement algorithm are used to measure the degree of extensive bright or extensive dark areas, since they are insensitive to dark and light pixels that appear in fine detail of the image.

Two methods are described for determining $C_B$ and $C_D$. A first method, referred to as a "center-weighted average", determines weighted averages of the local minimum and maximum local averages, centered at a specific pixel location of the image. The weighted average may be centered at the middle of the image, (image_width/2, image_height/2), or alternatively at a specified point of interest. The specified point of interest may be, for example, the location of the "auto-focus" point when the photo was captured by the camera, or such other point of interest, included with the image meta-data. In an interactive embodiment, the point of interest may alternatively be specified by a user.

After the weighted averages, min_avg and max_avg are calculated, the compression parameters are set to values $C_{BR}=1-\text{max\_avg}/S$, and $C_{DR}=\text{min\_avg}/S$. The listing of CLCELightCurve::GetAutomaticCompressionCWA( ) in APPENDIX G provides details of the above center-weighted average method for automatically setting compression parameters.

A second method for determining $C_B$ and $C_D$, referred to as a "percentile-based" method, uses cumulative frequency arrays $$FMAX[s]=\#\{\text{pixel locations}(i,j):MAX_{filter}(i,j)\leq s\}, \text{ and}$$

$$FMIN[s]=\#\{\text{pixel locations}(i,j):MIN_{filter}(i,j)\leq s\}.$$

The inverses of these arrays are used as percentiles; namely, $$PMAX(p)=\text{minimum}\{s:FMAX[s]>N*p\},$$

$$PMIN(p)=\text{minimum}\{s:FMIN[s]>N*p\},$$

where the percentile p ranges between 0 and 1, and N is the total number of pixels in the image.

Based on the percentile arrays, the compression parameters $C_B$ and $C_D$ are determined by $$C_B=1-PMAX(p_B)/S, \text{ and}$$

$$C_D=PMIN(1-p_D)/S,$$

where the percentile settings $p_B=p_d=0.5$ were used to provide the experimental results provided below. Larger values of $p_B$ or $p_D$ produce lower compression, and smaller values of $p_B$ or $p_D$ produce higher compression.

Alternatively, instead of using percentile functions PMAX and PMIN, a merged percentile function PMINMAX may be used, defined as $$PMINMAX(p)=\text{minimum}\{s:FMAX[s]+FMIN[s]>2*N*p\}.$$

The percentile parameters $p_B$ and $p_D$ may be used instead of $C_B$ and $C_D$ in the user interface. Alternatively, prescribed values of $p_B$ and $p_D$ may be used to determine initial default values for $C_B$ and $C_D$. Moreover, values of the percentiles $p_B$ and $p_D$ may be set based on characteristics of an image acquisition device, such as dynamic range; i.e., lower values of $x_B$ and $x_D$ are used for sensors with higher dynamic range capability. Similarly, values of the percentiles $p_B$ or $p_D$ may be based on meta-data stored in the image, such as contrast level used in converting the image from the camera's native color space to the color space of the stored image; i.e., lower values of $p_B$ and $p_D$ are used with lower contrast settings.

The listings of CLCELightCurve::GetAutomaticBrighteningCompression( ) and CLCELightCurve::GetAutomaticDarkeningCompression( ) in APPENDIX G provide details of the above percentile-based method for automatically setting compression parameters.

6. Discussion of Experimental Results

Figure 8A:
FIG. 8A includes an original source image that suffers from shadows, for enhancement in accordance with an embodiment of the present invention.

Reference is now made to FIG. 8A, which includes an original source image that suffers from shadows, for enhancement in accordance with an embodiment of the present invention. As can be seen in the figure, the brightening and darkening response curves have compression parameters settings of zero; i.e., the response curves are identically one, which corresponds to no enhancement.

Figure 8B:
FIG. 8B includes an enhancement of the source image in FIG. 8A made by using the light curve user interface, whereby the source image was brightened by selecting a local area of foliage and automatically adjusting brightness for the selected area, in accordance with an embodiment of the present invention.

Reference is now made to FIG. 8B, which includes an enhancement of the source image in FIG. 8A made by using the light curve user interface. The source image was brightened by selecting a local area of foliage and automatically adjusting brightness for the selected area, in accordance with an embodiment of the present invention. As can be seen in the figure, the brightening curve has a compression parameter setting of 70 and an amplitude parameter setting of 110. Darkening is turned off in the interface, giving a darkening response curve of identically one. The output image in FIG. 8B has good visual discrimination of variation in foliage coloration, with other parts of the image substantially left unchanged.

Figure 8C:
FIG. 8C includes another enhancement of the source image in FIG. 8A made by using the light curves user interface, whereby the source image was brightened by selecting a local area of sky and automatically adjusting brightness for the selected area, in accordance with an embodiment of the present invention.

Reference is now made to FIG. 8C, which includes an enhancement of the source image in FIG. 8A made by using the light curves user interface. The source image was brightened by selecting a local area of sky and automatically adjusting brightness for the selected area, in accordance with an embodiment of the present invention. As can be seen in the figure, the brightening response curve has a compression parameter setting of 0 and an amplitude parameter setting of 110. Darkening is turned off in the interface, giving a darkening response curve of identically one. The output image in FIG. 8C has good visual discrimination of variation in sky coloration, with other parts of the image substantially left unchanged.

Figure 8D:
FIG. 8D includes another enhancement of the source image in FIG. 8A made by using the light curves user interface, whereby the source image was brightened by selecting a local area of building and automatically adjusting brightness for the selected area, in accordance with an embodiment of the present invention.

Reference is now made to FIG. 8D, which includes an enhancement of the source image in FIG. 8A made by using the light curves user interface. The source image was brightened by selecting a local area of building and automatically adjusting brightness for the selected area, in accordance with an embodiment of the present invention. As can be seen in the figure, the brightening response curve has a compression parameter setting of 55 and an amplitude parameter setting of 110. Darkening is turned off in the interface, giving a darkening response curve of identically one. The output image in FIG. 8D has good visual discrimination of building coloration, with other parts of the image substantially left unchanged.

Figure 8E:
FIG. 8E includes another enhancement of the source image in FIG. 8A made using automatic settings for all parameters, in accordance with an embodiment of the present invention.

Reference is now made to FIG. 8E, which includes an enhancement of the source image in FIG. 8A made using automatic settings for all parameters, in accordance with an embodiment of the present invention. As can be seen in the figure, the brightening response curve has a compression parameter setting of 82 and an amplitude parameter setting of 110, while the darkening response curve has a compression parameter setting of 18 and an amplitude parameter setting of 100. The output image in FIG. 8E has good visual discrimination in all areas of the image.

Figure 8F:
FIG. 8F includes another enhancement of the source image in FIG. 8A made by starting with automatic settings and then selecting a local area of building and automatically adjusting brightness of the selected area, in accordance with an embodiment of the present invention.

Reference is now made to FIG. 8F, which includes an enhancement of the source image in FIG. 8A made by using the light curves user interface, in accordance with an embodiment of the present invention. The response curves were first generated using automatic settings, and then the brightening response curve was modified by holding down <Ctrl> while double-clicking on an area of the building. Compared with the automatically enhanced image of FIG. 8E, the visual discrimination of the building in FIG. 8F has been enhanced, while the foliage has become somewhat darker.

Figure 8G:
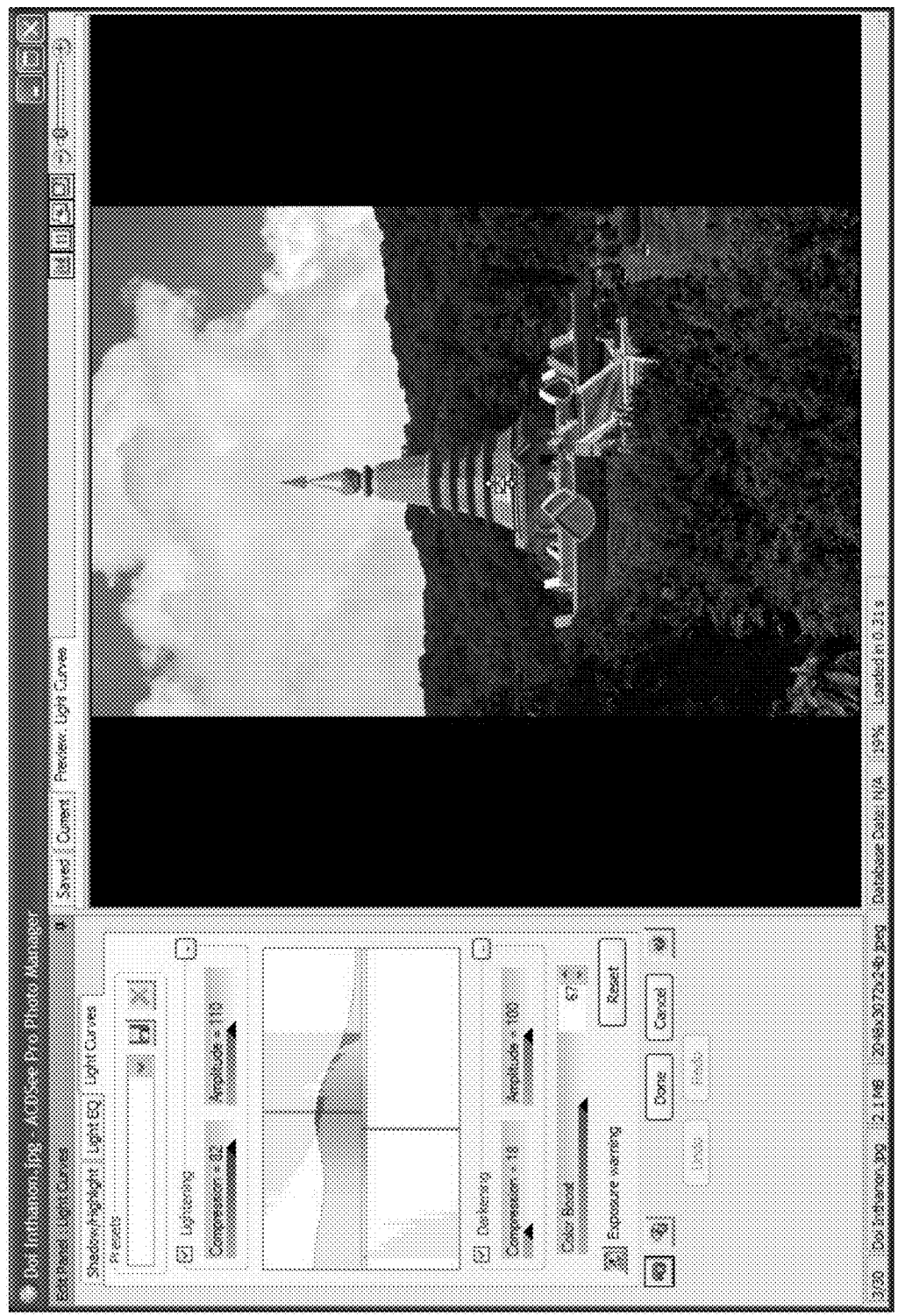
FIG. 8G includes another enhancement of the source image in FIG. 8A made by starting with automatic settings, then twice successively selecting a local area of building and automatically adjusting brightness of the selected area, in accordance with an embodiment of the present invention.

Reference is now made to FIG. 8G, which includes an enhancement of the source image in FIG. 8A made by using the light curves user interface, in accordance with an embodiment of the present invention. The response curves were first generated using automatic settings, the brightening response curve was modified by holding down <Ctrl> while double-clicking on an area of the building as in FIG. 8F, whereupon the brightening response curve was further modified by holding down <Ctrl> while double-clicking on the same area of the building a second time. Compared with the enhanced image of FIG. 8F, the visual discrimination of the building in FIG. 8G has been enhanced, while the foliage has become somewhat darker. As can been seen from comparing the figures, the <Ctrl>+<Double-Click> mechanism can be highly effective in optimizing the response curves for a specific subject in a photographic scene.

Figure 8H:
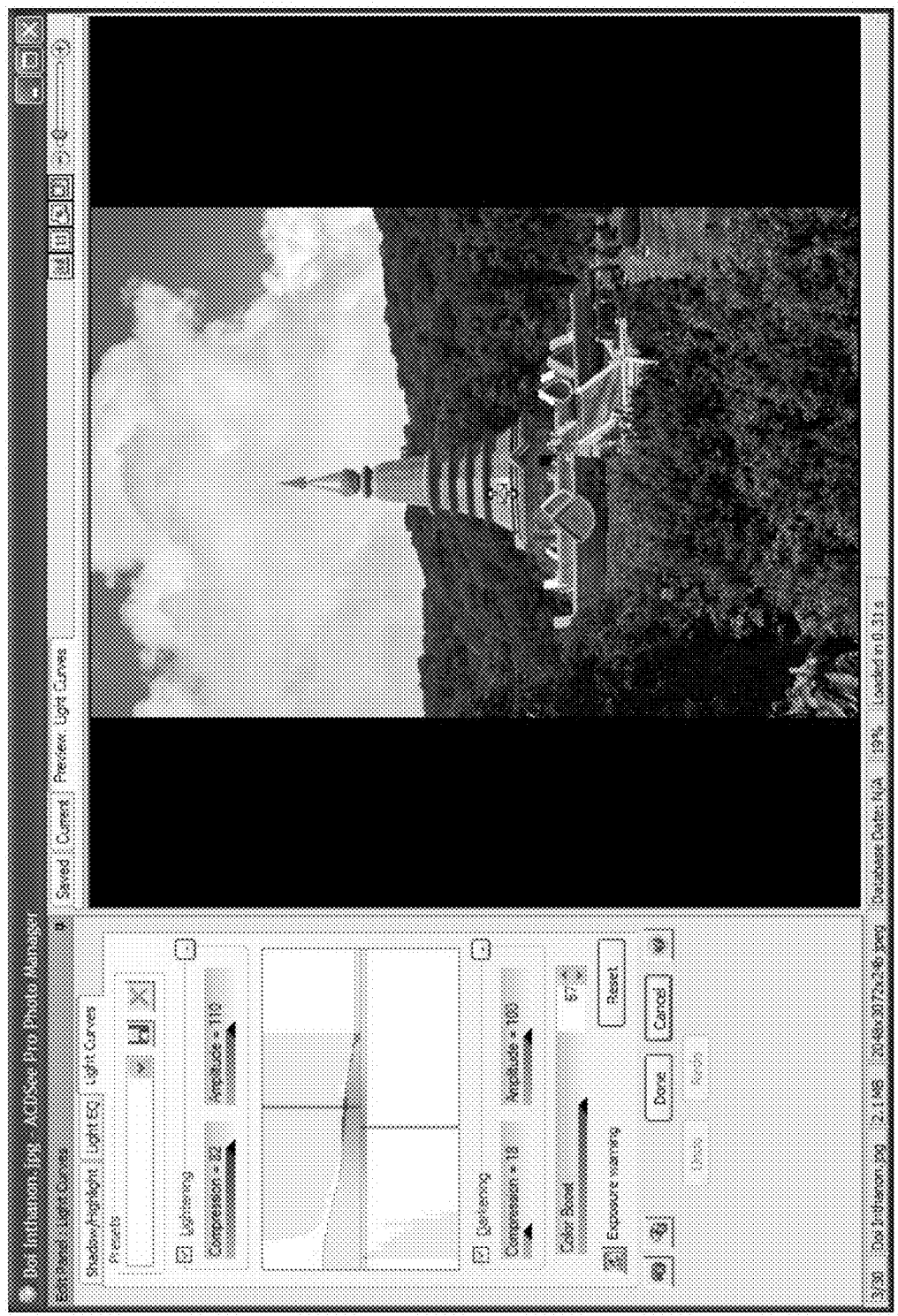
FIG. 8H includes another enhancement of the source image in FIG. 8A made by starting with automatic settings, then selecting a local area of building and manually adjusting brightness of the selected area, in accordance with an embodiment of the present invention.

Reference is now made to FIG. 8H, which includes an enhancement of the source image in FIG. 8A made by using the light curves user interface, in accordance with an embodiment of the present invention. The response curves were first generated using automatic settings, and then brightening response curve was modified by scrolling the mouse wheel up by five steps while pointing at an area of the building and holding down <Ctrl> to select the constrained amplitude curve modification mode. Compared with the automatically enhanced image of FIG. 8E, the visual discrimination of the building in FIG. 8H has been enhanced, while the foliage has become somewhat darker. As can been seen from comparing the figures, constrained amplitude curve modification mode can be highly effective in optimizing the response curves for a specific subject in a photographic scene.

Figure 8I:
FIG. 8I includes another enhancement of the source image in FIG. 8A made by directly adjusting the brightness response curve, in accordance with an embodiment of the present invention.

Reference is now made to FIG. 8I, which includes an enhancement of the source image in FIG. 8A made by using the light equalizer user interface. As can be seen in the figure, the brightening response curve has been directly adjusted so as to have a "hump" in the middle. In the output image of FIG. 8I, the building, whose local color values correspond roughly with the hump in the response curve, has good visual discrimination, while other parts of the image are substantially left unchanged.

Figure 9A:
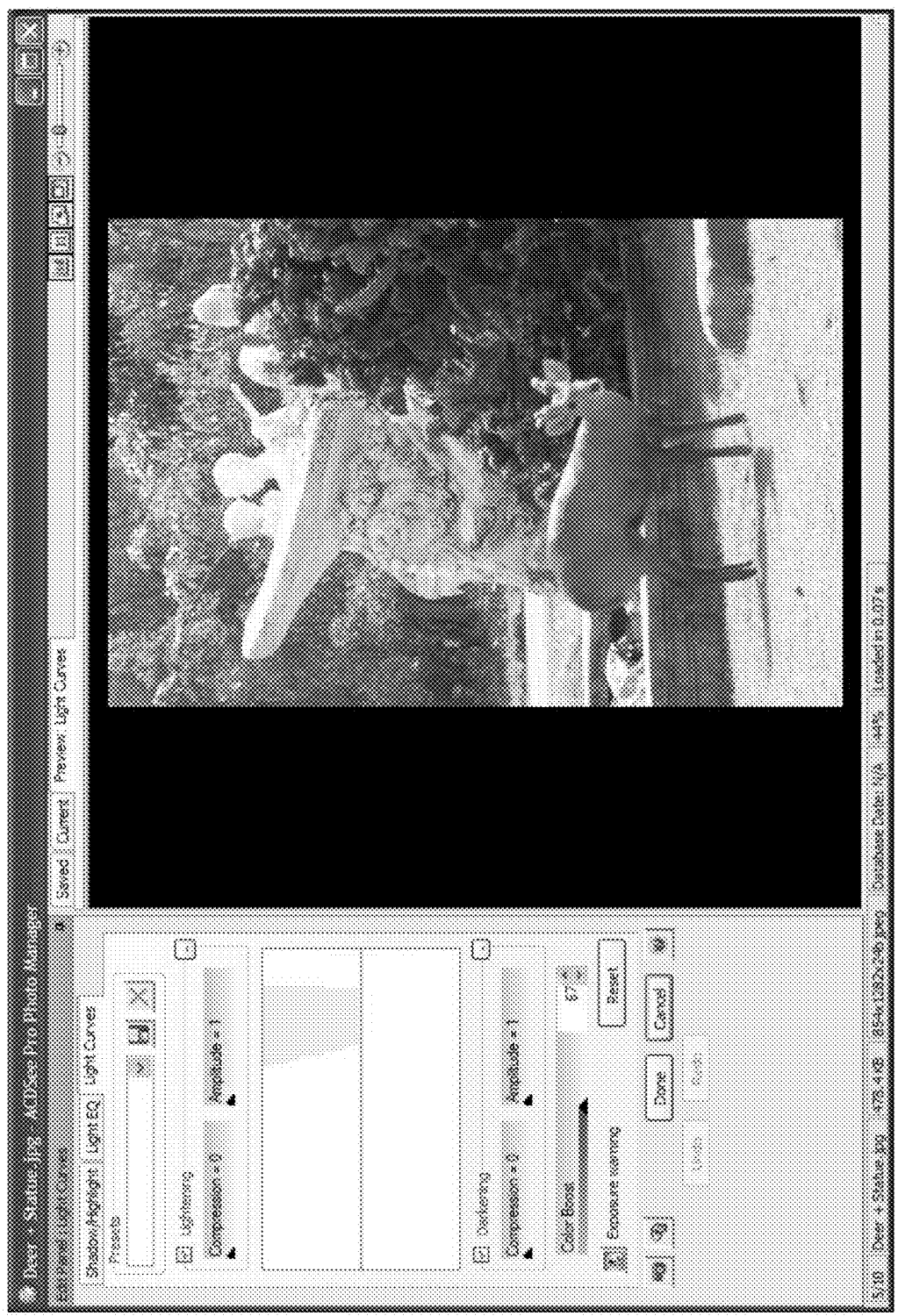
FIG. 9A includes an original source image that suffers from lighting, for enhancement in accordance with an embodiment of the present invention.

Reference is now made to FIG. 9A, which includes an original source image that suffers from lighting, for enhancement in accordance with an embodiment of the present invention. As can be seen in the figure, the brightening and darkening response curves have compression parameters settings of zero and amplitude settings of one; i.e., the response curves are nearly identically one, which corresponds to no effective enhancement.

Figure 9B:
FIG. 9B includes an enhancement of the source image in FIG. 9A made by using the light curves user interface, whereby the source image was both brightened and darkened by selecting a local area of statue and automatically adjusting brightening and darkening for the selected area, in accordance with an embodiment of the present invention.

Reference is now made to FIG. 9B, which includes an enhancement of the source image in FIG. 9A made by using the light curves user interface. The source image was both brightened and darkened by selecting a local area of statue and automatically adjusting brightening and darkening for the selected area, in accordance with an embodiment of the present invention. As can be see in the figure, the darkening response curve has a compression parameter setting of 85 and an amplitude parameter setting of 103; and the brightening response curve has a compression parameter setting of 75 and an amplitude parameter setting of 50. The output in FIG. 9B has enhanced visual discrimination not only in the statue, but also in most areas of the image as well.

Figure 9C:
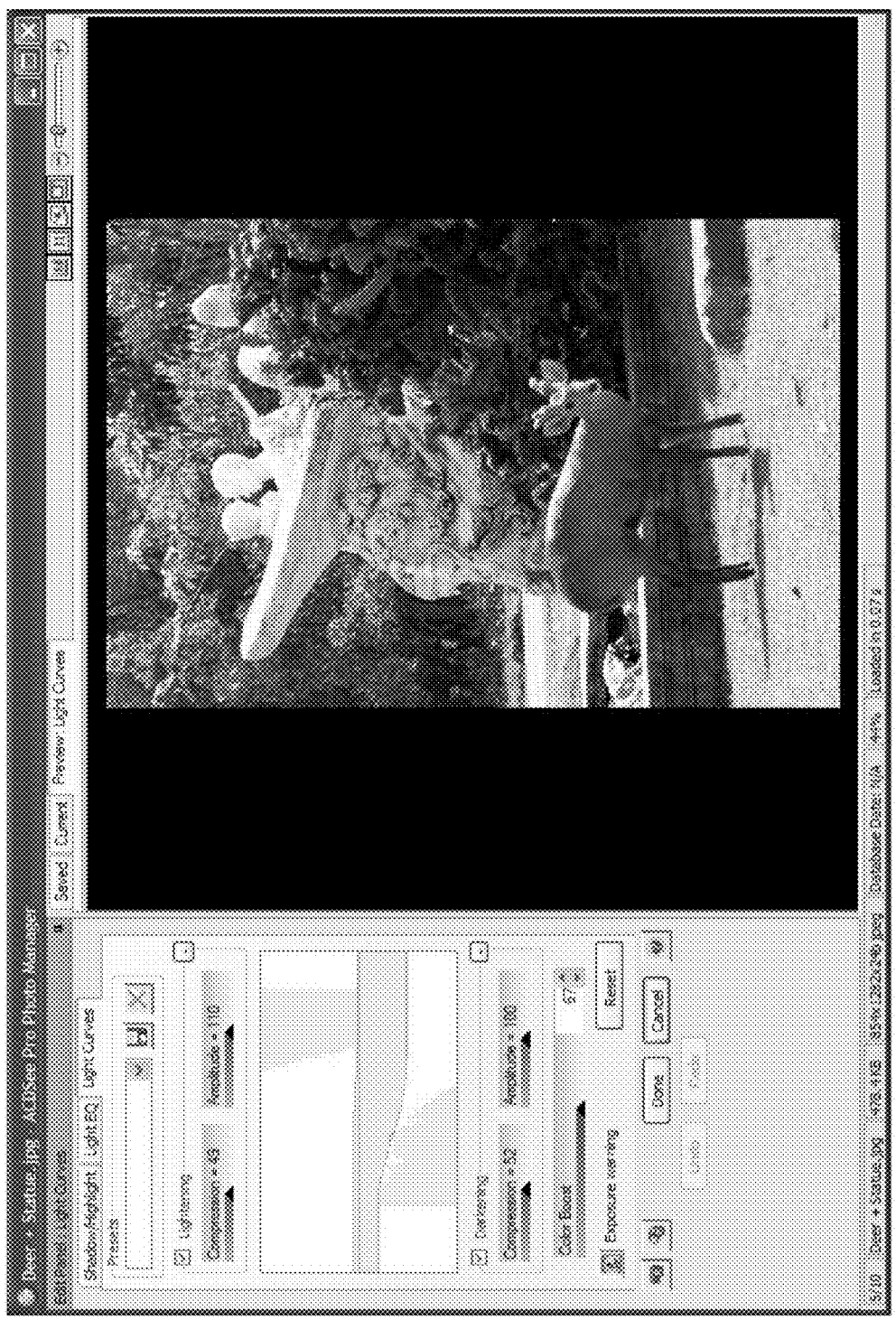
FIG. 9C includes another enhancement of the source image in FIG. 9A made using automatic settings for all parameters, in accordance with an embodiment of the present invention.

Reference is now made to FIG. 9C, which includes an enhancement of the source image in FIG. 9A made using automatic settings for all parameters, in accordance with an embodiment of the present invention. As can be seen in the figure, the brightening response curve has a compression parameter setting of 49 and an amplitude parameter setting of 110, while the darkening response curve has a compression parameter setting of 52 and an amplitude parameter setting of 100. The output image in FIG. 8C has good visual discrimination in all areas of the image. As can be seen by comparing the automatic compression parameter settings of FIG. 9C with those of FIG. 8E, the algorithm for determining the automatic settings is sensitive to the content of the image. The image of FIG. 8E was effectively brightened, while the image of FIG. 9C was effectively darkened.

Figure 9D:
FIG. 9D includes another enhancement of the source image in FIG. 9A made by using the light curves user interface, in accordance with an embodiment of the present invention.

Reference is now made to FIG. 9D, which includes an enhancement of the source image in FIG. 9A made by using the light curves user interface, in accordance with an embodiment of the present invention. The response curves were first generated using automatic settings, and then the brightening response curve was modified by holding down <Ctrl> while double-clicking on an area of the foreground foliage. Compared with the automatically enhanced image of FIG. 9C, the visual discrimination of the foreground foliage in FIG. 9D has been enhanced.

7. Discussion of Appendices

Reference is now made to FIG. 10A-10E, which are flow diagrams of the principal software methods in the source code listed in APPENDICES A-G, in accordance with an embodiment of the present invention. The listings in APPENDICES A-G include line numbers within methods, for ease of reference.

Methods in FIG. 10A-10E are shown grouped by module.

The CLocalContrastEnhancement module, listed in APPENDIX A, is responsible in Phase One for causing the first and second filtered images to be created from the original image and cached, for creating and caching the joint cumulative frequency histograms of the first and second filtered images, and in Phase Two for carrying out the actual contrast enhancement corresponding to EQUATIONS 6A-6E hereinabove.

The IP_LocalMinMax module, listed in APPENDIX B, is a filter processor responsible for creating the first and second filtered images.

The CLCESimpleDLg, CLCELightEQDlg and CLCELightCurveDlg modules, listed in APPENDICES C-E, are responsible for managing the user interface of the Brighten & Darken, Light Equalizer and Light Curves interfaces described hereinabove; and the CLCELightCurveCtl module, listed in APPENDIX F, is responsible for displaying the visualization of the response curves and for accepting user input directed within the visualization area.

The CLCELightCurve module, listed in APPENDIX G, is responsible for generating response curves based on the parameters, and for modifying those curves, in support of the user interfaces.

Figure 10A:
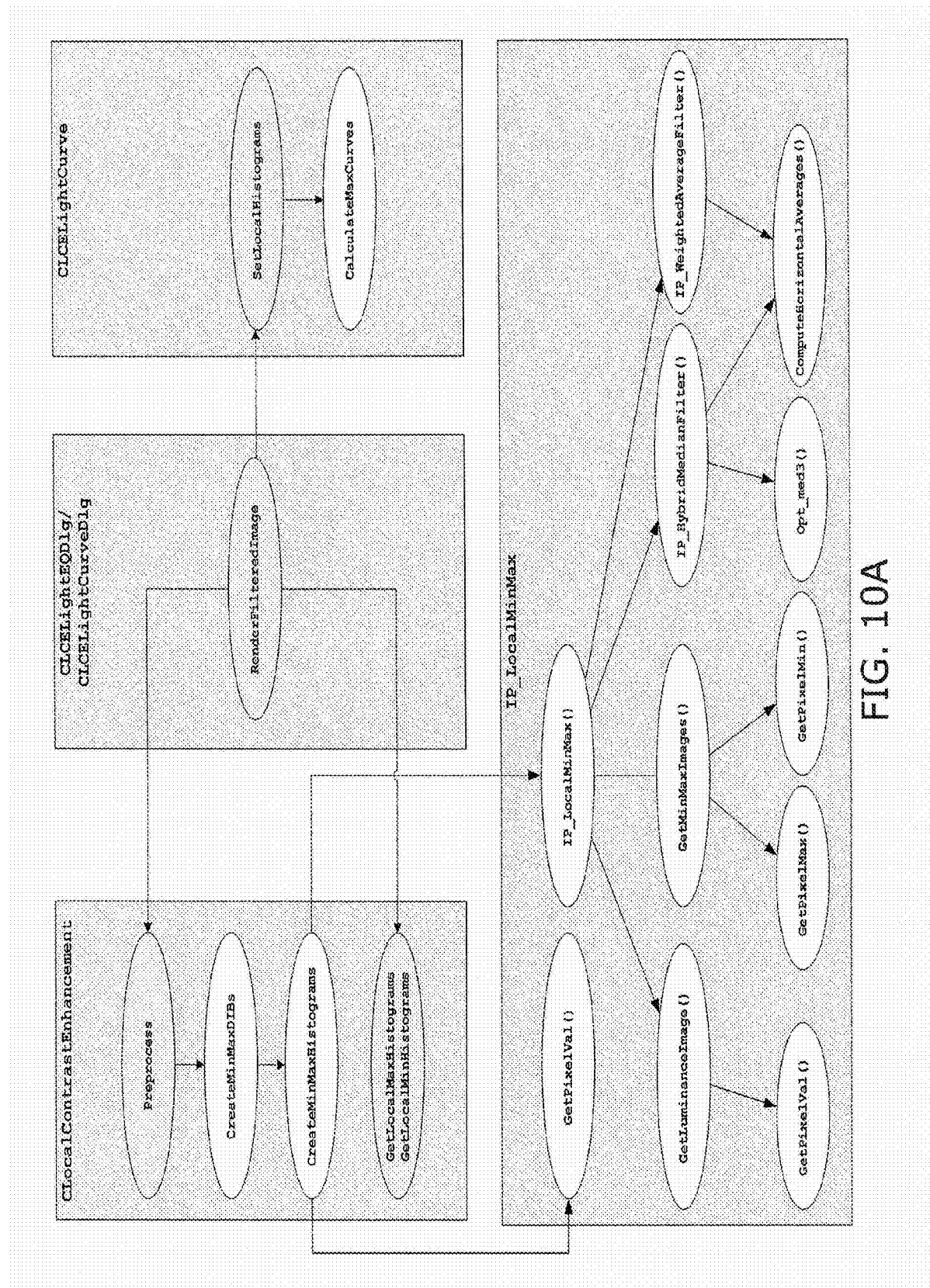
FIG. 10A is a flow diagram of the methods involved in a preprocessing stage, for the source code listed in APPENDICES A and B, in accordance with an embodiment of the present invention.

Reference is now made to FIG. 10A, which is a flow diagram of methods involved in the preprocessing stage, in accordance with an embodiment of the present invention.

The main method Preprocess( ), which is called by RenderFilteredImage( ) once during the initialization phase of the user interface, causes the generation and caching of items used in phase Two of the local contrast enhancement. At lines 11 and 12, Preprocess( ), which is listed in APPENDIX A, calls CreateMinMaxDIBs( ) to generate the filtered image MIN$_{filter}$ and MAX$_{filter}$, which are arrays accessed by member pointers m_pDIBMin and m_pDIBMax, respectively.

The method CreateMinMaxDIBs( ), listed in APPENDIX A, calls IP_LocalMinMax( ) at lines 65-67, which is the main method used to generate the filtered images MIN$_{filter}$ and MAX$_{filter}$, in accordance with an embodiment of the present invention. CreateMinMaxDIBs( ) also generates the source luminance image, L$_{source}$, by calling GetPixelVal( ) at line 27 and at line 47. L$_{source}$ is an array accessed by a member pointer m_pDIBY. In addition, CreateMinMaxDIBs( ) also calls CreateMinMaxHistograms( ) at line 81 to generate the joint cumulative frequency histograms HMIN and HMAX, which are two-dimensional arrays of 256×256 integers, accessed by member pointers pHistLocalMin and pHistLocalMax respectively.

The method IP_LocalMinMax( ), listed in APPENDIX B, generates the filtered images MIN$_{filter}$ and MAX$_{filter}$, and stores the results in arrays accessed by pointers pBitsMin and pBitsMax, respectively. The parameter pColorPriority determines whether to filter the luminance source image, as described in Sec. 1.1.2 hereinabove, or else to filter the maximum and minimum sources images, as described in Sec. 1.1.3 hereinabove. Correspondingly, at lines 50 and 51 GetMinMaxImages( ) is called, and at lines 59 and 60 GetLuminanceImage( ) is called. The parameter iMethod determines whether to use a median filter, as described in Sec. 1.1 hereinabove, or a weighted average filter, as described in Sec. 1.2 hereinabove. Correspondingly, at lines 89 and 90 the method IP_HybridMedianFilter( ) is called, and at lines 92 and 93 the method IP_HybridWeightedAverageFilter( ) is called, for computing MIN$_{filter}$. Similarly, at lines 125 and 126 the method IP_HybridMedianFilter( ) is called, and at lines 128 and 129 the method IP_HybridWeightedAverageFilter( ) is called, for computing MAX$_{filter}$.

The method IP_HybridMedianFilter( ), listed in APPENDIX B, carries out EQUATIONS 2A-2G hereinabove. At lines 52 and 53, the method ComputeHorizontalAverages( ) is called, to compute various sub-window averages, as described hereinbelow, and at lines 84-91 the appropriate averages are stored in arrays pAveWindowWest, pAveWindowEast, etc. The EQUATIONS 3A-3C are carried out at lines 101-121 using the method opt_med3( ) to compute the median of three numbers.

The method IP_HybridWeightedAverageFilter( ), listed in APPENDIX B, carries out EQUATION 4 hereinabove. The parameter iMethod is used to determine the weights that are used, in accordance with methods 1-4 described hereinabove in Sec. 1.2, as can be seen in lines 53-79. The weights are tabulated in an array pnWeights [ ]. For method 4, the weights are modified at lines 99 and 100, to incorporate the multiplication by exp($-r^2/k^2$). At lines 110 and 111 the method ComputeHorizonalAverages( ) is called, to compute various sub-window averages, as described hereinbelow. The weighted average in EQUATION 4 is computed at lines 159-166 and lines 183-190.

The method GetMinMaxImages( ), listed in APPENDIX B, computes the source minimum and maximum images, MIN$_{source}$ and MAX$_{source}$, using the methods GetPixelMin( ) and GetPixelMax( ), respectively. Similarly, the method GetLuminanceImage( ), listed in APPENDIX B, computes the luminance source image, L$_{source}$, using the method GetPixelVal( ).

The method ComputeHorizontalAverages( ), listed in APPENDIX B, computes one-dimensional horizontal (2M+1)×1 sub-window averages. These horizontal averages are then averaged vertically at lines 61-76 of method IP_HybridMedianFilter( ) and lines 119-134 of method IP_Hybrid-WeightedAverageFilter( ), to derive the two-dimensional (2M+1)×(2M+1) sub-window averages.

The method CreateMinMaxHistograms( ), listed in APPENDIX A, computes joint frequency histograms which are later used to generate the joint cumulative frequency histograms HMIN and HMAX. For color images, the four alternative definitions of clipping are directed by the values of nBlackClippingType and nWhiteClippingType, and handled by the if . . . else statements in lines 92-134 and in lines 158-200. For the case where clipping definition (iii) is used (CLIPPING_PARTIAL), lines 215-218 normalize the frequency counts with respect to the three color samples per pixel by accordingly dividing the frequency counts by three.

After the Preprocess( ) method is completed, RenderFilterImage( ) calls GetLocalMaxHistograms( ) and GetLocalMinHistograms( ) to retrieve the joint frequency histograms, which are then passed into the CLCELightCurve module via the SetLocalHistograms( ) method, listed in APPENDIX G. The joint cumulative frequency histograms HMIN and HMAX are stored in member variables m_pHistLocalMinCum and m_pHistLocalMaxCum at lines 21 and 42, respectively. At line 48, CalculateMaxCurves( ) is called to generate the maximum multiplier curves.

The method CalculateMaxCurves( ), listed in APPENDIX G, generates the maximum multiplier curves from the joint frequency histograms, stored in member variables m_pHistLocalMin and m_pHistoLocalMax. The maximum multiplier curves are stored in member variables m_dMinBrightening and m_dMaxBrightening at lines 48 and 17, respectively.

Figure 10B:
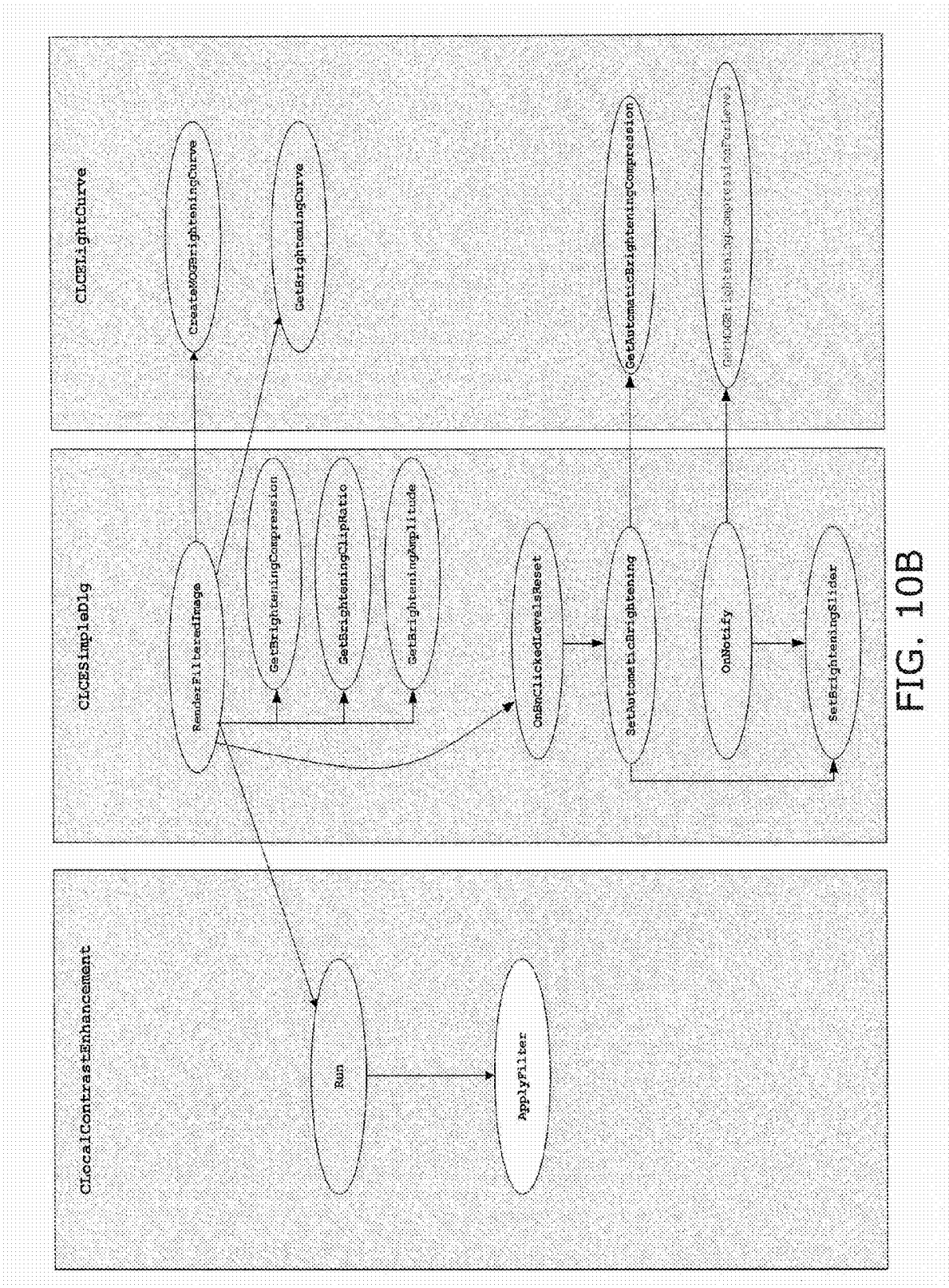
FIG. 10B is a flow diagram of the methods involved in implementing the Brighten and Darken user interface, for the source code listed in APPENDIX C, in accordance with an embodiment of the present invention.

Reference is now made to FIG. 10B, which is a flow diagram of methods involved in implementing the Brighten & Darken user interface, in accordance with an embodiment of the present invention.

The method RenderFilteredImage( ), listed in APPENDIX C, is called whenever the preview or final image needs to be generated in response to the user modifying one of the slider positions, clicking on the image to adjust the brighten or darken level, or clicking on the 'Done' button.

At lines 41-44, the CLCELightCurve::CreateMOGBrighteningCurve( ) and CLCELightCurve::CreateMOGDarkeningCurve( ) methods are called to generate the brightening and darkening response curves, respectively. The compression, clipping, and amplitude parameters are computed from the current brighten and darken slider positions by calling the GetBrighteningCompression( ), GetBrighteningClipRatio( ), GetBrighteningAmplitude( ),GetDarkeningCompression( ), GetDarkeningClipRatio( ), and GetDarkeningAmplitude( ) methods.

At lines 45 and 46, the brightening and darkening response curves are retrieved by calling the CLCELightCurve::GetBrighteningCurve( ) and CLCECurve::GetDarkeningCurve( ) methods.

At lines 48-50, the CLocalContrastEnhancement::Run( ) method is called with the retrieved response curves to generate the contrast enhanced image, which is stored in the local parameter ppDIBOut.

The CLocalContrastEnhancement::Run( ) method, listed in APPENDIX A, calls the ApplyFilter( ) method at lines 23-26 in order to product the contrast-enhanced image corresponding to the response curves.

The ApplyFilter( ) method, listed in APPENDIX A, applies contrast enhancement to the source image according to the response curves. The darkening and brightening multipliers $g_{min}$ and $g_{max}$ are tabulated and stored in look-up tables dFacLUTH[ ] and dfacLUTS[ ], respectively. The color boost parameter, $k_{CB}$, is stored in the variable dCBColor. Lines 135-243 correspond to EQUATIONS 6A-6C for 24-bit color images. Other code sections in ApplyFilter( ) correspond to 8-bit, 16-bit and 64-bit color images.

The CLCESimpleDlg methods GetBrighteningCompression( ), GetBrighteningClipRatio( ), GetBrighteningAmplitude( ), GetDarkeningCompression( ), GetDarkeningClipRatio( ), and GetDarkeningAmplitude( ) compute the six native local contrast enhancement model parameters listed in TABLE 1 from the current positions of the brighten and darken sliders.

The method OnBnClickedLevelsReset( ), listed in APPENDIX C, is called whenever the user presses the Reset button to reset the interface to initial settings, or when RenderFilteredImage( ) is called for the first time. At line 4 it calls the SetAutomaticBrightening( ) method to set the brighten slider to the calculated optimal position. At line 8 it calls the SetAutomaticDarkening( ) method to set the darken slider to the calculated optimal position.

The method SetAutomaticBrightening( ), listed in APPENDIX C, computes the optimal brightening compression parameter $C_B$ for the image by calling GetAutomaticBrighteningCompression( ) at lines 3-4, and then sets the brighten slider to the position corresponding to the compression parameter by calling the SetBrighteningSlider( ) at line 5.

The method SetAutomaticDarkening( ), listed in APPENDIX C, computes the optimal Darkening compression parameter $C_D$ for the image by calling CLCELightCurve::GetAutomaticDarkeningCompression( ) at lines 3-4, and then sets the Darken slider to the position corresponding to the compression parameter by calling the SetDarkeningSlider( ) at line 5.

The method SetBrighteningSlider( ), listed in APPENDIX C, sets the position of the brighten slider so that it corresponds to the value specified by parameter dCompression.

The method SetDarkeningSlider( ), listed in APPENDIX C, sets the position of the darken slider so that it corresponds to the value specified by parameter dCompression.

The method OnNotify( ), listed in APPENDIX C, is called whenever the user clicks mouse while pointing at an area of the preview image.

At lines 11-13, the values of the first and second filtered images corresponding to the point on the preview image where the user clicked are retrieved and stored in local variables iLocalMax and iLocalMin.

Lines 20-27 handle the case where the user clicks on the image with the left mouse button. At lines 23-25, the CLCELightCurve::GetMOGBrighteningCompressionForLevel( ) method is called to obtain a compression parameter value corresponding to iLocalMax, which is then passed to the SetBrighteningSlider( ) method, which in turn sets the brighten slider to the position corresponding to the resulting compression level.

Lines 28-35 handle the case where the user clicks on the image with the right mouse button. At lines 31-33, the CLCELightCurve::GetMOGDarkeningCompressionForLevel( ) method is called to obtain a compression parameter value corresponding to iLocalMin, which is then passed to the SetDarkingSlider( ) method, which in turn sets the darken slider to the position corresponding to the resulting compression level.

Lines 37-48 handle the case where the user double-clicks on the image with the left mouse button. At lines 40-42, the CLCELightCurve::GetMOGBrighteningCompressionForLevel( ) method is called to obtain a compression parameter value corresponding to iLocalMax, which is then passed to the SetBrighteningSlider( ) method, which in turn sets the brighten slider to the position corresponding to the resulting compression level. At lines 43-45, the CLCELightCurve::GetMOGDarkeningCompressionForLevel( ) method is called to obtain a compression parameter value corresponding to iLocalMin, which is then passed to the SetDarkingSlider( ) method, which in turn sets the darken slider to the position corresponding to the resulting compression level.

Figure 10C:
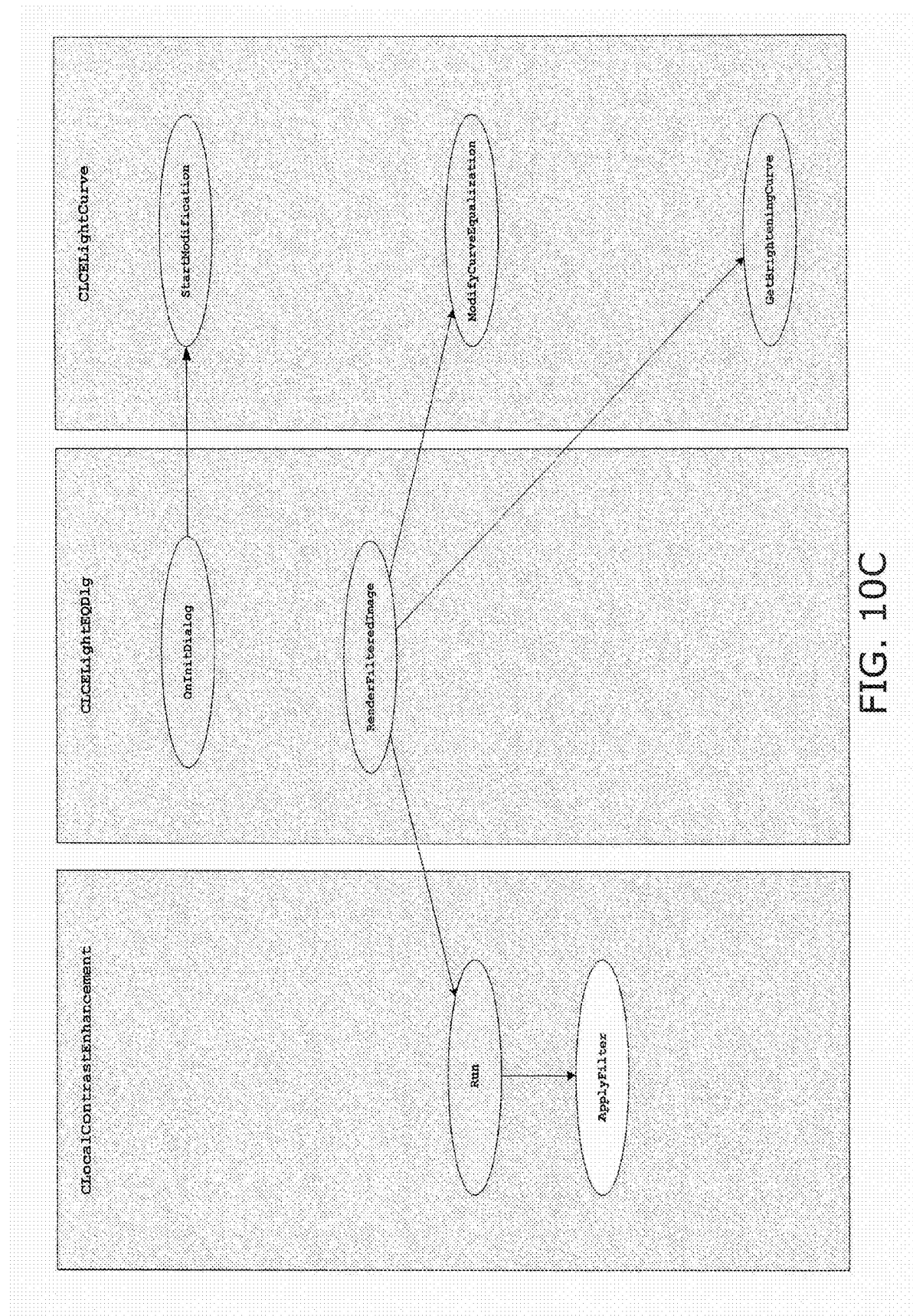
FIG. 10C is a flow diagram of the methods involved in implementing the Light Equalizer user interface, for the source code listed in APPENDIX D, in accordance with an embodiment of the present invention.

Reference is now made to FIG. 10C, which is a flow diagram of methods involved in implementing the Light Equalizer user interface, in accordance with an embodiment of the present invention.

The method OnInitDialog( ), which is called when the user interface is initialized, calls the StartModifcation( ) method at line 42 to cause subsequent calls to ModifyCurveEqualization( ) to always start with response curves of constant value 1.

The method RenderFilteredImage( ), listed in APPENDIX D, is called whenever the preview or final image needs to be generated in response to the user modifying one of the slider positions, or clicking on the 'Done' button.

At lines 33-43, the slider positions are retrieved into the local arrays aiLightenPointsY and aiDarkenPointsY, representing adjustment amplitudes of the various bands, while the local brightness values corresponding to the band centers are calculated and stored in the local arrays aiLightenPointsX and aiDarkenPointsX.

At lines 45-47, the ModifyCurveEqualization( ) method is called to adjust the response curves according to the values in the arrays.

At lines 48-51, the resulting response curves are retrieved into local arrays dBrighteningFacLUT and dDarkeningFacLUT.

At lines 60-62, the Run( ) method is called with the retrieved response curves to generate the contrast enhanced image, which is stored in the local parameter ppDIBOut.

The Run( ) method, listed in APPENDIX A, calls the ApplyFilter( ) method at lines 23-26 in order to product the contrast-enhanced image corresponding to the response curves.

The ApplyFilter( ) method, listed in APPENDIX A, applies contrast enhancement to the source image according to the response curves. The darkening and brightening multipliers $g_{min}$ and $g_{max}$ are tabulated and stored in look-up tables dFacLUTH [ ] and dfacLUTS[ ], respectively. The color boost parameter, $k_{CB}$, is stored in the variable dCBColor. Lines 135-243 correspond to EQUATIONS 6A-6C for 24-bit color images. Other code sections in ApplyFilter( ) correspond to 8-bit, 16-bit and 64-bit color images.

Figure 10D:
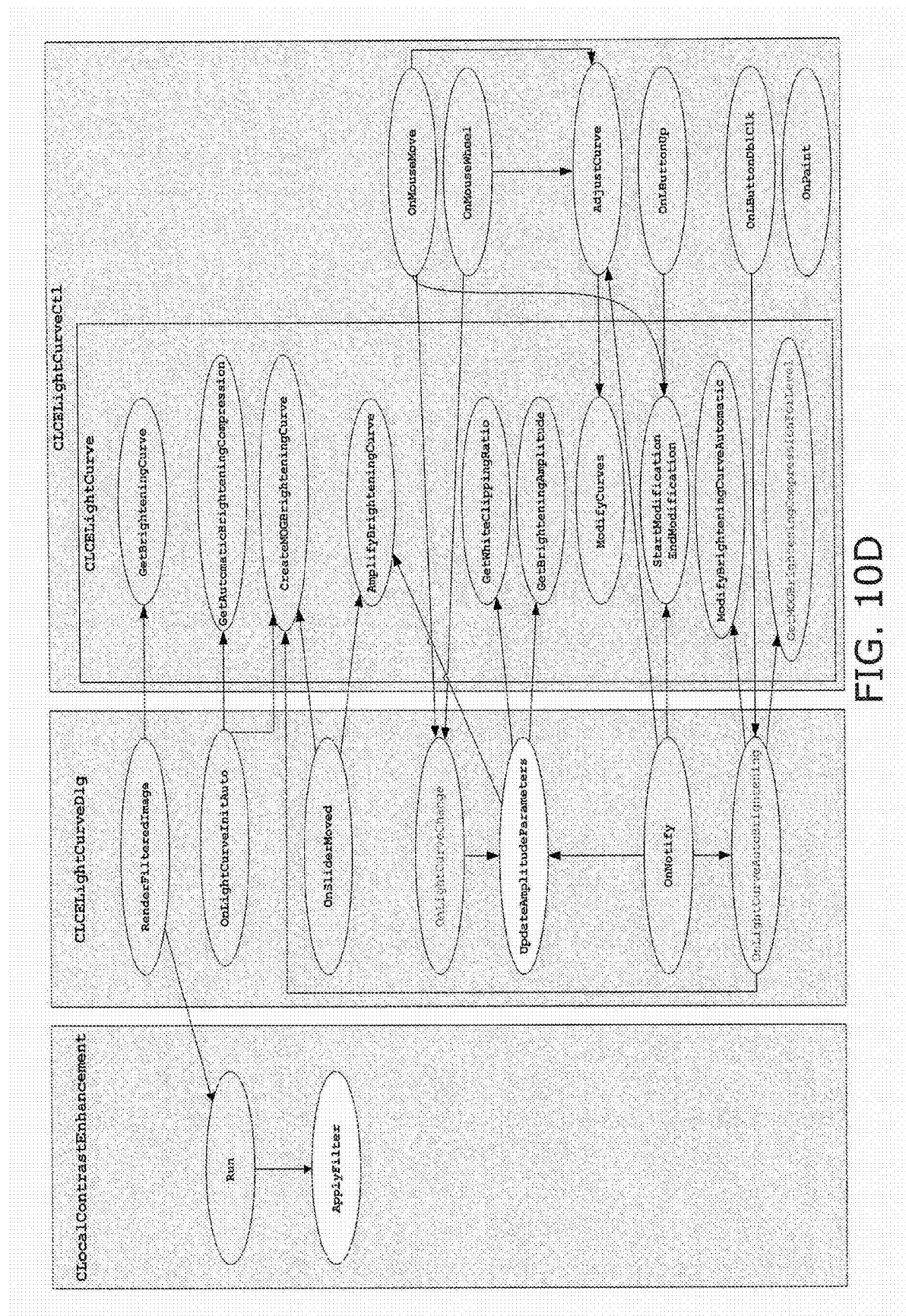
FIG. 10D is a flow diagram of the methods involved in implementing the Light Curves user interface, for the source code listed in APPENDICES E and F, in accordance with an embodiment of the present invention.

Reference is now made to FIG. 10D, which is a flow diagram of methods involved in implementing the Light Curves user interface, in accordance with an embodiment of the present invention.

The method RenderFilteredImage( ), listed in APPENDIX E, is called whenever the preview or final image needs to be generated in response to the user modifying the curve, modifying the position of the Color Boost slider, or clicking on the 'Done' button.

At lines 31-37, the response curves are retrieved from the CLCELightCurve module into local arrays dBrighteningCurve and dDarkeningCurve by calling the GetBrigtheningCurve( ) and GetDarkeningCurve( ) methods.

At lines 39-41, the Run( ) method is called with the retrieved response curves to generate the contrast enhanced image, which is stored in the local parameter ppDIBOut.

The Run( ) method, listed in APPENDIX A, calls the ApplyFilter( ) method at lines 23-26 in order to product the contrast-enhanced image corresponding to the response curves.

The OnLightCurveInitAuto( ) method, listed in APPENDIX E, is called when the user interface is initialized and whenever the user clicks the 'Reset' button. At lines 4 and 5, GetAutomaticBrighteningCompression( ) is called to compute the automatic compression level. At line 6, the Brightening Compression slider is set to the corresponding position, and at lines 7 and 8, CreateMOGBrighteningCurve( ) is called to set the brightening response curve accordingly. At lines 9-12, the analogous procedure is used for the darkening response curve. At line 13, the NotifyConfigChange( ) method is called to cause a subsequent call to RenderFilteredImage( ), thus causing the preview image to be regenerated.

The OnSliderMoved( ) method, listed in APPENDIX E, is called whenever the user changes the position of a slider. The case where the Brightening Compression slider is moved is handled in lines 7-11, whereupon the brightening curve is generated by calling CreateMOGBrighteningCurve( ). The case for the Darkening Compression slider is handled in an analogous way in lines 22-25. The case where the Brightening Amplitude slider is moved is handled in lines 15-18, whereupon the brightening curve is scaled to reflect the new amplitude setting by calling SetBrighteningAmplitude( ) and SetwhiteClipping( ). The case for the Darkening Amplitude slider is handled in an analogous way in lines 29-32. At line 34, the NotifyConfigChange( ) method is called to cause a subsequent call to RenderFilteredImage( ), thus causing the preview image to be regenerated.

The OnLightCurveChange( ) method, listed in APPENDIX E, is called by the curve visualization module whenever the user manually adjusts the curve. The UpdateAmplitudeParameters( ) method is called at line 4 to update the position of the amplitude slider according to the resulting amplitude of the changed response curve, or to scale the curve to fit the current amplitude setting. At line 5, the NotifyConfigChange( ) method is called to cause a subsequent call to RenderFilteredImage( ), thus causing the preview image to be regenerated.

The UpdateAmplitudeParameters( ) method, listed in APPENDIX E, scales the response curves to fit the current amplitude settings ('constrained amplitude' case), or updates the position of the amplitude sliders according to the actual amplitude of the response curves ('free amplitude' case) by implementing ALGORITHM V. The first case is handled at lines 8-11, where AmplifyBrighteningCurve( ) and AmplifyBrighteningCurve( ) are called to scale the response curves according to the current slider amplitudes. These methods will be described in detail hereinbelow. The second case is handled at lines 15-37. The GetWhiteClippingRatio( ), GetBlackClippingRatio( ), GetBrighteningAmplitude( ), and GetDarkeningAmplitude( ) methods are called at lines 15-19 to compute the current amplitude and clipping ratio levels from the current response curves. These methods will be described in detail hereinbelow. At lines 26-30, the user-model brightening amplitude is calculated based on the computed LCE-model amplitude and clipping ratio. Lines 27 and 28 handle the case where the amplitude is greater than 100 (clipping is greater than the minimum clipping factor LCE_MINCLIPPING), whereas line 30 handles the case where the amplitude is less than 100 (clipping is LCE_MINCLIPPING or less). At line 31, the position of the Brightening Amplitude slider is set to the computed user-model amplitude. The Darkening Amplitude slider is set to a computed user-model amplitude by an analogous procedure at lines 32-37.

The OnNotify( ) method, listed in APPENDIX E, is called whenever the user uses the mouse on the preview image to modify the response curves.

The case where the user clicks on the image and begins dragging is handled at line 14 by calling the StartModification ( ) method, which saves the current curves for use as the baseline curves to which subsequent modifications are applied; i.e., subsequent curve modifications will not be cumulative.

The case where the user has changed the position of the mouse while dragging is handled at lines 19-61. The sub-case where the user is holding down the <A> key is handled at lines 34-50 by changing the amplitude slider positions. The sub-case where the user is not holding down the <A> key is handled at lines 54-60 by calling the AdjustCurve( ) method to add a Gaussian curve whose center corresponds to the local minimum/maximum of the pixel that was originally clicked on, and whose amplitude is proportional to the vertical distance between the current mouse position and the position where the mouse button was pressed. The UpdateAmplitudeParameters( ) method is called at line 59 to update the position of the amplitude slider according to the resulting amplitude of the changed response curve, or to scale the curve to fit the current amplitude setting. At line 60, the NotifyConfigChange( ) method is called to cause a subsequent call to RenderFilteredImage( ), thus causing the preview image to be regenerated.

The case where the user ends dragging by lifting the mouse button is handled at line 65 by calling the EndModification( ) method, which causes subsequent curve modifications to be cumulative once again.

The case where the user double-clicks on the image is handled at lines 71-78 by calling the OnLightCurveAutoBrightening( ) or OnLightCurveAutoDarkening( ) method.

The case where the user scrolls the mouse wheel while pointing within the image preview is handled at lines 101-139. The sub-case where the user is holding down the <A> key is handled at lights 113-127 by changing the amplitude slider positions. The sub-case where the user is not holding down the <A> key is handled at lines 131-138 by calling the AdjustCurve( ) method to add a Gaussian curve whose center corresponds to the local minimum/maximum of the pixel currently underneath the mouse cursor, and whose amplitude is proportional to distance the wheel was scrolled since the last scroll notification was processed. The UpdateAmplitudeParameters( ) method is called at line 137 to update the position of the appropriate Amplitude slider, or to adjust the curve amplitude in the case of the amplitude constrained mode. At line 138, the NotifyConfigChange( ) method is called to cause a subsequent call to RenderFilteredImage( ), thus causing the preview image to be regenerated.

The OnLightCurveAutoBrightening( ) method, listed in APPENDIX E, is called when the user double-clicks on the preview image or on the response curves visualization. In the case where the user is holding down the <Ctrl> key, the ModifyBrighteningCurveAutomatic( ) method is called at line 10, which causes a Gaussian curve to be added to the current response curve. The UpdateAmplitudeParameters( ) method is then called at line 12 to update the position of the amplitude slider according to the resulting amplitude of the changed response curve, or to scale the curve to fit the current amplitude setting. In the case where the user is not holding down the <Ctrl> key, the GetMOGBrighteningCompressionFoLevel( ) method is called at lines 17 and 18 to get the brightening compression level corresponding to the local brightness level for the image pixel that the user double-clicked on. The position of the Brightening Compression slider is updated to the resulting compression level at lines 16-18. At lines 20 and 21, the CreateMOGBrighteningCurve( ) method is called with the current amplitude and updated compression settings to generate a new brightening response curve. At line 24, the NotifyConfigChange( ) method is called to cause a subsequent call to RenderFilteredImage( ), thus causing the preview image to be regenerated.

The OnLightCurveAutoDarkening( ) method, listed in APPENDIX E, is implemented in an analogous way to the OnLightCurveAutoBrightening( ) method.

The OnMouseMove( ) method, listed in APPENDIX F, is called whenever the user moves or drags the mouse within the curve visualization window. At lines 14-17, the local brightness level corresponding to the current position of the mouse is calculated so that it can be rendered later in the OnPaint( ) method. If the user is dragging the mouse, the curve is adjusted in line 24 by calling the AdjustCurve( ) method to add a Gaussian curve whose center corresponds to the local brightness level corresponding to the point that was originally clicked on, and whose amplitude is proportional to the vertical distance between the current mouse position and the position where the mouse button was pressed. At line 25, the OnLightCurveChange( ) method is called, which causes the position of the amplitude slider to be updated, or causes the curve to be scaled to match the current amplitude slider position. Lines 28-40 handle the initiation of dragging, calling the StartModification( ) method in line 38, which saves the current curves for use as the baseline curves to which subsequent modifications are applied; i.e., subsequent curve modifications are not cumulative.

The OnMouseWheel( ) method, listed in APPENDIX F, is called whenever the user scrolls the mouse wheel while the cursor is within the curve visualization window. At lines 6-10, the local brightness level corresponding to the current position of the mouse is calculated and stored in the local variable nLevel. At line 12, the AdjustCurve( ) method is called to add a Gaussian curve whose centered at nLevel, and whose amplitude is proportional to distance the wheel was scrolled since the last scroll notification was processed. At line 13, the OnLightCurveChange( ) method is called, which causes the position of the amplitude slider to be updated, or causes the curve to be scaled to match the current amplitude slider position.

The OnLButtonUp( ) method, listed in APPENDIX F, is called whenever the user terminates dragging by lifting the left mouse button. It calls the EndModification( ) method which causes subsequent curve modifications to be cumulative once again. The OnRButtonUp( ) method works in an analogous way for the right mouse button.

The OnLButtonDblClk( ) method, listed in APPENDIX F, is called whenever the user double-clicks within the curve visualization window. At lines 5-7, the local brightness level corresponding to the current position of the mouse is calculated and stored in the local variable nLevel. At line 10, the OnLightCurveAutoBrightening( ) or OnLightCurveAutoDarkening( ) method is called, depending on whether or not the <Shift> key is held down. The OnRButtonDblClk( ) method works in an analogous way for the right mouse button.

The AdjustCurve( ) method, listed in APPENDIX F, simply calls the ModifyCurves( ) method at lines 8 and 9 to perform the local curve modification. The ModifyCurves( ) method will be described in detail hereinbelow.

The OnPaint( ) method, listed in APPENDIX F, is called whenever the curve visualization window must be rendered.

Figure 10E:
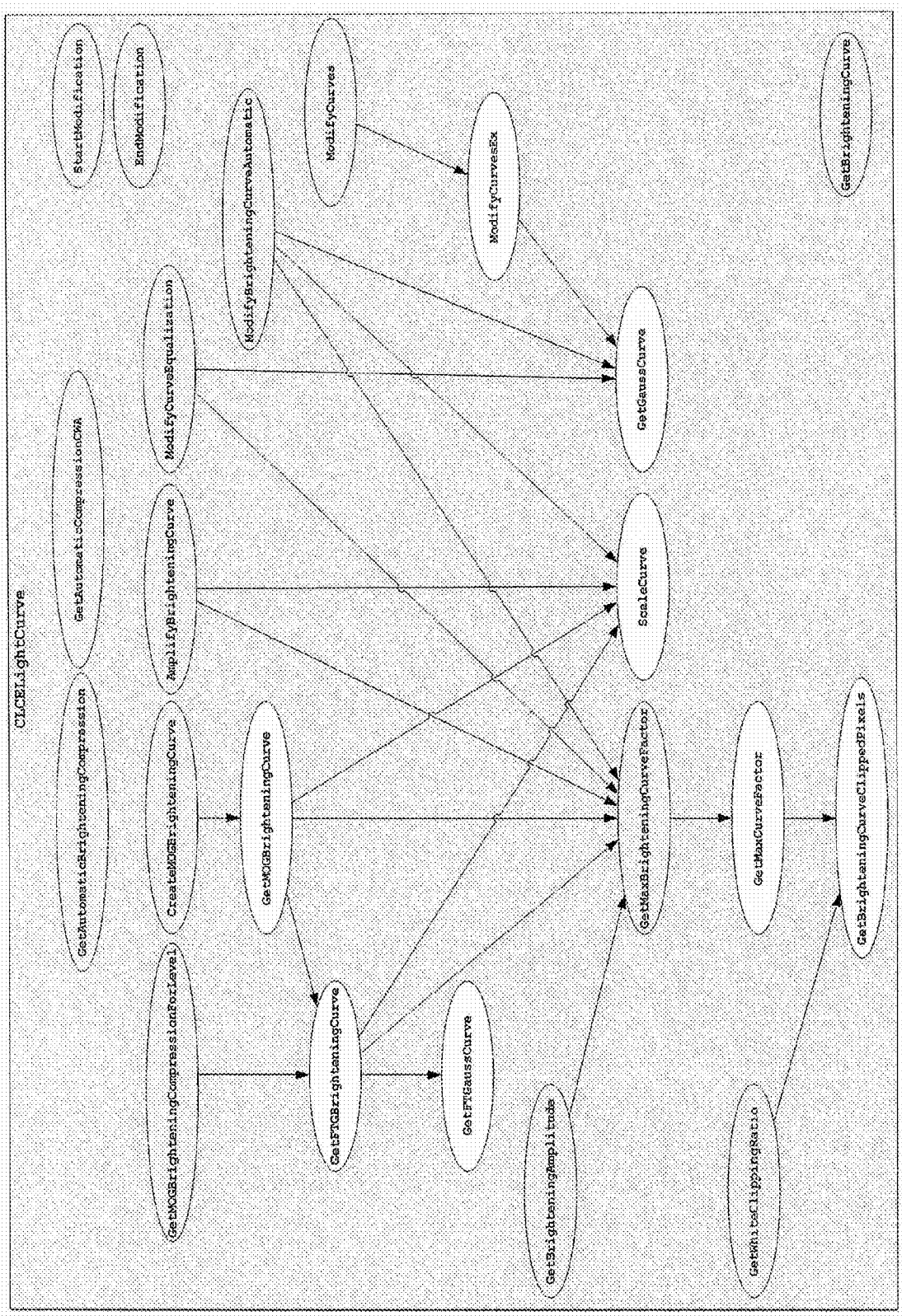
FIG. 10E is a flow diagram of the methods involved in response curves creation and modification, for the source code listed in APPENDIX G, in accordance with an embodiment of the present invention.

Reference is now made to FIG. 10E, which is a flow diagram of methods involved in response curves creation and modification, in accordance with an embodiment of the present invention.

The GetAutomaticBrighteningCompression( ) method, listed in APPENDIX G, implements ALGORITHM X to analyze the joint frequency histograms and return a brightening compression value deemed most suitable for performing contrast enhancement as described hereinabove. In lines 5 and 6, it calculates a fraction of image pixels based on the constant $p_b$, represented as a percentage by the local variable m_dAutoBrightenPercentile. The result is stored in local variable nThresholdPels. Lines 7-17 compute the percentile function PMINMAX($p_b$). Line 18 computes and returns the value $C_B=1-\text{PMINMAX}(p_b)/S$.

The GetAutomaticDarkeningCompression( ) method, listed in APPENDIX G, implements ALGORITHM X to analyze the joint frequency histograms and return a darkening compression value deemed most suitable for performing contrast enhancement as described hereinabove. In lines 5 and 6, it calculates a fraction of image pixels based on the constant $p_d$, represented as a percentage by (100−m_dAutoDarkenPercentile). The result is stored in local variable nThresholdPels. Lines 7-17 compute the percentile function (S−PMINMAX ($p_d$)). Line 18 computes and returns the value $C_D=\text{PMINMAX}(p_d)/S$.

The GetAutomaticCompressionCWA( ) method, listed in APPENDIX G, implements ALGORITHM X to compute the average intensity of $\text{MIN}_{filter}$ and $\text{MAX}_{filter}$, weighted by the distance from the center normalized to [0,1] and then raised to the fourth power. $\text{MIN}_{filter}$ and $\text{MAX}_{filter}$ are represented by parameters dDIBLocalMin and pDIBLocalMax, respectively. Line 17 computes the vertical distance from the center to the current row, normalized to [0,1] by dividing by half the image height. Line 18 computes the squared normalized vertical distance. Line 25 computes the horizontal distance from the center to the current column, normalized to [0,1] by dividing by half the image width. Line 26 computes the squared normalized horizontal distance. Line 27 computes the sum of the $\text{MIN}_{filter}$ and $\text{MAX}_{filter}$ intensities at the current pixel location. Line 28 computes the square of the Euclidean distance from the current pixel to the center of the image, raised to the second power, thus computing the Euclidean distance to the fourth power, and stores the result in the local variable dWeight. Line 29 adds dWeight to the running weight total dWeightTotal, while line 30 multiplies the sum of the $\text{MIN}_{filter}$ and $\text{MAX}_{filter}$ intensities by dWeight and adds the result to the running weighted sum dWeightedSum. Line 33 computes the weighted average and stores the result in local variable dCWAverage. The brightening and darkening compression values are calculated at lines 34-36.

The GetMaxBrighteningCurveFactor( ) and GetMaxDarkeningCurveFactor( ) methods, listed in APPENDIX G, call GetMaxCurveFactor( ) at line 8 to compute the maximum curve multiplier for generating the specified clipping ratio.

The GetMaxCurveFactor( ) method, listed in APPENDIX G, implements ALGORITHM IX to find maximum brightening or darkening curve multipliers for a given brightening or darkening response curve to cause a specified amount of clipping. The algorithm operates based on binary search, with modifications to handle unbounded intervals. At lines 4 and 5, the desired number of clipped pixels is calculated based on the specified clipping ratio and stored in local variable nTargetClipPels. At line 7, the local variable dFac, which holds the current estimate of the maximum factor, is initialized to 1. At lines 8 and 9, the local variables dFacLB and dFacUB, which hold the current known lower and upper bounds on the maximum factor, are initialized to −1, which indicates the no bound is currently known. At line 10, the constant dCorr, which is used an offset factor to increase or decrease the value of dFac when the upper or lower bound is unknown, respectively, is initialized to 0.5. At lines 11-13, the maximum curve value is calculated and stored in the local variable dMaxCurveVal. At line 14, a small epsilon value is calculated and stored in the local variable dMinBoundsDelta, which is used later in deciding when to terminate the binary search loop. The value is calculated in such a way that the difference in factor values will not cause a significant difference in the contrast-enhanced output image. Lines 16-44 implement the binary search loop, which terminates after at most 20 iterations in order to avoid infinite loops. At lines 18 and 19, the number of clipped pixels corresponding to the current estimated maximum factor dFac is calculated by calling the GetDarkeningCurveClippedPixels( ) or GetBrighteningCurveClippedPixels( ) method. At lines 20-22, the binary search is terminated if the distance between the known upper and lower bounds is less than the epsilon value stored in dMinBoundsDelta. Lines 25-29 handle the case where the current estimated factor causes less than the desired amount of clipping. At line 25, the lower bound is set to the current factor. The sub-case where the upper bound is known is handled at line 27 by choosing a new estimate that is midway between the lower and upper bounds. The sub-case where the upper bound is unknown is handled at line 29 by increasing the estimated factor by 50%. Lines 33-37 handle the case where the current estimated factor causes more than the desired amount of clipping. At line 33, the upper bound is set to the current factor. The sub-case where the lower bound is known is handled at line 35 by choosing a new estimate that is midway between the lower and upper bounds. The sub-case where the lower bound is unknown is handled at line 37 by decreasing the estimated factor by 50%. Line 41 handles the case where the current estimated factor causes exactly the desired amount of clipping by terminating the loop. Line 43 ensures that the revised estimated factor does not become negative due to roundoff error.

The GetBrighteningCurveClippedPixels( ) method, listed in APPENDIX G, implements ALGORITHM VII to compute the number of pixels that would be clipped by applying the current brightening response curve, scaled by a specified scaling factor, to the input image. The total number of clipped pixels is the sum of the number of clipped pixels at each local brightness level, the local brightness value at each pixel being the value of $MAX_{filter}$. The loop at line 7 iterates over the brightness levels 0 through 255. Line 9 calculates the scaled brightening factor for the current local brightness level and stores it in the local variable dMult. Line 10 calculates the lowest source image intensity value that would be clipped when multiplied by dMult, and stores the result in local variable iMinClippedlevel. At line 12, the number of pixels in the source image corresponding to the current local brightness level and having intensity iMinClippedlevel or higher is taken from the joint cumulative frequency histogram m_pHistLocalMaxCum and added to the running total nCurClipPels. After the loops terminates, nCurClipPels holds the total number of clipped pixels, and this value is returned at line 14.

The GetDarkeningCurveClippedPixels( ) method, listed in APPENDIX G, implements ALGORITHM VIII to compute the number of pixels that would be clipped by applying the current darkening response curve, scaled by a specified scaling factor, to the input image. The total number of clipped pixels is the sum of the number of clipped pixels at each local brightness level, the local brightness value at each pixel being the value of $MIN_{filter}$. The loop at line 7 iterates over the brightness levels 0 through 255. Line 9 calculates the scaled brightening factor for the current local brightness level and stores it in the local variable dMult. Line 10 calculates the corresponding value of $g_{offset}$ and stores it in local variable dOffset. Line 11 calculates the highest source image intensity value that would be clipped when offset by dOffset, and stores the result in local variable iMaxClippedlevel. At line 13, the number of pixels in the source image corresponding to the current local brightness level and having intensity iMaxClippedlevel or lower is taken from the joint cumulative frequency histogram m_pHistLocalMinCum and added to the running total nCurClipPels. After the loops terminates, nCurClipPels holds the total number of clipped pixels, and this value is returned at line 15.

The GetBrighteningAmplitude( ) method, listed in APPENDIX G, computes the LCE-model amplitude parameter value corresponding to the current brightening curve. At line 4, GetMaxBrighteningCurveFactor( ) is called to determine the scaling factor for the current curve which would cause the minimal amount of clipping to occur. The amplitude is the multiplicative inverse of this factor, which is computed at line 7. The GetDarkeningAmplitude( ) method operates in an analogous way.

The GetWhiteClippingRatio( ) method, listed in APPENDIX G, computes the white clipping ratio based on the current brightening curve. At line 5, the number of clipped pixels is calculated by calling GetBrighteningCurveClippedPixels( ), which is divided by the number of pixels in the image at line 6 to arrive at the clipping ratio. The GetBlackClippingRatio( ) method operates in an analogous way.

The AmplifyBrighteningCurve( ) method, listed in APPENDIX G, scales the brightening response curve so as to correspond to the parameter-specified clipping ratio dClippingFac and amplitude dAmplitude. The parameters fIncrease and fDecrease control whether the curve is allowed only to increase, only to decrease, or to either increase or decrease. At lines 4 and 5, the GetMaxBrighteningCurveFactor( ) method is called to find a scaling factor causing the parameter-specified ratio dClippingFac of clipping, the result of which is then multiplied by the parameter-specified amplitude dAmplitude, and the final result is stored in local variable dFac. At lines 6 and 7, the method returns without scaling the curve if dFac would cause the brightening curve amplitude to be increased and the fIncrease method parameter is FALSE, disallowing an increase in curve amplitude. At lines 8 and 9, the method returns without scaling the curve if dFac would cause the brightening curve amplitude to be decreased and the fDecrease method parameter is FALSE, disallowing a decrease in curve amplitude. Otherwise, the ScaleCurve( ) method is called at line 10 to scale the curve according to dFac.

The AmplifyDarkeningCurve( ) method, listed in APPENDIX G, operates in an analogous fashion to the AmplifyBrighteningCurve( ) method, described in detail hereinabove.

The ScaleCurve( ) method, listed in APPENDIX G, scales a response curve by a specified factor dFac, clipping the resulting curve values if necessary so that they do not exceed a second specified factor dMaxVal. At line 8, an adjusted response curve value is calculated by multiplying the current offset from 1 by dFac and adding 1, and the result is stored in local variable dAdj. At lines 9-12, the adjusted response curve value is clipped against the range [0,dMaxVal]. Line 13 stores the adjusted and clipped response curve value in the output response curve array pdCurveOut.

The StartModification( ) method, listed in APPENDIX G, stores the current brightening and darkening response curves in member arrays m_dBrighteningCurveBase and m_dDarkeningCurveBase, respectively, and member flag m_fModificationActive is set to TRUE.

The EndModification( ) method, listed in APPENDIX G, sets member flag m_fModificationActive to FALSE.

The ModifyCurveEqualization( ) method, listed in APPENDIX G, modifies the brightening and darkening response curves by adding a number of scaled Gaussian curves. Lines 7-13 handle restoring the original response curves in the case where StartModification( ) has been previously called so that modification from successive calls to ModifyCurveEqualization( ) is not cumulative. The loop beginning at line 14 causes all points in the pnBrightenLevels, pdBrightenAmplitudes, pnDarkenLevels, and pdDarkenAmplitudes parameter arrays to be considered in turn. Lines 17 and 18 create a Gaussian curve dBrightenGaussCurve with real values within the closed interval [1,2], centered at the value given by the pnBrightenLevels array, with spread determined by the parameter dSigma. Lines 19 and 20 create a similar Gaussian curve dDarkenGaussCurve with real values within the closed interval [1,2], centered at the value given by the pnDarkenLevels array. Lines 21-24 find the maximum curve multipliers for the two Gaussian curves by calling the GetMaxBrighteningCurveFactor( ) and GetMaxDarkeningCurveFactor( ) methods, and stores the results in local variables dBrightenFac and dDarkenFac, respectively. At lines 25-33, the Gaussian curves are scaled by the factors dBrightenFac and dDarkenFac as well as the factors given by the pnBrightenAmplitudes and pnDarkenAmplitudes, and the resulting values are added to the current brightening and darkening response curves, m_dBrighteningCurve and m_dDarkeningCurve. Lines 31 and 32 ensure that no points on the response curves fall below 1.

The GetGaussCurve( ) method, listed in APPENDIX G, calculates a Gaussian distribution that is scaled and offset such that the minimum value is dYOffset, the maximum value is dYOffset+dAmplitude, and the curve maximum occurs at dxoffset. The spread of the distribution is determined by the dSigma parameter.

The ModifyBrighteningCurveAutomatic( ) method, listed in APPENDIX G, uses ALGORITHM VI to add a Gaussian curve to the current brightening response curve in such a way that the response curve values around the parameter iLocalMax are maximally increased, while the amount of clipping continues to correspond to the ratio given by parameter dClippingFac. Lines 4 and 5 handle restoring the original response curves in the case where StartModification( ) has been previously called so that modification from successive calls to ModifyBrighteningCurveAutomatic( ) are not cumulative. At line 8, the GetGaussCurve( ) method is called to generate a Gaussian curve adGauss with values in the range [1.2], centered at the local brightness level iLocalMax, corresponding to step 1 described hereinabove. At line 9, the GetMaxBrighteningCurveFactor( ) method is called to determine a multiplier dFac for the Gaussian curve which will cause the clipping amount specified by dClippingFac. At lines 10 and 11, the factor is reduced to be maximally the value m_dMaxAutoBrightnessAddAmp−1, corresponding to the constant $m_{MAX}$ in step 2 described hereinabove. At line 12, the resulting factor is used to scale the Gaussian curve. At lines 13 and 14, the Gaussian curve is added to the current brightening response curve by adding the offset from 1 at each point, corresponding to step 3 described hereinabove. At line 15, the resulting response curve is scaled with an optimal response curve multiplier determined by calling the GetMaxBrighteningCurveFactor( ) method so as to cause the clipping amount specified by dClippingFac, corresponding to step 4 described hereinabove.

The ModifyDarkeningCurveAutomatic( ) method, listed in APPENDIX G, operates in an analogous fashion to the ModifyBrighteningCurveAutomatic( ) method, described in detail hereinabove.

The ModifyCurves( ) method, listed in APPENDIX G, simply calls the more general method ModifyCurvesEx( ) with a single level/amplitude pair for brightening and second level/amplitude pair for darkening.

The ModifyCurvesEx( ) method, listed in APPENDIX G, modifies the response curves by adding a number of Gaussian curves, whose offsets and amplitudes are determined respectively by the pnBrighteningPointsX/pnDarkeningPointsX and pnBrighteningPointsY/pnDarkeningPointsY array parameters, and whose spreads are determined by the dSigma parameter. Lines 7-13 handle restoring the original response curves in the case where StartModification( ) has been previously called so that modification from successive calls to ModifyCurvesEx( ) are not cumulative. The loop beginning at line 14 causes all points in the pnBrighteningPointsX, pnBrighteningPointsY, pnDarkeningPointsX, and pnDarkeningPointsY parameter arrays to be considered in turn. Lines 16-22 store the brightening and darkening modification amplitudes in local variables dBrighteningY and dDarkeningY, reducing the absolute value of negative amplitudes if necessary so as to prevent causing the response curve to become less than 1 at the local level given by the pnBrighteningPointsX array parameter. Lines 24 and 25 call the GetGaussCurve( ) method to generate a Gaussian curve with values in the range [0 . . . dBrighteningY], with the peak value occurring at the local level given by the pnBrighteningPointsX array parameter, with the resulting curve stored in local array dBrightenGaussCurve. Lines 26 and 27 call the GetGaussCurve( ) method to generate a Gaussian curve with values in the range [0 . . . dDarkeningY], with the peak value occurring at the local level given by the pnDarkeningPointsX array parameter, with the resulting curve stored in local array dDarkenGaussCurve. The inner loop at lines 28-32 cause the Gaussian curve values to be added to the response curve points. A loop at lines 34-38 ensures that all response curve values are not less than 1.

The GetMOGBrighteningCompressionForLevel( ) method, listed in APPENDIX G, implements ALGORITHM IV to determine a brightening compression that will maximally lighten pixels around a specified local brightness level, while causing a specified proportion of clipping to occur. The loop beginning at line 8 causes 101 compression levels in the interval [0,1] to be considered in turn. At lines 10-12, the GetFTGBrighteningCurve( ) method is called to generate a flat-tailed Gaussian response curve at the compression level currently under consideration, storing the resulting response curve in local array pdCurve. Line 14 saves the response curve value at the point corresponding to the local brightness level parameter iLevel in local array adFactor. Lines 15 and 16 consider the response curve value and updating the running maximum curve value, which is stored in local variable dFacMax. Lines 18 and 19 compute a target curve value for iLevel, which is a percentage of the maximum curve value dFacMax, and the result is stored in local variable dTargetFactor. Lines 20-28 loop over the 101 compression levels in the interval [0,1], finding the lowest compression level that gives a response curve factor of at least dTargetFactor at the designated level iLevel. The loop is terminated at line 26 when dTargetFactor is reached or exceeded, and at line 25 the corresponding compression level is stored in local variable dTargetCompression, which is returned at line 29.

The GetMOGDarkeningCompressionForLevel( ) method, listed in APPENDIX G, operates in an analogous way to GetMOGBrighteningCompressionForLevel( ), described hereinabove.

The GetFTGBrighteningCurve( ) method, listed in APPENDIX G, implements ALGORITHM II to compute a brightening response curve having a flat-tailed Gaussian curve basic curve shape using the given compression level, with clipping ratio and amplitude as specified. At lines 7 and 8, an offset value is calculated based on the compression level parameter dCompression and member variable m_dFTGBrightenOffsetDelta. The offset value corresponds to $k_{off}$ and member variable dFTGBrightenOffsetDelta corresponds to constant σ, as described in ALGORITHM II. At line 9, the GetFTGaussCurve( ) method is called to generate the flat-tailed Gaussian curve corresponding to FTG(x) for brightening response, which is stored in parameter array pdCurve. At line 10, the GetMaxBrighteningCurveFactor( ) method is called to determine the maximum curve multiplier causing the proportion dClippingFac of clipping, the resulting multiplier is multiplied by parameter dAmplitude, and the result is stored in local variable dFac. At line 11, the scalecurve( ) method is called to scale the flat-tailed Gaussian curve by dFac.

The GetFTGDarkeningCurve( ) method, listed in APPENDIX G, operates in an analogous way to the GetFTGBrighteningCurve( ) method, described hereinabove.

The GetFTGaussCurve( ) method, listed in APPENDIX G, calculates a flat-tailed Gaussian distribution that is scaled and offset such that the minimum value is dYOffset, the maximum value is dYOffset+dAmplitude, and the curve maximum occurs at dxOffset. If the fFlatLeftTail parameter is TRUE, then all curve values to the left of dXOffset will have the maximum value of dYOffset+dAmplitude. Likewise, if the fFlatRightTail parameter is TRUE, then all curve values to the right of dxOffset will have the maximum value of dYOffset+dAmplitude. The spread of the distribution is determined by the dSigma parameter.

The CreateMOGBrighteningCurve( ) method, listed in APPENDIX G, simply calls the GetMOGBrighteningCurve( ) method to generate a maxima of Gaussians brightening response curve stored in local member array m_dBrighteningCurve.

The CreateMOGDarkeningCurve( ) method, listed in APPENDIX G, simply calls the GetMOGDarkeningCurve( ) method to generate a maxima of Gaussians darkening response curve stored in local member array m_dDarkeningCurve.

The GetMOGBrighteningCurve( ) method, listed in APPENDIX G, implements ALGORITHM III to compute a brightening response curve having a maxima of Gaussians basic curve shape using the given compression level, with clipping ratio and amplitude as specified. Lines 7-14 generate a number of flat-tailed Gaussian response curves corresponding to the specified distribution width dSigma, clipping factor dClippingFac, and amplitude dAmplitude by calling the GetFTGBrighteningCurve( ) method. The compression level for generating each curve is varied evenly from a minimum of 0 to a maximum of dCompression through the course of the loop, as calculated in line 11. The resulting curves are stored in the local variable pcurves, which is a two-dimensional array. Lines 15-23 find, at each point, the maximum value among the generated curves pcurves, storing the resulting maxima in the pdCurve array parameter. At lines 25 and 26, the GetMaxBrigtheningCurveFactor( ) method is called to find the maximum curve multiplier for the resulting maxima of Gaussians curve to cause the specified dClippingFac proportion of clipping, the result of which is multiplied by the dAmplitude parameter and stored in local variable dFac. At line 27, the ScaleCurve( ) method is called to scale the maxima of Gaussians curve pdCurve by dFac.

The GetMOGDarkeningCurve( ) method, listed in APPENDIX G, operates in an analogous way to the GetMOGBrighteningCurve( ) method, described hereinabove.

The GetBrighteningCurve( ) method, listed in APPENDIX G, retrieves the current brightening response curve, as stored in the member variable m_dBrighteningCurve.

The GetDarkeningCurve( ) method, listed in APPENDIX G, retrieves the current darkening response curve, as stored in the member variable m_dDarkeningCurve.

8. Application of Invention to Enhancing Groups of Images and Motion Video

In reading the above description, persons skilled in the art will appreciate that the present invention can be applied in a collective manner to groups of images. One particularly important instance of such groups of images is digital motion video, whereby a video sequence is represented by an ordered group of images, i.e., a time-based sequence of frames. By applying local contrast enhancement to the individual images of a group, overall contrast enhancement of the group results. Likewise, by applying local contrast enhancement to the individual time-based frames of a digital motion video sequence, contrast enhancement of the digital motion video sequence results.

In one embodiment of applying the present invention to digital motion video, frames may be individually analyzed as separate images using the statistical methods described hereinabove, thereby resulting in a method for fully automatic contrast enhancement of digital video sequences.

Furthermore, in order to prevent drastic parameter changes from frame to frame due to scene content changes, a temporal parameter smoothing filter may be applied to the resulting parameter sequences. This temporal parameter smoothing filter would prevent sudden changes in the parameters controlling contrast enhancement, so as to give the appearance of constant or slowly changing lighting throughout a given scene.

It may be appreciated by those skilled in the art that it is often desirable to effect a substantially identical enhancement to all images in a group in order to substantially preserve the relative brightness relationships between images. In the particular case of digital motion video, such substantially identical enhancement among the frames in a sequence may be especially desirable in order to preserve visual continuity throughout the sequence. To these ends, the frequency histograms from individual images within a group may be merged through averaging into a single frequency histogram representing the entire group, to which the statistical methods described hereinabove may be applied, so as to generate a single parameter group or single pair of brightening/darkening response curves to be applied to every image within the group, thereby resulting in substantially similar contrast enhancement within the group. The merged frequency histogram for a group of N images may be defined as:

$$H_{merged}(x) = \frac{1}{N}\sum_{i=1}^{N} H_i(x),$$

where $H_i$ is the frequency histogram for the $i^{th}$ image of the group.

Furthermore in the case of digital motion video, an algorithm detecting scene changes and/or cuts may be applied to a motion video sequence in order to divide the sequence into multiple sequences, to which the above methods of temporal parameter smoothing or histogram merging may then be applied individually, thereby allowing the parameters of contrast enhancement to change suddenly only at locations corresponding to scene changes and cuts.

Furthermore, where strictly constant enhancement is not necessary, but where substantial changes in enhancement parameters between successive frames are undesirable, a merged frequency histogram may be computed and used at each frame j, where such merged frequency histogram is defined by $$H_{merged}(x) = \frac{1}{1+2\delta} \sum_{i=j-\delta}^{j+\delta} H_i(x),$$

and $\delta$ is a constant determining the number of frames to the left and right of the current frame j to be considered in the averaging process. It will be appreciated that $\delta$ determines the rate at which the histograms, and thus the computed parameters for contrast enhancement, change from frame to frame.

In another embodiment applying the present invention to enhancing digital motion video, a user is provided with an interface similar to one of the interfaces described hereinabove for still images, with suitable controls added to seek randomly to any frame within the digital motion video sequence. The user is thus able to specify independent settings for any number of individual frames within the sequence. Settings for any frame where the user has not explicitly specified any settings can be derived by linearly interpolating between specified parameters at frames occurring before and after the frame in question.

9. Application of Invention to Image Capture Devices

In reading the above description, persons skilled in the art will realize that the present invention has widespread application to many types of imaging devices. In particular the present invention is advantageous for image capture devices including inter alia digital cameras, video cameras, surveillance systems, mobile phones, medical imaging systems, vision-based systems, robotics and automotive systems.

For such image capture devices, the image enhancement of the present invention may be applied at the time of image capture, or invoked subsequently after image capture for devices that store captured images in memory. The enhancement parameters may be determined:

i. automatically, based on analysis of the captured image as described above in Sec. 5.3;
 ii. automatically, based on information available on the capture device including inter alia exposure value, whether or not a flash was used, the degree of flash return, the point of focus and the focus distance;
 iii. from predetermined values associated with a "shooting mode", for cameras that have multiple shooting modes that are optimized for different shooting conditions and scenes;
 iv. manually, using a user interface that is similar to or simpler than the interface described in Sec. 3; or
 v. by some combination of the above techniques.

Generally it is beneficial to preserve original capture data, prior to enhancement processing, in order to retain as much detail as possible should the image be edited at a later time. The original capture data may be preserved:

I. by storing the original captured image data and the contrast-enhanced image, and by optionally storing the contrast enhancement parameters and/or response curves within meta-data embedded in one or both images, or elsewhere;
 II. by storing the original captured image data intact, and by storing the contrast enhancement parameters and/or response curves within meta-data embedded in the original image, or elsewhere; or
 III. by storing the original captured image data, by enhancing a reduced resolution version of the captured data, such as a "thumbnail version" or a "screen-nail version", and by storing the enhanced reduced resolution image and the contrast enhancement parameters and/or response curves as meta-data embedded in the original image, or elsewhere. Since the derivation of the response curves and application thereof is essentially independent of the image resolution, the contrast enhancement parameters and/or response curves can be applied to the full resolution image at some later time to generate a contrast-enhanced image which very closely resembles the reduced-resolution version.

Each alternative I-III has relative advantages and disadvantages with respect to the others. Alternative I has the advantage that the contrast enhanced image is immediately available in the storage system of the image capture device with no processing required. Alternative I has the disadvantage that it requires essentially double the amount of storage, and requires processing of the full resolution original image using the enhancement processes of the present invention. Alternative II has the advantage of not requiring significant additional storage, but has the disadvantage of requiring processing at some later time in order to generate the contrast enhanced image. Alternative III has the advantage of not requiring significant additional storage and the advantage of not requiring processing of a full resolution image, but has the disadvantage of requiring processing at some later time in order to generate the full resolution contrast enhanced image. However, when using alternative III a reduced resolution enhanced image is immediately available in the storage system of the image capture device with no processing required. For devices with built-in displays, this feature allows contrast enhanced versions of captured and stored images to be readily viewed; but a higher resolution contrast enhanced image is not readily available and requires processing of full resolution image data using the enhancement processes of the present invention. If a user employs magnification to zoom in on a photo, then the contrast-enhanced image of reduced resolution may be missing much of the detail in the photo.

An alternative to I is to store the full resolution contrast enhanced image together with meta-data that allows for reconstruction of the original captured image. In accordance with an embodiment of the present invention, such a system uses difference encoding.

Figure 11:
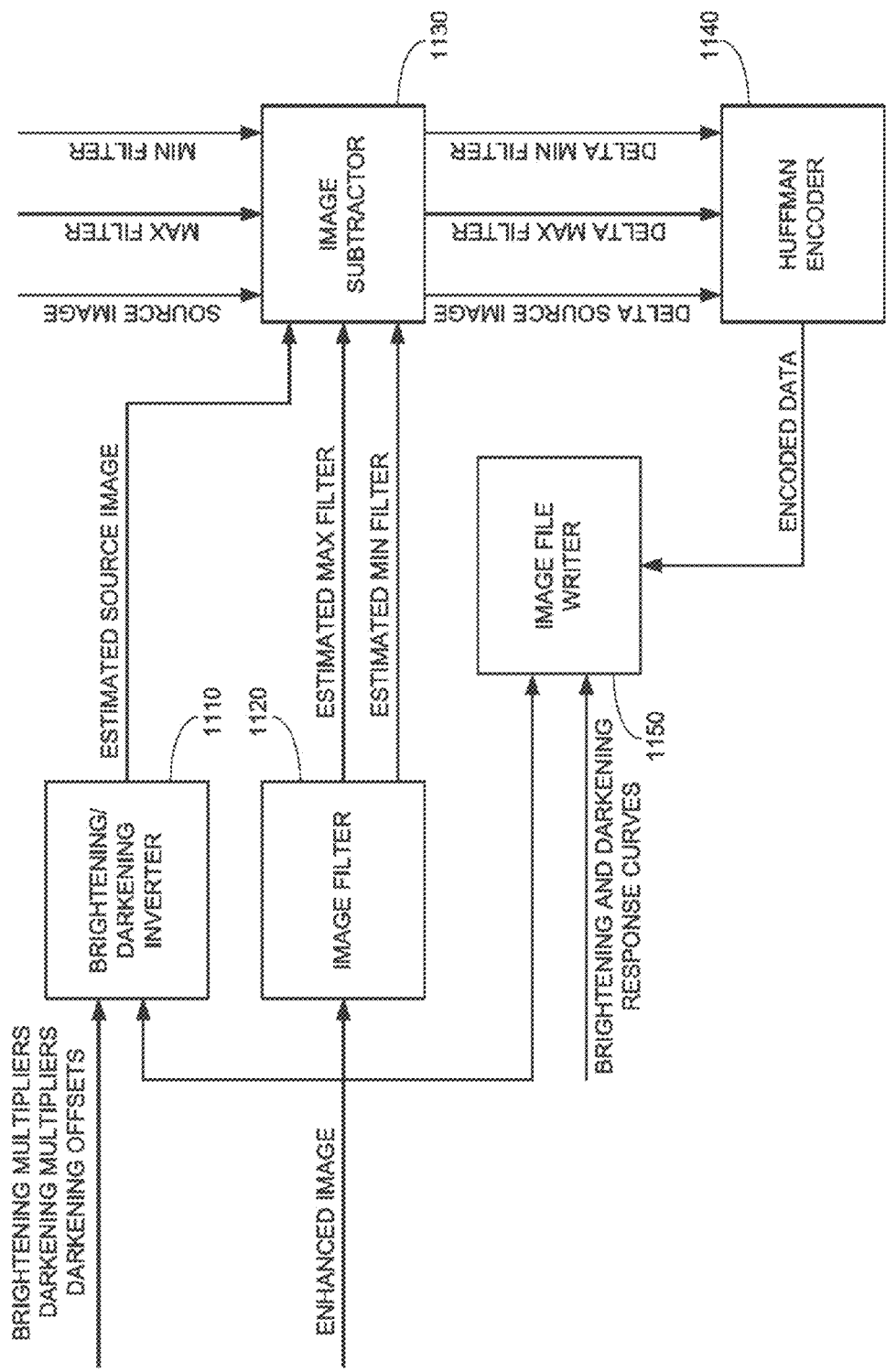
FIG. 11 is a simplified block diagram of a system to encode an enhanced image with appropriate meta-data so that the original image is recoverable, in accordance with an embodiment of the present invention.

Reference is now made to FIG. 11, which is a simplified block diagram of a system to encode an enhanced image with appropriate meta-data so that the original image is recoverable, in accordance with an embodiment of the present invention. The system of FIG. 11 operates in conjunction with the image enhancement systems illustrated in FIGS. 3A and 3B. The inputs to the system of FIG. 11 are an enhanced image, $I_{enhanced}$, and the filters, $MAX_{filter}$, $MIN_{filter}$, and the response curves, $f_{BR}$ and $f_{DR}$, that were used to enhance an original source image $I_{source}$ in order to generate $I_{enhanced}$. The output of FIG. 11 is an image file that contains the enhanced image $I_{enhanced}$ and appropriate embedded meta-data so that $I_{source}$ can be recovered from $I_{enhanced}$ and the meta-data stored therewith.

As shown in FIG. 11, a brightening/darkening inverter 1110 is applied to $I_{enhanced}$ in order to generate an estimated source image ESTI. The operation of inverter 1110 is opposite to EQUATION 5A or EQUATION 5E, whichever equation was used in the enhancement process. I.e., if EQUATION 5A was used, whereby brightening is applied after darkening, then inverter 1110 performs the inverse operation $$ESTI = g_{offset} + (I_{enhanced}/g_{max})/g_{min}.$$

Similarly, if EQUATION 5E was used, whereby darkening is applied after brightening, then inverter 1110 performs the inverse operation $$ESTI = (g_{offset} + I_{enhanced}/g_{min})/g_{max}.$$

In addition, an appropriate image filter 1120 is applied to $I_{enhanced}$ to generated estimates ESTMAX and ESTMIN of the maximum and minimum filtered images, respectively. Filter 1120 is the same filter that was used to generate $I_{enhanced}$; namely, the modified median filter of Sec. 1.1 or the modified weighted average filter of Sec. 1.2, as appropriate.

An image subtractor 1130 is used to compute the differences of images DIFMAX=$MAX_{filter}$−ESTMAX, DIFMIN=$MIN_{filter}$−ESTMIN, and DIFI=$I_{source}$−ESTI. The three differences DIFMAX, DIFMIN and DIFI are then passed through an encoder 1140 for data compression. Encoder 1140 may be a Huffman encoder, or any other lossless entropy encoder such as an arithmetic encoder; or it may be a lossy encoder designed for images such as the well-known DCT or wavelet transform, quantization and entropy encoders employed in JPEG and JPEG2000 compression. Since the above differences are generally small, encoder 1140 generally achieves significant data compression. If encoder 1140 is of a lossless type, then the source image will be recovered exactly; if encoder 1140 is of a lossy type, then the source image will be recovered in way that is visually nearly lossless.

Finally, the enhanced image $I_{enhanced}$, the encoded data and the brightening and darkening response curves $f_{BR}$ and $f_{DR}$, respectively, are passed to an image file writer 1150, which stores the encoded data and the response curves as embedded meta-data within the enhanced image, and writes the resulting image+meta-data to an image file.

Figure 12:
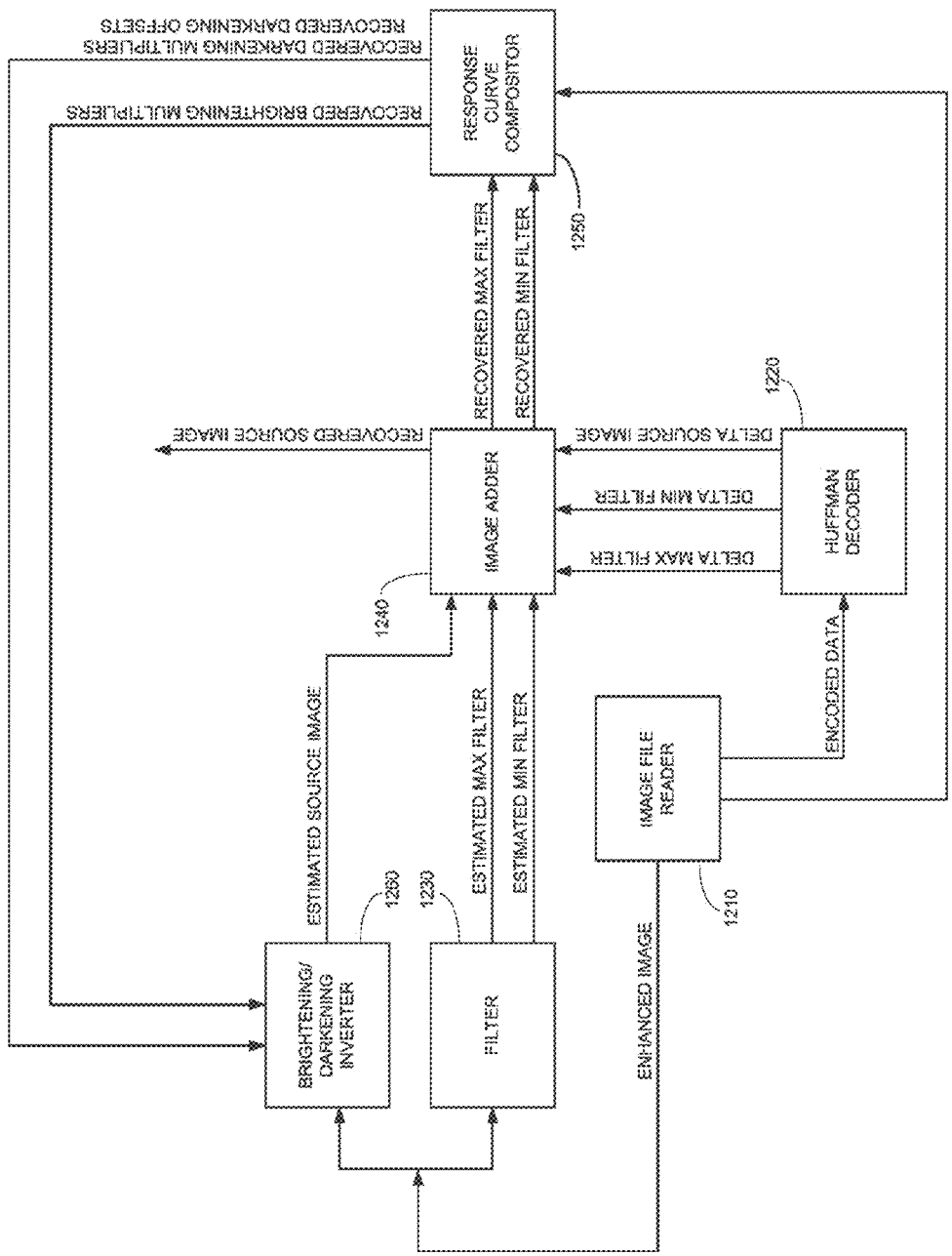
FIG. 12 is a simplified block diagram of a system to recover an original image from an enhanced image that was encoded by the system of FIG. 11, in accordance with an embodiment of the present invention.

Reference is now made to FIG. 12, which is a simplified block diagram of a system to recover an original image from an enhanced image that was encoded by the system of FIG. 11, in accordance with an embodiment of the present invention. The system of FIG. 12 is the file reader counterpart to the file writer system of FIG. 11. The input to the system of FIG. 12 is the image file written by file writer 1150, and the output of FIG. 12 is a recovered original source image.

As shown in FIG. 12, an image file reader 1210 reads the input image file and extracts its contents; namely, the encoded data, the brightening and darkening response curves, and the enhanced image $I_{enhanced}$. The extracted encoded data that was embedded within the image meta-data is passed to a decoder 1220, which decodes the differences DIFMAX, DIFMIN and DIFI by reversing the operation of encoder 1140.

The extracted enhanced image $I_{enhanced}$ is passed to an image filter 1230, which applies the same filter as image filter 1120 to $I_{enhanced}$ to generate estimates ESTMAX and ESTMIN for the maximum and minimum filters $MAX_{filter}$ and $MIN_{filter}$, respectively. The estimates ESTMAX and ESTMIN are then passed to an image adder 1240, which adds the respective differences DIFMAX and DIFMAN to generate recovered maximum and minimum filters.

The extracted response curves $f_{BR}$ and $f_{DR}$ are passed to a response curve compositor 1250, which also receives the recovered maximum and minimum filters from image adder 1240. Response curve compositor 1250 composites the response curves $f_{BR}$ and $f_{DR}$ with the recovered maximum and minimum filters, respectively, to generate recovered brightening multipliers $g_{max}$ and recovered darkening multipliers $g_{min}$ and recovered darkening offsets $g_{offset}$. Specifically, response curve compositor 1250 recovers $g_{max}$ as $g_{max}(i,j) = f_{BR}(ESTMAX(i,j))$, recovers $g_{min}$ as $g_{min}(i,j) = f_{DR}(ESTMIN(i,j))$, and recovers $g_{offset}$ as $g_{offset}(i,j) = S*(1-1/g_{min}(i,j))$.

The recovered brightening and darkening multipliers and darkening offsets are passed to a brightening/darkening inverter 1260, which inverts EQUATION 5A or EQUATION 5E to generate an estimated source image ESTI. Operation of brightening/darkening inverter 1260 is similar to operation of inverter 1110. The estimated source image ESTI is passed to image adder 1240, for adding the difference image DIFI thereto, to generate the desired recovered source image.

Figure 13:
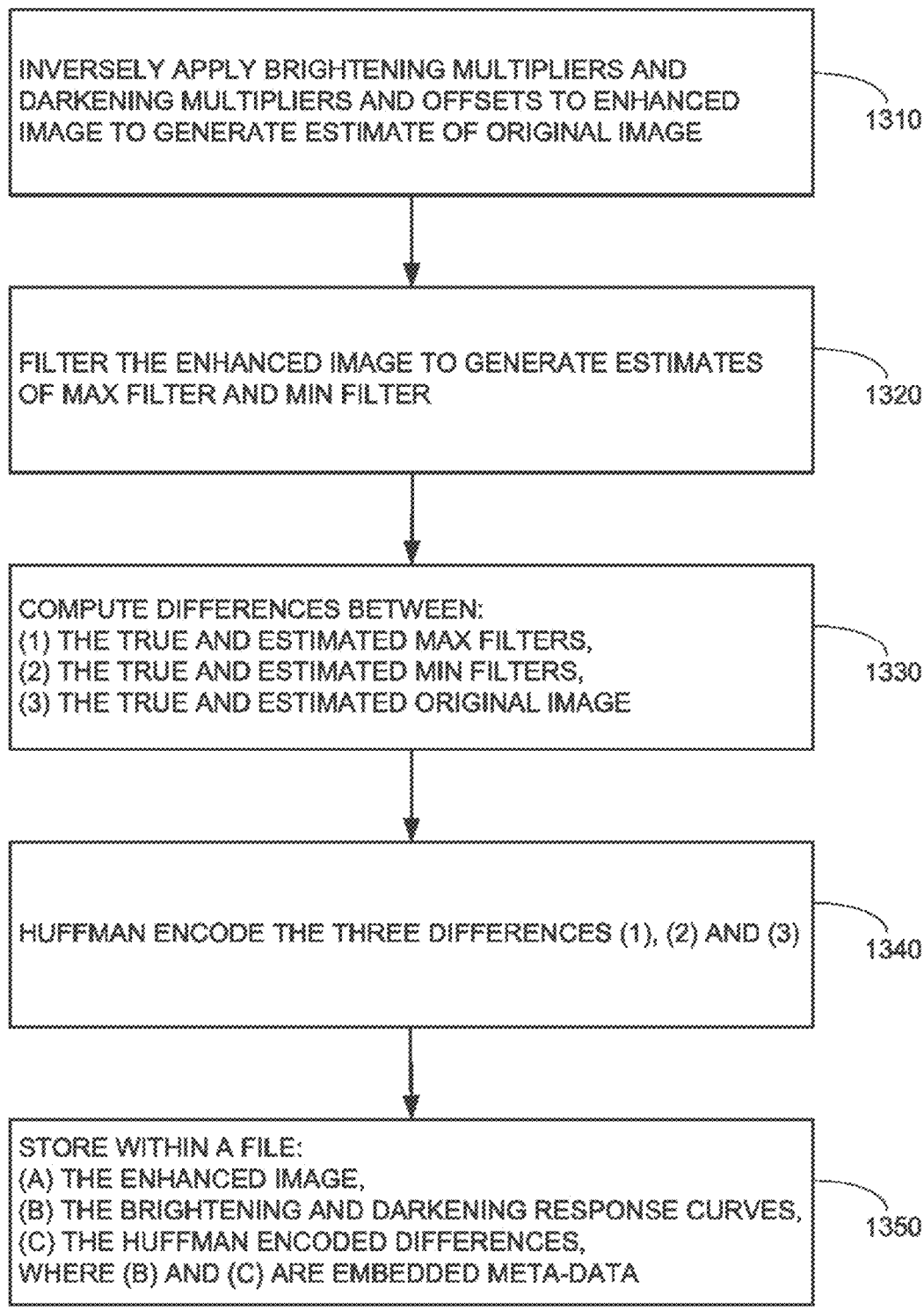
FIG. 13 is a simplified flowchart of a method for encoding an enhanced image with appropriate meta-data so that the original image is recoverable, in accordance with an embodiment of the present invention.

Reference is now made to FIG. 13, which is a simplified flowchart of a method for encoding an enhanced image with appropriate meta-data so that the original image is recoverable, in accordance with an embodiment of the present invention. The flowchart of FIG. 13 operates in conjunction with the flowchart of FIG. 2A or FIG. 2B that governs the enhancement process of the present invention.

At the time of applying the enhancement process to the original captured image, while the original captured image is still available, the following additional steps are performed. At step 1310 the darkening and brightening multipliers and darkening offsets are inversely applied to the contrast enhanced image, $I_{enhanced}$, to generate an estimate of the original captured image, ESTI. I.e., the multipliers are used as dividers, and the offsets are added instead of subtracted, and the order of operation is reversed, as described above with respect to FIG. 11.

At step 1320 estimated filtered images $ESTMAX_{filter}$ and $ESTMIN_{filter}$ are derived by filtering $I_{enhanced}$. At step 1330 the differences DIFMAX=$MAX_{filter}$−ESTMAX, DIFMIN=$MIN_{filter}$−ESTMIN, and DIFI=$I_{source}$−ESTI are computed. At step 1340 the above differences are encoded using entropy encoding for the purpose of data compression. The encoding may be a Huffman encoding, or any other lossless entropy encoding such as arithmetic encoding, or it may be a lossy encoding designed for images, such as the well-known DCT or wavelet transform, quantization and entropy encoding employed in JPEG and JPEG2000 compression.

At step 1350 the encoded data and the brightening and darkening response curves are stored as embedded data within the enhanced image, and written to an image file.

Figure 14:
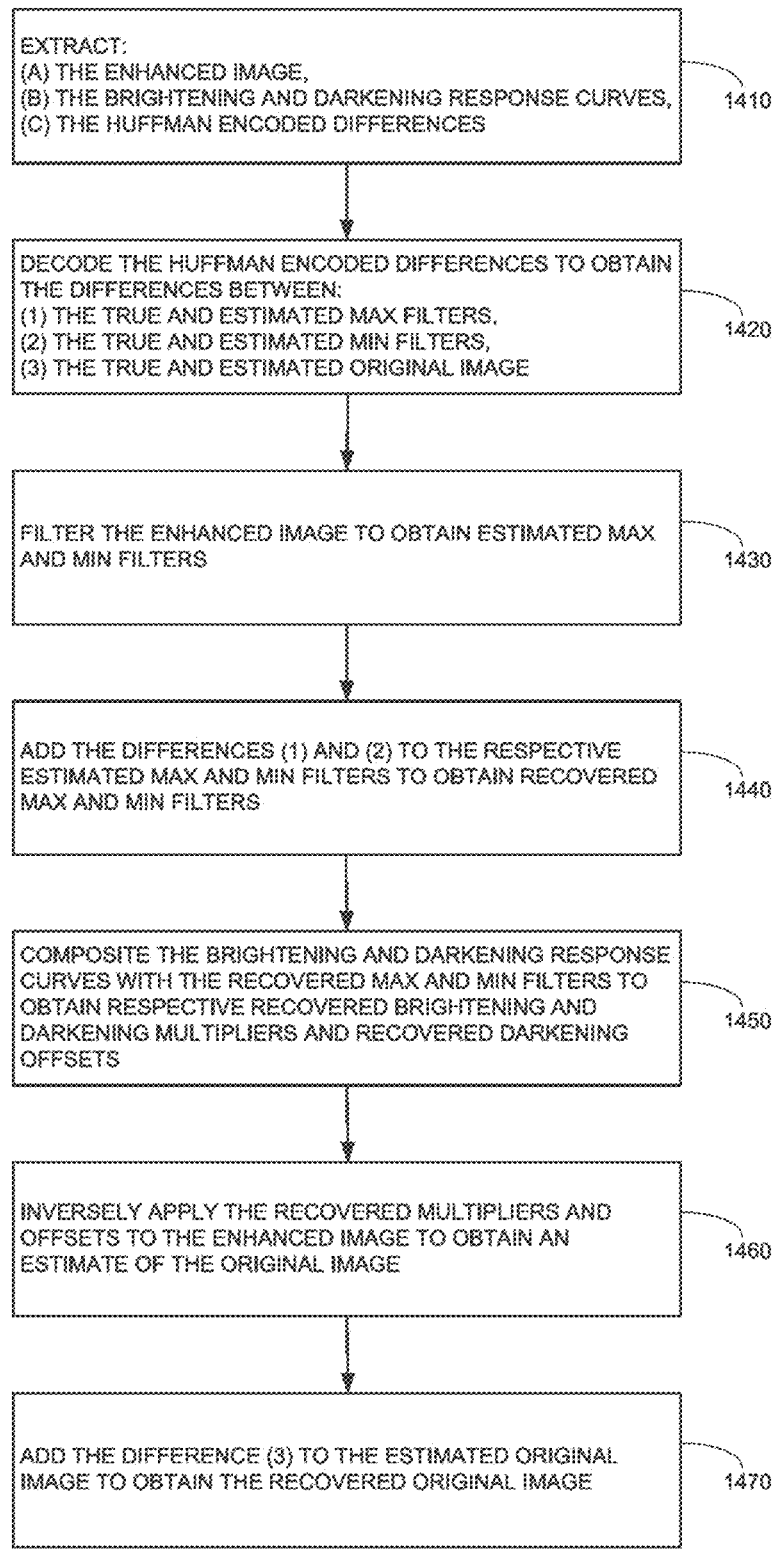
FIG. 14 is a simplified flowchart of a method for recovering an original image from an enhanced image that was encoded by the method of FIG. 13, in accordance with an embodiment of the present invention.

Reference is now made to FIG. 14, which is a simplified flowchart of a method for recovering an original image from an enhanced image that was encoded by the method of FIG. 13, in accordance with an embodiment of the present invention.

At the time of recovering the original captured image from the enhanced image, the following steps are performed. At step 1410 the enhanced image $I_{enhanced}$, the brightening and darkening response curves, and the encoded data are extracted from the image file written at step 1350. At step 1420 the encoded data is decoded to generate the image differences DIFMAX, DIFMIN and DIFI.

At step 1430 the enhanced image $I_{enhanced}$ is filtered to obtain estimated filtered images ESTMAX and ESTMIN. At step 1440 the differences DIFMAX and DIFMIN are added to the estimated filtered images ESTAX and ESTMIN, respectively, to generate respective recovered maximum and minimum filtered images.

At step 1450 the brightening and darkening response curves are composited with the recovered maximum and minimum filtered images to derive respective brightening and darkening multipliers, and corresponding darkening offsets. At step 1460 the multipliers and offsets are inversely applied to $I_{enhanced}$ to obtain an estimated original image ESTI. I.e., the multipliers are used as dividers and the offsets are added, and the order of operation is reversed, as described hereinabove with respect to FIG. 11.

Finally, at step 1470 the difference DIFI is added to the estimated original image to generate a recovered original image.

10. Application of Invention to selecting Regions of Interest

It will be appreciated by those skilled in the art that the filtering techniques described in Sec. 1 hereinabove for generating the first and second filtered images are advantageous in facilitating improved image area (e.g., "magic wand") selection when used with seed-fill and region growing techniques. By performing a seed-fill or region growing algorithm on the filtered image rather than the original image, local variation in the image will be prevented from defining the growth boundaries, thereby reducing the appearance of holes in the grown region, as well as allowing region growth to cross brightness boundaries caused only by local variation.

11. Application of Invention to Contrast Enhancement of Regions of Interest

It will be appreciated by those skilled in the art that there are benefits in applying and confining local contrast enhancement of the present invention to a region of interest (ROI) within an image. Such an ROI is generally represented internally by either a binary or grayscale mask. The ROI may be selected by a user by one of many well-known methods for area selection such as "lasso" selection, and applying a seed-fill algorithm, based on a filtered image as described in Sec. 10 hereinabove.

Application of local contrast enhancement is confined to the area inside the ROI as follows: (1) The first and second filtered images are derived from the entire source image. (2) Histogram are built based on the pixels from the source image having a mask value $I_{mask} \geq 0.5$, for a mask $I_{mask}$ with values 0 at pixels that are completely excluded, with values 1 at pixels that are completely included, and with values between 0 and 1 at pixels that are partially included. (3) In determining the output values of the image, the computations are only performed for those pixels having a mask value greater than 0, and the output pixel value is determined by the following formula $$I_{ROI-enhanced} = I_{enhanced} * I_{mask} + I_{source} * (1 - I_{mask})$$

For color images, this formula is applied independently to the color channels.

In accordance with an embodiment of the present invention, the mask is determined as follows. (4) The user clicks on a point within the image. (5) A seed-fill algorithm is applied to the first and/or second filtered images using the selected point as the origin. As explained hereinabove, applying the seed-fill algorithm to the filtered images instead of the source image is beneficial in avoiding 'holes' and undesired boundaries in the ROI.

Further in accordance with the present invention, a user interface enables the user to (6) select an ROI by single-clicking on an image; (7) adjust the brightness/darkness of the area by adding to the brightening and darkening response curves a positive or negative Gaussian distribution centered at either (a) the filtered image value of the selected point, or (b) the average filtered image value among the pixels in the ROI, where the amplitude of adjustment is determined through the adjustment of a slider and/or use of the mouse wheel; and (8) return to step (6), thereby allowing multiple ROIs to be independently adjusted.

In accordance with an embodiment of the present invention, instead of storing brightening and darkening response curves, two 2-dimensional arrays, $I_{gmin}$ and $I_{gmax}$, of the same dimension as the source image, are stored, where each value of the arrays represents the current value of $g_{max}$ and $g_{min}$ for that pixel. These values are modified in step (7) through the addition of Gaussian curves composited with $MAX_{filter}$ and $MIN_{filter}$, while restricting values in $I_{gmin}$ and $I_{gmax}$ to be greater than or equal to 1 at all times, and where the Gaussian curve amplitude is multiplied at each pixel by the corresponding value of $I_{ROI}$. This modification is achieved by applying the following equations pixel-wise:

$$I_{gmax}' = \max(1, I_{gmax} + f_{Gauss}(MAX_{filter}) * I_{ROI})$$

$$I_{gmin}' = \max(1, I_{gmin} + f_{Gauss}(MIN_{filter}) * I_{ROI})$$

where $I_{gmax}$ and $I_{gmin}$ are current multiplier values, $I_{gmax}'$ and $I_{gmin}'$ are the new multiplier values, and $f_{Gauss}$ is the Gaussian curve described above.

After $I_{gmax}$ and $I_{gmin}$ have been modified for all nonzero pixels in $I_{ROI}$, the corresponding pixels of the output image are updated using the new values of $g_{min}$ and $g_{min}$ from $I_{gmax}'$ and $I_{gmin}'$ in EQUATIONS 6A-6E. The output image is thus not completely reconstructed after each modification. It is initially set to the same values as the input image; and subsequently, at each modification, only pixels in the output image corresponding to nonzero values in $I_{ROI}$ are changed.

It may be appreciated by those skilled in the art, that use of the arrays $I_{gmin}$ and $I_{gmax}$ serves to obviate the need to apply the entire contrast enhancement process over and over again, for each ROI. By using the arrays $I_{gmin}$ and $I_{gmax}$, all of the adjustments for multiple ROIs are accumulated into these arrays through pixel-wise addition of the adjustment multipliers, and only after all ROIs are accumulated, are $I_{gmin}$ and $I_{gmax}$ then applied to the original image. Otherwise, were the entire contrast enhancement process to be applied over and over again, filtered images would have to be re-computed after each ROI adjustment is made, and successive rounding and clipping would lead to loss of detail.

12. Application of Invention to other Image Enhancement Filters

It will be appreciated by those skilled in the art that the filtering techniques described in Sec. 1 hereinabove for producing the first and second filtered images have application outside the scope of image contrast enhancement. In particular, define an image $I_{metric}$, where the pixels of $I_{metric}$ are the result of applying a specified metric to $I_{source}$, then apply a filter as described hereinabove to $I_{metric}$, to generate an image $I_{filtered-metric}$. $I_{filtered-metric}$ may then be used to parameterize global pointwise image enhancement operations. In the particular case of image contrast enhancement, a "levels" pointwise filter is essentially employed, where the black and white point parameters are parameterized using the corresponding pixel values of the first and second filtered images, respectively.

Outside the scope of contrast enhancement, one particularly simple parameterization based on a filtered image involves parameterizing the degree of effect of the image enhancement operation by using the value of $I_{filtered-metric}$ to mix each output pixel value of the image enhancement operation $f_{enhanced}$ with the source pixel value, using the formula $$I_{enhanced}=I_{filtered\text{-}metric}/S * f_{enhance}(I_{source})+(1-I_{filtered\text{-}metric}/S)*I_{source}.$$

For example, suppose $f_{enhanced}$ is a sharpening filter for application to an image in such a way that bright areas are sharpened more than the dark areas. Defining $I_{metric}$ as representing the brightness of each pixel, it will be appreciated that the resulting image $I_{enhanced}$ will be a sharpened version of $I_{source}$, where bright areas will be sharpened more than dark areas.

An advantage of using $I_{filtered\text{-}metric}$ in the formula above, instead of $I_{metric}$, is that if $I_{metric}$ were used, then dark pixels within bright areas of the image would not be sharpened enough, and similarly, bright pixels within dark areas would be sharpened too much. The use of $I_{filtered\text{-}metric}$ helps to prevent local variation in fine details of the image from unintentionally parameterizing the amount of sharpening applied.

It will be readily seen by those skilled in the art that a low-frequency filtered version of $I_{metric}$ such as a Gaussian-blurred image $I_{blurred\text{-}metric}$ may be used in place of $I_{filtered\text{-}metric}$ to achieve the advantages described above. However, using $I_{blurred\text{-}metric}$ may cause undesirable artifacts to appear in the image around transition areas between very bright and dark areas, as the transition in sharpening level between full sharpening and no sharpening would be gradual rather than instantaneous. The result of such gradual transition in the sharpening amount is a visually noticeable ramp in sharpness within each of the two regions leading up to the transition. Thus, the same property of the filtering techniques described hereinabove that is instrumental in providing local contrast enhancement without 'halo' effects, also prevents analogous effects from appearing in the output image when used in parameterizing other image enhancement filters.

Further to the above, by compositing a response curve with $I_{filtered\text{-}metric}$, the parameterization of the filter is more finely tuned by using methods similar to those described hereinabove. For example, a basic curve shape can be selected based on a parameter similar to 'compression', and the amplitude can be controlled by a second parameter. Additionally, the curve can be generated manually by adding Gaussian curves in the same manner as in the Light Curves interface described hereinabove. Certain operations such as saturation adjustment which can cause clipping can also make use of the 'max curves' display mechanism and the determination of curve amplitude based on a desired clipping factor.

Further to the above, by utilizing multiple response curves convolved with filtered images, where each response curve is associated with and composed with a common or separate metric, it is possible to control a multiplicity of parameters using the methods described hereinabove.

Further to the above, when multiple response curves and multiple metrics are used, an additional step may use a function taking the various composed values as inputs, and providing a single parameter as output. For example, suppose it is desired to sharpen an image, where the amount of sharpening of each pixel is proportional to the proximity of the pixel's neighborhood to one of three colors specified by the user. In this case, each of the three metrics is the color distance between a pixel and the respective color specified by the user. The user can furthermore tune associated response curves to control the relative amounts of sharpening associated with each color, while seeing the integrated tuning effects in real time.

13. Server-Client Embodiments of Contrast Enhancement

The present invention operates advantageously within a distributed server-client architecture. As described hereinabove in Sec. 1.2 and Sec. 9, the brightening and darkening response curves constructed using the present invention in enhancing a sub-sampled version of a full-scale image, are substantially the same curves that are used in enhancing the full-scale image itself. As a result, the present invention is particularly useful in a setting whereby a full-resolution image is stored on a server, and the user interaction occurs on a client, such as a desktop computer or mobile device, connected to the server via a network. Moreover, because the present invention operates with simple user interfaces, as described hereinabove in Sec. 4, the server-client architecture is particularly effective for thin client devices with limited storage and processing capabilities.

Figure 15:
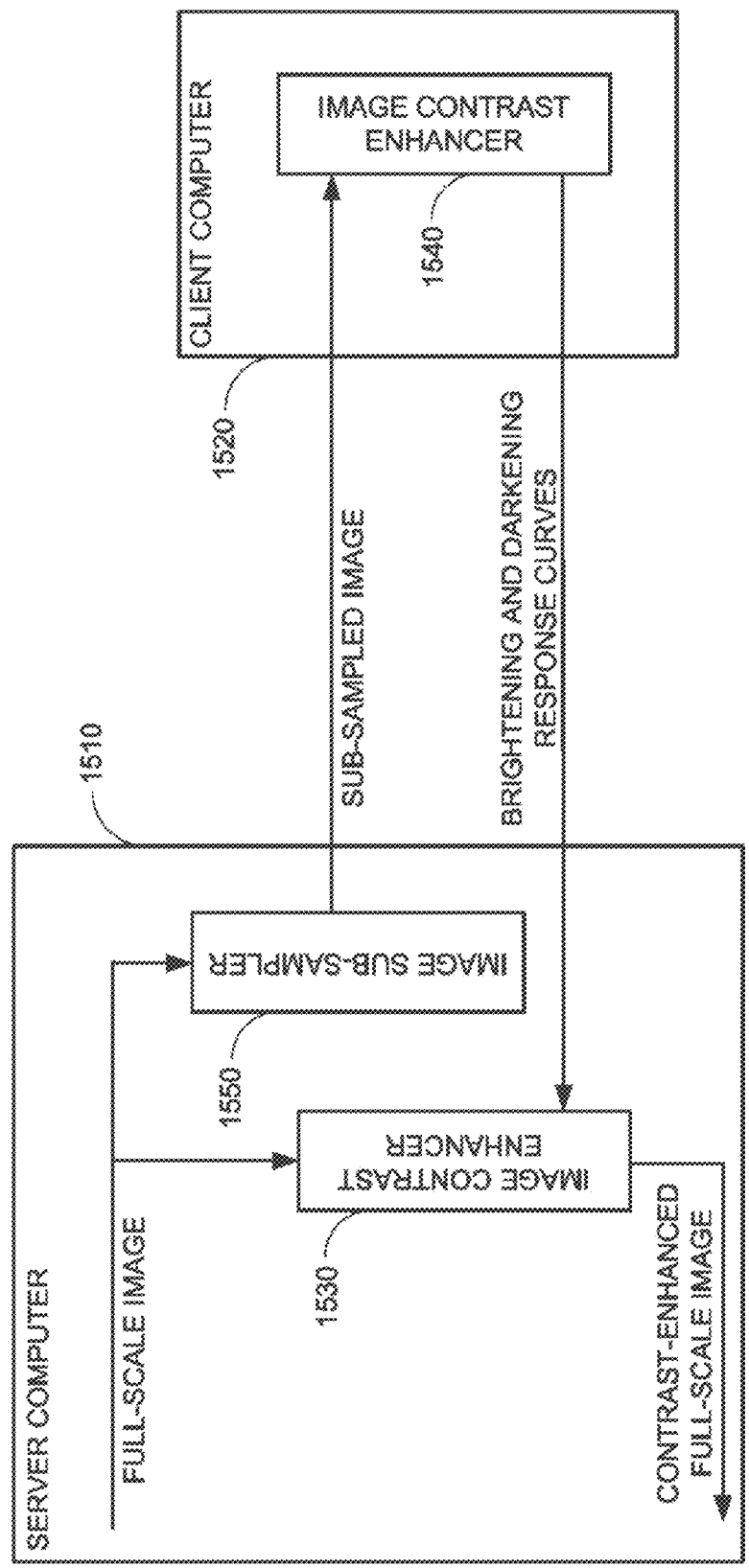
FIG. 15 is a simplified block diagram of a first server-client system for performing contrast enhancement in a distributed architecture, in accordance with an embodiment of the present invention.

Two such distributed architectures are presented herein. Reference is now made to FIG. 15, which is a simplified block diagram of a first server-client system for performing contrast enhancement in a distributed architecture, in accordance with an embodiment of the present invention. Shown in FIG. 15 is a server computer 1510, and a client computer 1520 connected to server computer 1510 via a computer network, such as the Internet. Server computer 1510 includes an image contrast enhancer 1530 operative in accordance with the present invention, and client computer 1520 includes an image contrast enhancer 1540, also operative in accordance with the present invention. Each of image contrast enhancer 1530 and 1540 accepts as input an image to be enhanced and parameters for determining a brightening and a darkening response curve, and produces as output a contrast-enhanced image. Image contrast enhancers 1530 and 1540 may be one of the systems illustrated in FIG. 2A and FIG. 2B, and may include components such as filter processor 210. Server computer 1510 further includes an image sub-sampler 1550, operative to sub-sample a high resolution full-scale image to generate a lower resolution sub-sampled image.

The server-client system illustrated in FIG. 15 distributes the image contrast enhancement operations between server 1510 and client 1520 as follows. A full-scale original image, I, which resides on server 1510, is sub-sampled by image sub-sampler 1550 to a sub-sampled image, $I_{sub}$, that is transmitted to client 1520. Image contrast enhancer 1540 enhances the received $I_{sub}$ and, in doing so, generates specific brightening and darkening response curves, $f_{BR}$ and $f_{DR}$, respectively. The response curves $f_{BR}$ and $f_{DR}$ are transmitted to server 1510, and image contrast enhancer 1530 then enhances the full-scale image, I, using $f_{BR}$ and $f_{DR}$ as response curves, to generate a contrast-enhanced image, $I_{enhanced}$.

It will be appreciated that instead of sending the specific brightening and darkening response curves, $f_{BR}$ and $f_{DR}$, to server 1510, client 1520 may instead send to server 1510 values of user parameters, such as the parameters indicated in TABLE I, from which the brightening and darkening response curves can be generated.

Figure 16:
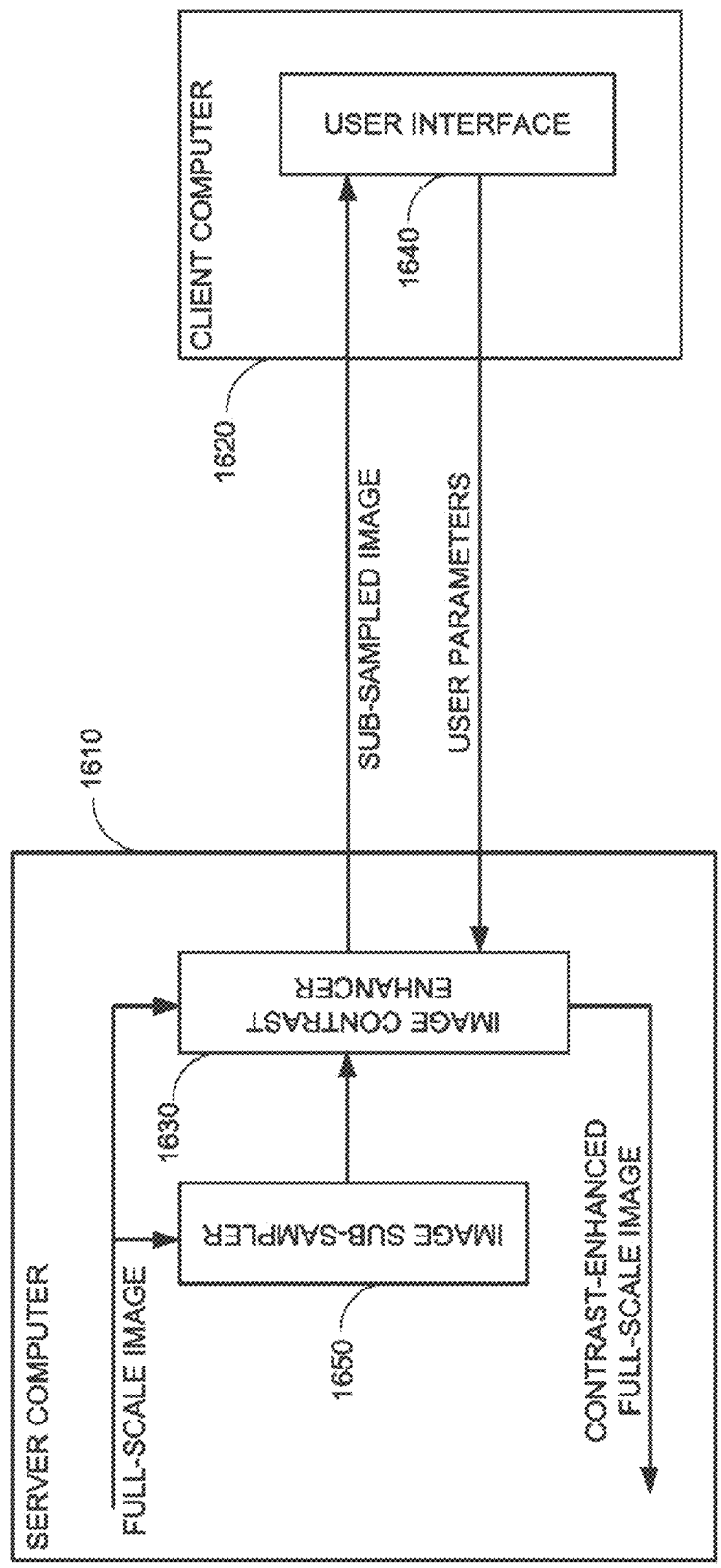
FIG. 16 is a simplified block diagram of a second server-client system for performing contrast enhancement in a distributed architecture, in accordance with an embodiment of the present invention.

Reference is now made to FIG. 16, which is a simplified block diagram of a second server-client system for performing contrast enhancement in a distributed architecture, in accordance with an embodiment of the present invention. Shown in FIG. 16 is a server computer 1610, and a client computer 1620 connected to server computer 1610 via a computer network, such as the Internet. Server computer 1610 includes an image contrast enhancer 1630, and client computer 1620 includes a user interface 1640 for contrast-enhancing images in accordance with the present invention. Image contrast enhancer 1630 accepts as input an image to be enhanced and parameters for determining a brightening and a darkening response curve, and produces as output a contrast-enhanced image. Image contrast enhancer 1630 may be one of the systems illustrated in FIG. 2A and FIG. 2B, and may include components such as filter processor 210. User interface 1640 may be one of the interfaces described hereinabove in Sec. 4, such as the Compression & Amplitude user interface, the Brighten & Darken user interface, the Light Curves user interface and the Light Equalizer user interface. Server 1610 also includes an image sub-sampler 1650, which accepts as input a high resolution full-scale image, and produces as output a lower resolution sub-sampled image.

The server-client system illustrated in FIG. 16 distributes the image contrast enhancement operations between server 1610 and client 1620 as follows. A full-resolution image, I, residing on server 1610 is sub-sampled by sub-sampler 1650 to generate a sub-sampled image, $I_{sub}$. The sub-sampled image $I_{sub}$ is passed to image contrast enhancer 1630, which initializes contrast enhancement parameters to default settings. The parameter settings determine brightening and darkening response curves, $f_{BR}$ and $f_{DR}$, respectively, and image contrast enhancer 1630 enhances $I_{sub}$ using the response curves $f_{BR}$ and $f_{DR}$, and transmits the resulting enhanced sub-sampled image, $I_{sub-enhanced}$ to client 1620. User interface 1640 displays $I_{sub-enhanced}$ and receives input instructions from a user of client 1620. The input instructions may be inter alia the user dragging a slider to adjust values of parameters, or the user clicking on an area of the image to trigger automatic parameter adjustments, as described hereinabove in Sec. 4.

The adjusted parameter settings are transmitted to image contrast enhancer 1630, which then modifies the brightening and darkening response curves $f_{BR}$ and $f_{DR}$ accordingly. If the user instructions indicate that the adjusted parameters settings are to be applied to the full-scale image I, then image contrast enhancer 1630 does so and thereby produces a full-scale contrast enhanced image, $I_{enhanced}$. Otherwise, image contrast enhancer 1630 applies the adjusted parameter settings to $I_{sub}$ and continues to transmit the resulting enhanced sub-sampled images $I_{sub-enhanced}$ to client 1620, for further adjustment of parameters.

It may be appreciated that the systems of FIG. 15 and FIG. 16 take advantage of the resolution-independent features of the present invention to transmit and operate on sub-sampled images instead of full-scale images. Thus these systems make efficient use of bandwidth between client and server, and reduce the computational overhead and complexity of the client. In the system of FIG. 16 the image contrast enhancement does not run on the client, and thus obviates the need for the client to use special purpose hardware or software. As such, the system of FIG. 16 is particularly amenable to thin client devices.

Figure 17:
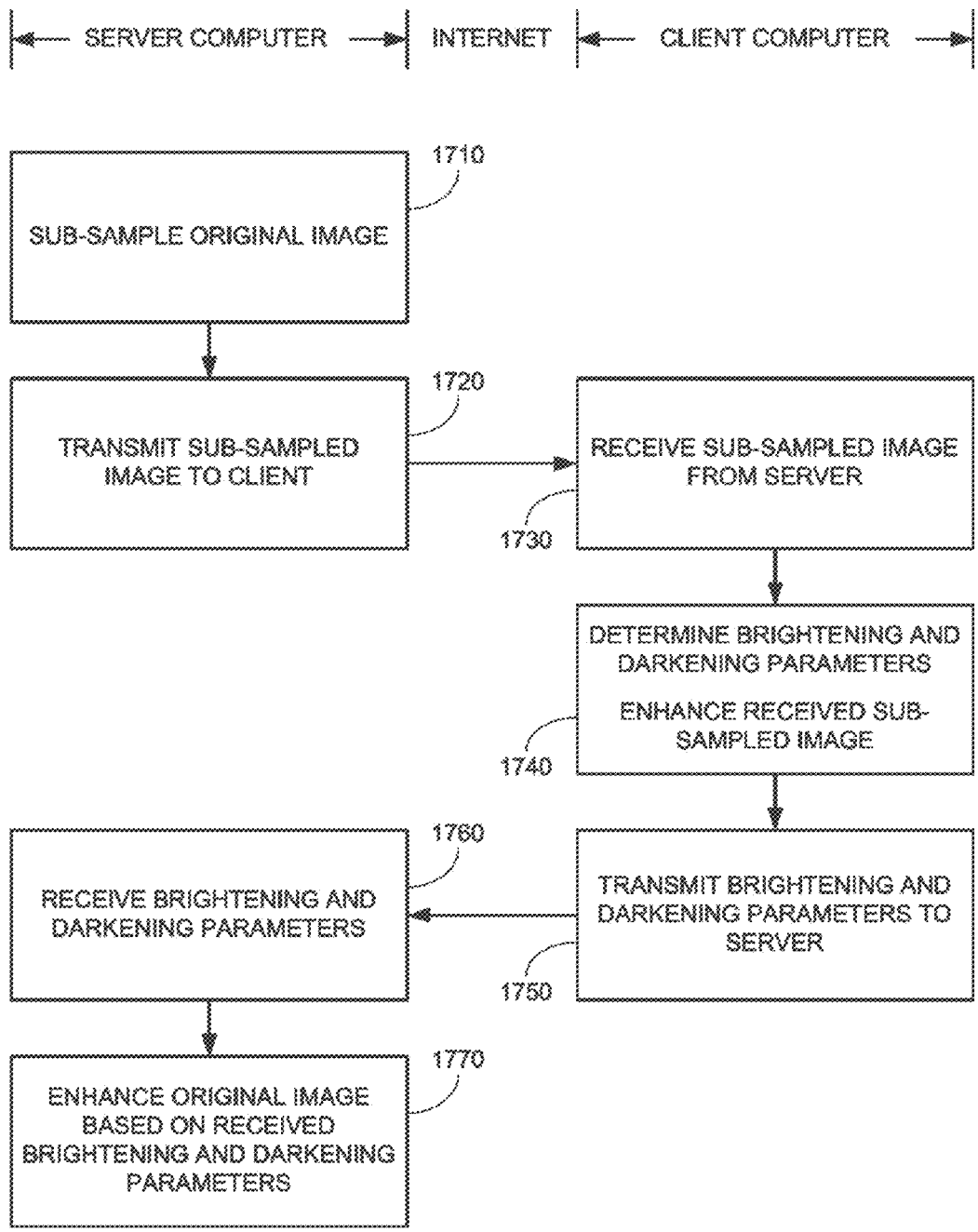
FIG. 17 is a simplified flowchart of a first server-client method for performing contrast enhancement in a distributed architecture, in accordance with an embodiment of the present invention.

Reference is now made to FIG. 17, which is a simplified flowchart of a first server-client method for performing contrast enhancement in a distributed architecture, in accordance with an embodiment of the present invention. At step 1710 an original full-scale image, I, is sub-sampled on a server computer, and a lower resolution image, $I_{sub}$, is generated. At step 1720 the sub-sampled image $I_{sub}$ is transmitted from the server computer to a client computer, via the Internet. At step 1730 the client computer receives the sub-sampled image $I_{sub}$.

At step 1740 the client computer enhances the sub-sampled image $I_{sub}$ using a contrast enhancement method such as the method illustrated in FIG. 3A or 3B. In doing so, the client computer, either automatically or manually or partially automatically and partially manually, determines appropriate parameters for a brightening response curve and a darkening response curve. At step 1750 the client computer transmits the parameters for the brightening and darkening response curves to the server computer. Alternatively, the client computer may transmit the brightening and darkening response curves themselves, since these curves do not require large amounts of data.

At step 1760 the server computer receives the parameters for the brightening and darkening response curves, or receives the response curves themselves. At step 1770 the server computer enhances the original image I based on the brightening and darkening response curves corresponding to the received parameters.

Figure 18:
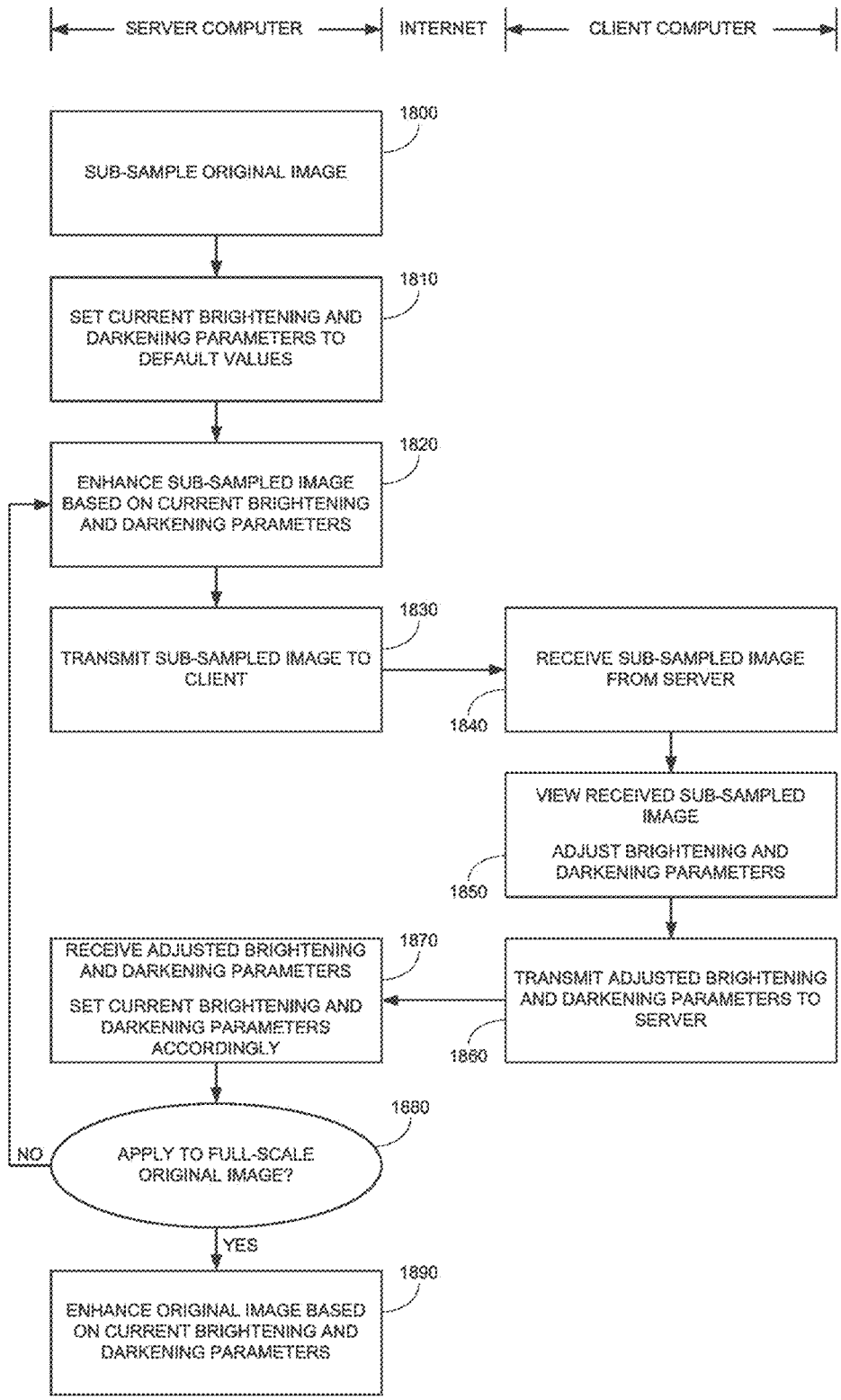
FIG. 18 is a simplified flowchart of a second server-client method for performing contrast enhancement in a distributed architecture, in accordance with an embodiment of the present invention.

Reference is now made to FIG. 18, which is a simplified block diagram of a second server-client method for performing contrast enhancement in a distributed architecture, in accordance with an embodiment of the present invention. At step 1800 a high-resolution original image, I, is sub-sampled on a server computer, to generate a lower-resolution image, $I_{sub}$. At step 1810 parameters for a brightening response curve and a darkening response curve are set to default values. At step 1820 the sub-sampled image $I_{sub}$ is contrast-enhanced, based on brightening and darkening response curves as determined by the current parameters, and an enhanced sub-sampled image, $I_{sub-enhanced}$ is generated. At step 1830 the enhanced sub-sampled image $I_{sub-enhanced}$ is transmitted to a client computer.

At step 1840 the client computer receives the sub-sampled image $I_{sub-enhanced}$ for display to a user. At step 1850 the user views the displayed image $I_{sub-enhanced}$ and adjusts the brightening and darkening response curve parameters, based on $I_{sub-enhanced}$. Parameter adjustment may be performed automatically, manually or partially automatically and partially manually. At step 1860 the client computer transmits the adjusted parameter values back to the server computer.

At step 1870 the server computer receives the adjusted parameter values, and sets the current values of the brightening and darkening parameters to the received adjusted values. At step 1880 the server computer determines, based on instructions received from the client computer, whether the user wishes the enhancement to be applied to the full-scale image, I. If so, at step 1890 the server computer enhances I based on the current values of the brightening and darkening parameters, to generate a full-scale enhanced image, $I_{enhanced}$. Otherwise, the server computer returns to step 1820 to enhance $I_{sub}$ based on the current parameter values.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for smoothing digital images, comprising operating on an original source image, I, comprising pixel values p(i, j) at respective pixel locations (i, j), to produce a smoothed image, $I_{smoothed}$, comprising pixel values $p_{smoothed}$ (i, j) at respective pixel locations (i, j), wherein for each pixel location (i, j) the smoothed pixel value $p_{smoothed}$(i, j) is computed as a weighted average of the corresponding pixel value p(i, j) with at least one pixel window average of I, and wherein the pixel window averages of I are each used for the weighted average at more than one pixel location (i, j).

2. The method of claim 1 wherein said operating is performed multiple times in succession such that the input image, I, at each successive performance is the output image, $I_{smoothed}$, from the previous performance.

3. The method of claim 1 wherein for each pixel location (i, j) the at least one pixel window average is at least one uniformly weighted pixel window average.

4. The method of claim 1 wherein for each pixel location (i, j) the at least one pixel window average is computed using weights that correspond to a two-dimensional Gaussian distribution.

5. The method of claim 1 wherein for each pixel location (i, j) the at least one pixel window average comprises $(2n+1)^2$ pixel window averages, a(k, l), for some positive integer parameter n, with indices k and l ranging from −n to +n, and wherein the $(2n+1)^2$ windows for the pixel window averages are centered at the $(2n+1)^2$ pixel locations (i+kd, j+ld) for some positive integer parameter d.

6. The method of claim 5 wherein for each pixel location (i, j) the windows for the pixel window averages are square windows, each of width and height M for some positive integer parameter M.

7. The method of claim 6 wherein said operating is performed multiple times in succession such that the input image, I, at each successive performance is the output image, $I_{smoothed}$, from the previous performance, with at least one different parameter value M, d and n at each successive performance.

8. The method of claim 5 wherein for each pixel location (i, j) the weight w(k, l) of each window average a(k, l) is dependent on the difference p(i, j)−a(k, l).

9. An apparatus for smoothing digital images, comprising an image processor operative to process an original source image, I, comprising pixel values p(i, j) at respective pixel locations (i, j), to produce a smoothed image, $I_{smoothed}$, comprising pixel values $p_{smoothed}(i, j)$ at respective pixel locations (i, j), wherein for each pixel location (i, j) the image processor computes the smoothed pixel value $p_{smoothed}(i, j)$ as a weighted average of the corresponding pixel value p(i, j) with at least one pixel window average of I, and wherein the pixel window averages of I are each used for the weighted average at more than one pixel location (i, j).

10. The apparatus of claim 9 wherein said image processor is operative to process an image multiple times in succession such that the input image, I, at each successive process is the output image, $I_{smoothed}$, from the previous process.

11. The apparatus of claim 9 wherein for each pixel location (i, j) the at least one pixel window average is at least one uniformly weighted pixel window average.

12. The apparatus of claim 9 wherein for each pixel location (i, j) the at least one pixel window average is computed by said processor using weights that correspond to a two-dimensional Gaussian distribution.

13. The apparatus of claim 9 wherein for each pixel location (i, j) the at least one pixel window average comprises $(2n+1)^2$ pixel window averages, a(k, l), for some positive integer parameter n, with indices k and l ranging from −n to +n, and wherein the $(2n+1)^2$ windows for the pixel window averages are centered at the $(2n+1)^2$ pixel locations (i+kd, j+ld) for some positive integer parameter d.

14. The apparatus of claim 13 wherein for each pixel location (i, j) the windows for the pixel window averages are square windows, each of width and height M for some positive integer parameter M.

15. The apparatus of claim 14 wherein said image processor is operative to process an image multiple times in succession such that the input image, I, at each successive process is the output image, $I_{smoothed}$, from the previous process, with at least one different parameter value M, d and n at each successive performance.

16. The apparatus of claim 13 wherein for each pixel location (i, j) the weight w(k, l) of each window average a(k, l) is dependent on the difference p(i, j)−a(k, l).

* * * * *